(12) United States Patent
Arias

(10) Patent No.: US 12,484,490 B2
(45) Date of Patent: Dec. 2, 2025

(54) GREENHOUSE AND HORTICULTURE SYSTEM

(71) Applicant: SINETERRA INTERNATIONAL AG, Geneva (CH)

(72) Inventor: Ruben Arias, Busan (KR)

(73) Assignee: SINETERRA INTERNATIONAL AG, Geneva (CH)

( * ) Notice: Subject to any disclaimer, the term of this patent is extended or adjusted under 35 U.S.C. 154(b) by 0 days.

(21) Appl. No.: 18/729,689

(22) PCT Filed: Jan. 19, 2023

(86) PCT No.: PCT/IB2023/050461
§ 371 (c)(1),
(2) Date: Jul. 17, 2024

(87) PCT Pub. No.: WO2023/139513
PCT Pub. Date: Jul. 27, 2023

(65) Prior Publication Data
US 2025/0098599 A1    Mar. 27, 2025

(30) Foreign Application Priority Data
Jan. 20, 2022   (IL) .......................................... 290012

(51) Int. Cl.
*A01G 9/14* (2006.01)
*A01G 9/02* (2018.01)

(52) U.S. Cl.
CPC ............. *A01G 9/143* (2013.01); *A01G 9/023* (2013.01)

(58) Field of Classification Search
CPC .... A01G 31/008; A01G 31/02; A01G 31/022; A01G 31/025; A01G 31/04; A01G 31/06;
(Continued)

(56) References Cited

U.S. PATENT DOCUMENTS

| | | | |
|---|---|---|---|
| 5,511,340 A * | 4/1996 | Kertz ..................... | A01G 31/06 47/65 |
| 2009/0307973 A1* | 12/2009 | Adams ................... | A01G 31/06 47/62 C |

(Continued)

FOREIGN PATENT DOCUMENTS

| | | |
|---|---|---|
| EP | 3 476 211 B1 | 11/2020 |
| WO | 2019/056057 A1 | 3/2019 |
| WO | 2020/098890 A1 | 5/2020 |

*Primary Examiner* — Joshua J Michener
*Assistant Examiner* — Nicole Paige Maccrate
(74) *Attorney, Agent, or Firm* — Maschoff Brennan

(57) ABSTRACT

A horticulture crop growing system comprising a growing tray preparation station wherein a plurality of growing trays are pre-treated, filled with a growing bed and planted, a growing tray displacing system for transferring planted growing trays from the growing tray preparation station to a horticulture crop growing facility, a closed structure with a controlled environment treating system and one or more tray inlet/outlet ports, and one or more horticulture crop growing modules. The horticulture crop growing module comprise a plurality of parallelly disposed single-rowed growing towers, each comprising an array of vertically supported growing trays, a growing tray manipulation system for receiving planted growing trays via the tray inlet port and loading them to allocated growing towers, and for displacing the growing trays between the growing towers and through treating stations within the horticulture crop growing module, and for displacing the growing trays to the growing tray outlet port.

20 Claims, 40 Drawing Sheets

(58) Field of Classification Search
CPC .. A01G 31/042; A01G 31/045; A01G 31/047; A01G 9/0299; A01G 9/143
See application file for complete search history.

(56) References Cited

U.S. PATENT DOCUMENTS

| | | | |
|---|---|---|---|
| 2016/0295820 A1* | 10/2016 | Aykroyd | ................. A01G 9/249 |
| 2018/0235156 A1 | 8/2018 | Blair et al. | |
| 2019/0150375 A1* | 5/2019 | Miyahara | ................. A01G 31/06 |
| 2019/0327913 A1 | 10/2019 | Chong | |
| 2019/0380283 A1 | 12/2019 | Chong | |
| 2020/0236871 A1 | 7/2020 | Travaglini | |
| 2021/0084837 A1 | 3/2021 | Counne | |
| 2024/0245011 A1* | 7/2024 | Burnette | ................. A01G 7/00 |
| 2024/0324520 A1* | 10/2024 | Kreiner | ................. A01G 31/06 |

* cited by examiner

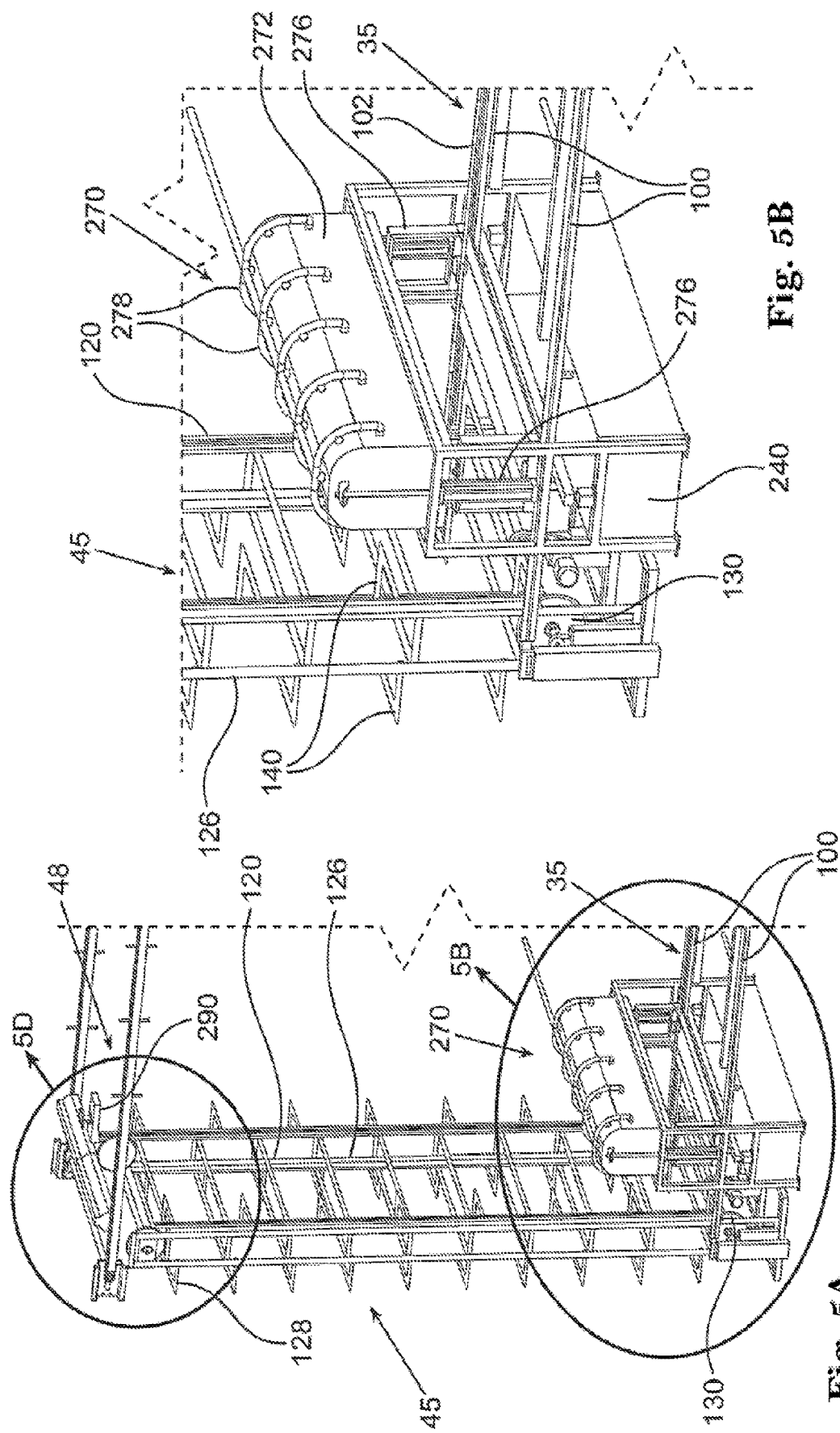

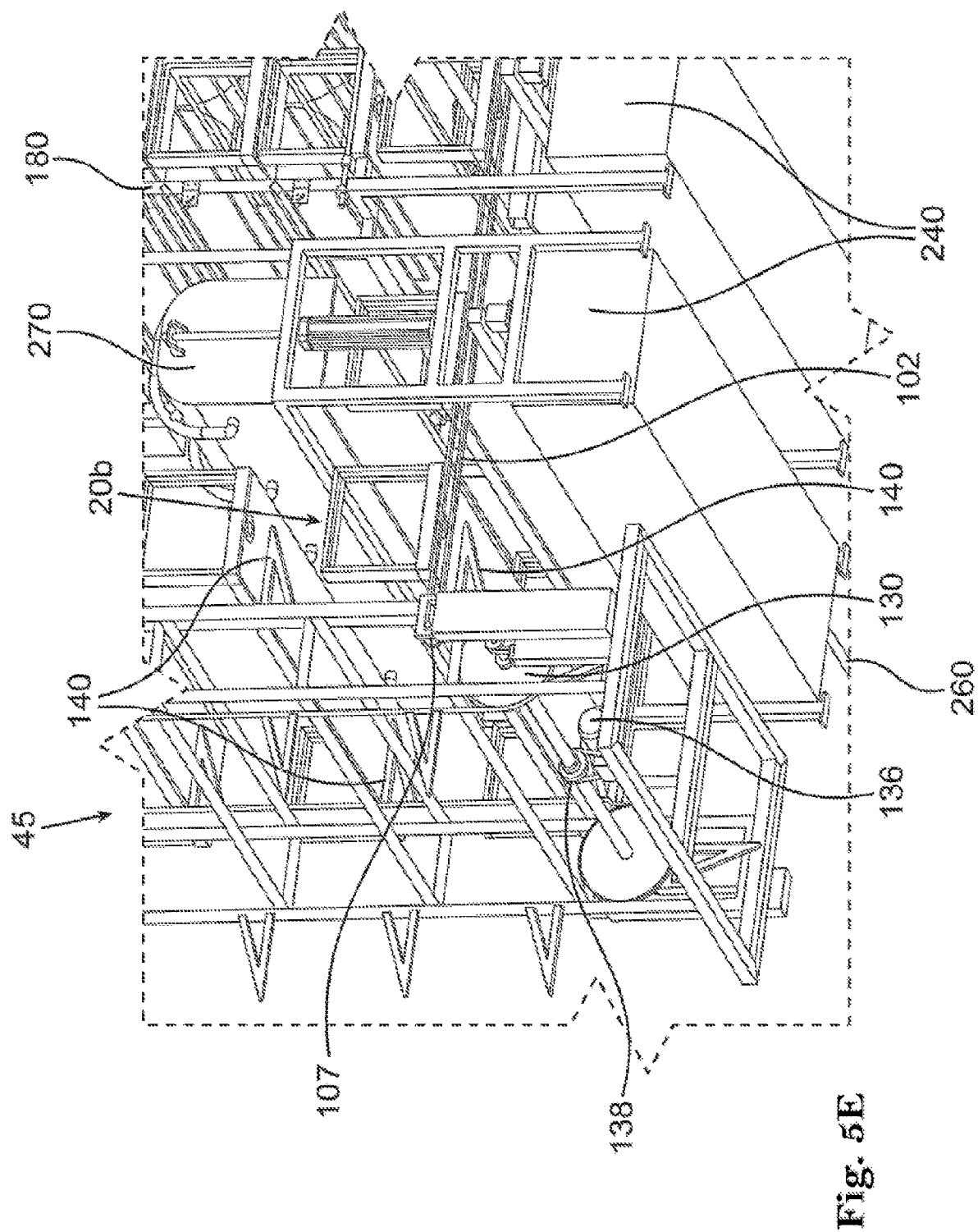

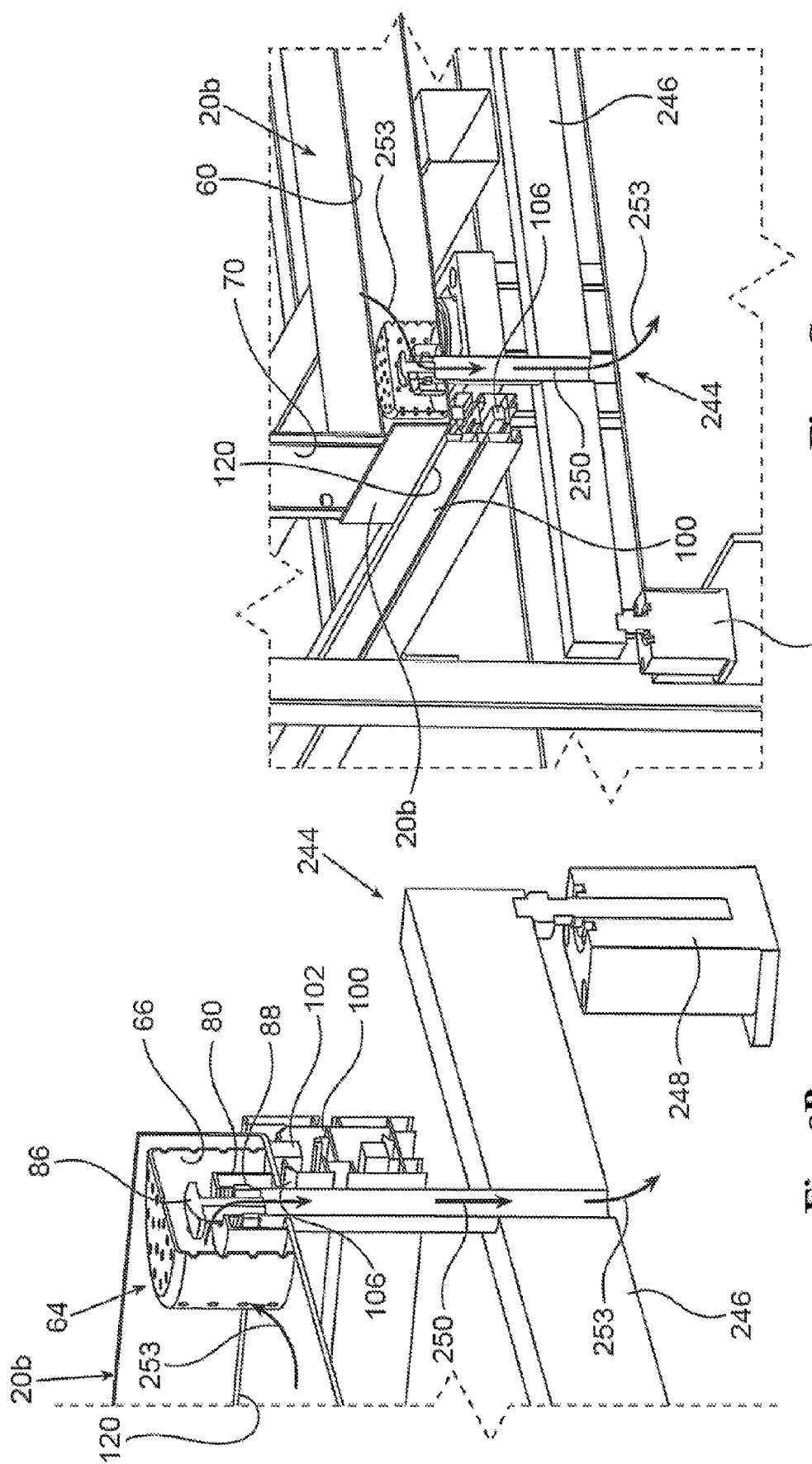

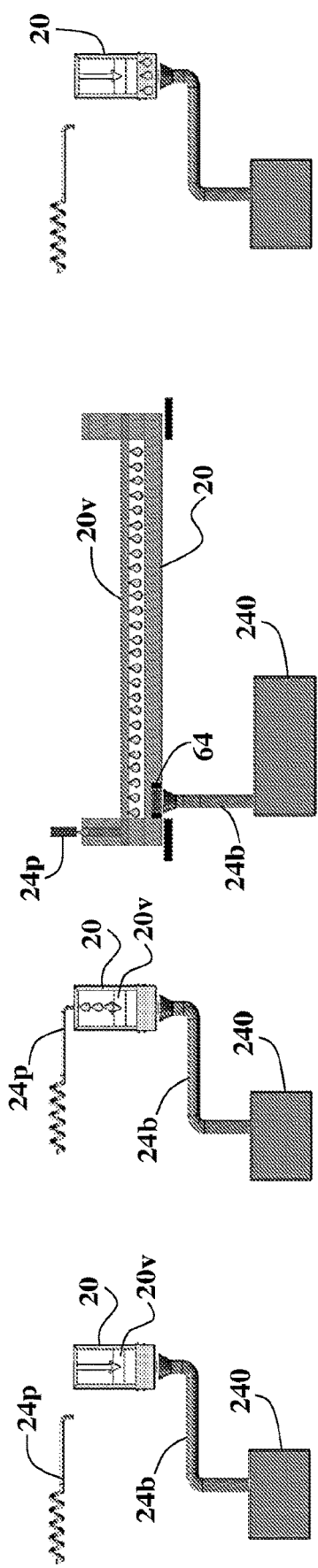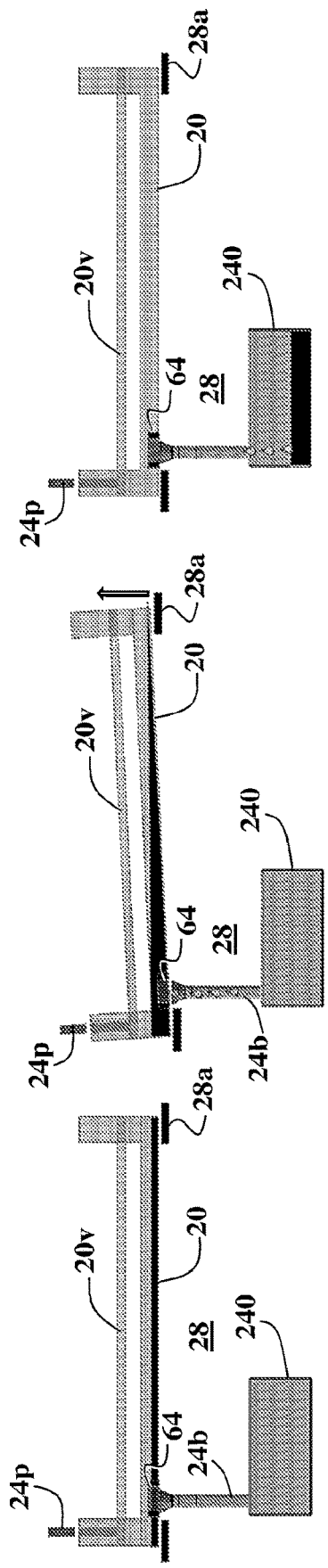

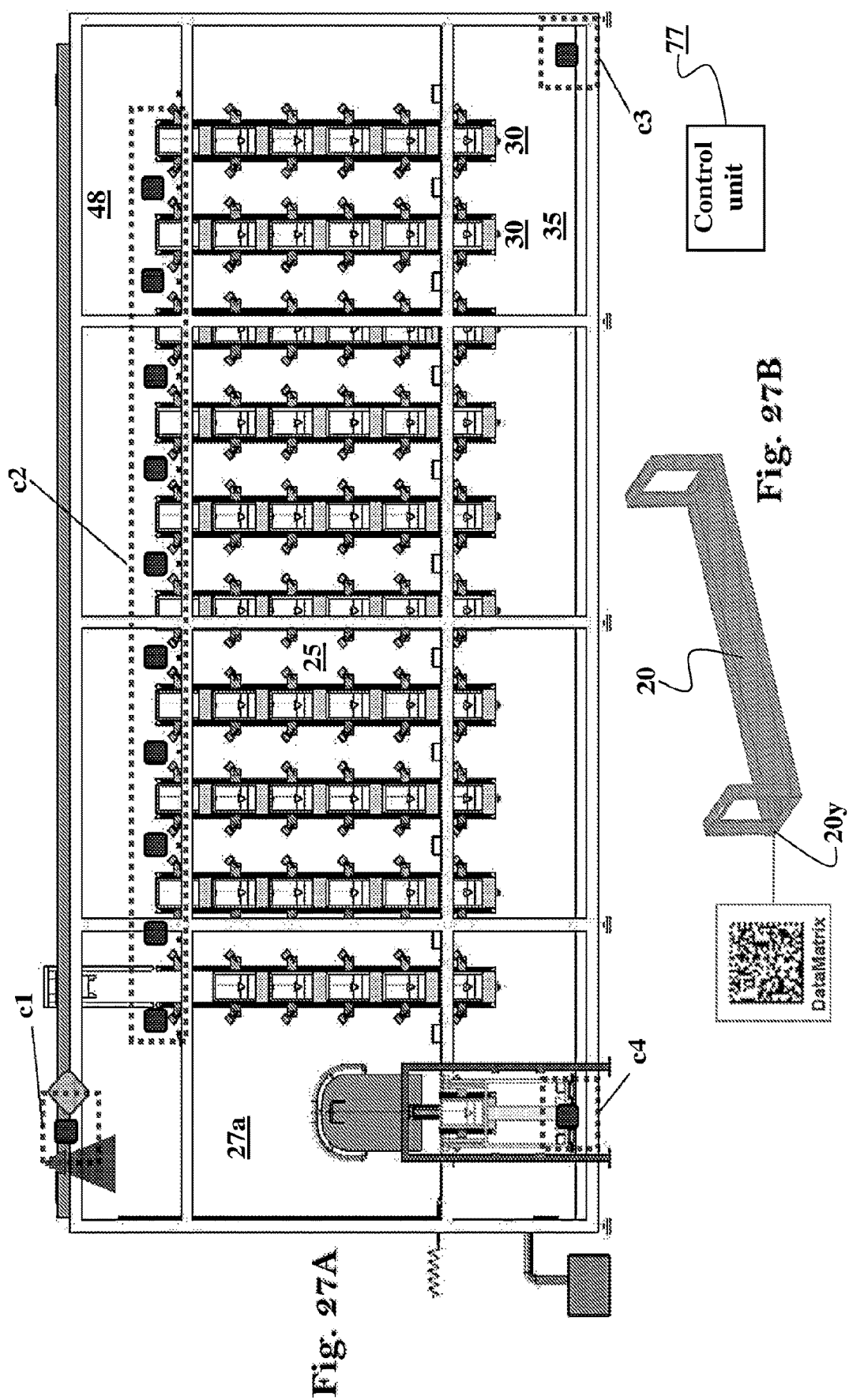

GREENHOUSE AND HORTICULTURE SYSTEM

TECHNOLOGICAL FIELD

The present disclosure is concerned with a greenhouse and with a horticulture system making use of same. More particularly, the disclosure is concerned with an automated greenhouse and an eco-growing system.

BACKGROUND ART

References considered to be relevant as background to the presently disclosed subject matter are listed below:
US20180235156
WO19056057
WO20098890

Acknowledgement of the above references herein is not to be inferred as meaning that these are in any way relevant to the patentability of the presently disclosed subject matter.

BACKGROUND

US Patent Publication No. 2018/235156 discloses a high density horticulture growing system comprises a plurality of containers in which crops are grown and one or more elevator devices to automatically move the containers between vertically spaced levels of one or more modular racks. Each elevator device comprises a carrier to transport the containers between the vertically spaced levels and a ram to push the containers from the carrier onto one or more longitudinal supports at the vertically spaced levels. A first conveying device moves containers at least horizontally from a crop planting area to each rack and a second conveying device moves containers at least horizontally from each rack to a crop storage area. One or more processors control movement of the containers, watering of the crops, temperature, lighting and other parameters of the system. A plurality of the high-density horticulture growing systems are in communication with a centralized data monitoring and collection system for the transmission and reception of data relating to the growing of crops.

International Patent Publication No. WO 2019/056057 discloses an apparatus for sequential carriage of growth trays around and through a mechanized, multi-level farming structure having an entry side or path and an exit side or path for said growth trays of a crop, the carriage apparatus including: an inward transporter disposed along the entry side of the farming structure for transporting at least one tray containing growth media from a seeding station; an upstanding elevator for elevating said at least one tray to a selected level of the farming structure and inserting said tray into entry side of the farming structure; an automatic controller for coordinating movement of the trays into the entry side and/or out of the exit side of the farming structure; an upstanding receiver for receiving and lowering said at least one tray containing a mature crop from the exit side of the farming structure; an outward transporter disposed along the exit side of the farming structure for transporting said at least one tray to a harvesting station; a growth media remover for removing growth media from each said at least one tray; and a tray washer for emptying and washing empty trays. Also disclosed is a method for sequential carriage of growth trays around and through the multi-level farming structure.

International Patent Publication No. WO 2009/8890 discloses a growth house comprising a housing defining an inner space. The inner space is provided with a storage structure comprising several vertically displaced storage levels each being configured to receive one or more tray members with one or more plants. The housing comprises an opening and is opaque and configured to prevent sunlight from entering the inner space. The growth house comprises a moveably arranged transportation unit configured to horizontally and vertically displace one or more tray members and thereby transport the one or more tray members between a first position outside the housing and a second position on a storage structure inside the housing, wherein a plurality of light sources are arranged to emit light towards the plants.

GENERAL DESCRIPTION

The present disclosure is directed to an automated greenhouse and horticulture growing system, comprising a large scale, fully automated crop growing facility.

According to a first aspect of the disclosure there is a horticulture crop growing system, comprising:
  a growing tray preparation station wherein a plurality of growing trays are pre-treated, filled with a growing bed and planted;
  a growing tray displacing system for transferring planted growing trays from the growing tray preparation station to a horticulture crop growing facility;
  the horticulture crop growing facility comprises a closed structure with a controlled environment treating system, one or more controlled growing tray inlet/outlet ports, and comprising a plurality of horticulture crop growing modules;
  each horticulture crop growing module comprising a plurality of parallelly disposed single-rowed growing towers, each comprising an array of vertically supported growing trays, a growing tray manipulation system for receiving planted growing trays at the growing tray inlet port and loading them to allocated tray locations along the growing towers, and for displacing the growing trays between allocated tray locations and through treating stations within the horticulture crop growing module, and for displacing the growing trays to the growing tray outlet port.

The terms planted and planting refer collectively to the process of sowing seeds or planting young plants.

According to a second aspect of the disclosure there is a horticulture crop growing facility comprising a closed structure with a controlled environment treating system, and one or more controlled growing tray inlet/outlet ports, and comprising a plurality of horticulture crop growing modules;
  each horticulture crop growing module comprising a plurality of parallelly disposed single-rowed growing towers, each comprising an array of vertically supported growing trays, a growing tray manipulation system for receiving planted growing trays at the growing tray inlet port and loading them to allocated tray locations along the growing towers, and for displacing the growing trays between allocated tray locations and through treating stations within the horticulture crop growing module, and for displacing the growing trays to the growing tray outlet port.

According to a third aspect of the disclosure there is a horticulture crop growing module for use at a horticulture crop growing facility comprising a closed structure with a controlled environment treating system, and one or more (e.g., controlled) growing tray inlet/outlet ports; each horticulture crop growing module comprising a plurality of parallelly disposed single-rowed growing towers, each of said plurality of single-rowed towers configured to receive an array of vertically supported growing trays, a growing tray manipulation system for receiving planted growing trays at the growing tray inlet port and loading them to allocated growing towers, and for displacing the growing trays through treating stations within the horticulture crop growing module, and for displacing the growing trays to the growing tray outlet port. The single-rowed growing towers can be configured to vertically move the growing trays along/within the growing towers. The growing tray manipulation system can comprise one or both of a top tray conveying system extending above the growing towers and a bottom tray conveying system extending below the growing towers.

According to yet another aspect there is an automated horticulture crop growing system, comprising a growing tray preparation station wherein a plurality of growing trays are pre-treated, filled with a growing bed and planted, a growing tray displacing system for transferring planted growing trays from the growing tray preparation station to a horticulture crop growing facility, a closed structure with a controlled environment treating system, one or more growing tray inlet/outlet ports, and one or more horticulture crop growing modules. Each horticulture crop growing module comprises a plurality of parallelly disposed single-rowed growing towers, each of which configured to receive vertically supported growing trays and vertically move the growing trays along and within the single-rowed growing tower for transferring them between tray locations therewithin, a growing tray manipulation system comprising one or both of a top tray conveying system for loading or unloading growing trays from a top end of each growing tower, and a bottom tray conveying system for loading or unloading growing trays from a bottom end of each growing tower.

The growing tray manipulation system can be configured for receiving from the growing tray displacing system planted growing trays via the growing tray inlet/outlet port and loading them to allocated growing towers of the horticulture crop growing module, displacing the growing trays between the allocated growing towers to treating stations within the horticulture crop growing module, and unloading the growing trays by displacing them out of the horticulture crop growing facility through the growing tray inlet/outlet port.

The arrangement according to the present disclosure is such that a plurality of growing trays are autonomously introduced through the growing tray inlet port into a horticulture crop growing module and are automatically loaded into the growing towers, and wherein a growing cycle of the crops includes exposing the growing trays to treating stations including essential treatment within the growing towers and displacing the growing trays along a treating path whereby each tray is exposed to additional treatment at treating stations extending along said a treating path; whereby when the crops are ready for harvesting the growing trays are autonomously transferred from the horticulture crop growing module through the outlet port.

The treating stations can include any one or more of treatments applied along the growing cycle and configured for promoting and enhancing growth of the crops, i.e., providing ideal growth conditions, to obtain a speedy grow, healthy and highly nutritive crops. For that purpose, in some embodiments the horticulture crop growing module is further configured with an Artificial Intelligence system (AI). A plurality of sensors distributed within the horticulture crop growing module along the treating path are used for obtaining parameter signals associated with the growing cycle of the crops and with the position and state of the growing trays and treating stations. A controller is used for receiving and processing the parameter signals and generating operation signals responsive thereto, for controlling operation of the treating stations and automatic displacement of the growing trays along the growing path.

The treating stations can include any one or more of irrigation, illumination, humidity, air temperature, fertilizing/nutrition, hydrogenation, growing tray heating, radiation at different wavelength, playing sound, pollination, sterilization, etc. It is appreciated that the parameters of such treatment can be controlled e.g., controlling duration of each treatment, intensity (e.g., temperature, light wavelength, etc.). A treating station can be used for applying several treatments, e.g., fertilizing/nutrition can take place through irrigation. Heating can be applied by heating one or more of the air and irrigation liquid and the growing trays, etc.

The sensors e.g., of the AI system, can comprise any one or more of imaging sensors (for obtaining data relating to ripeness and/or health of the crop, e.g., shape, size, density, color and temperature of the crops and for identifying defected crops and pests), sugar content analyzer (e.g., Brix meter/Brix refractometer), temperature sensors, humidity sensors, chemical sensors (e.g., for measuring acidity and detecting different chemicals), etc. The AI system, is also suited for deciding, based on continuously collected parameters, when the crops have reached a harvesting state and are ready for discharging from the horticulture crop growing module.

According to a particular embodiment of the disclosure, the horticulture crop growing module comprises a growing tray manipulation system comprising a bottom tray conveying system extending below the growing towers and configured for receiving/delivering growing trays from/to the inlet/outlet port, respectively, and for conveying the growing trays to a tray loading/unloading station below at least one of the growing tower, and in some embodiments below each respective growing tower, and/or for conveying the growing trays to a growing tray lift e.g., configured for receiving the growing trays from the bottom tray conveying system and transporting them to a top tray conveying system extending above the growing towers. The top tray conveying system can be configured for conveying the growing trays to a tray unloading station above each respective growing tower.

Each one or more of the bottom tray conveying system, and the growing tray lift, and the top tray conveying system, can further be configured for conveying the growing trays to one or more treating stations extending along a growing tray conveying path. Each of the bottom tray conveying system, and the growing tray lift, and the top tray conveying system can be used for conveying growing trays at either direction.

The horticulture crop growing system can further comprise a finished produce station configured for receiving growing trays from the one or more horticulture crop growing modules, whereat growth is harvested, packed and stored at appropriate conditions, ready for delivery/shipment, at an automated, hands-free handling station.

According to a fourth aspect of the disclosure there is a horticulture crop growing method, used in conjunction with a horticulture crop growing module according to the present disclosure, comprising the following steps:

i. Receiving a plurality of planted growing trays into the horticulture crop growing module through the inlet port and loading them onto a bottom tray conveying system;

ii. Loading the growing trays from the bottom tray conveying system into the growing towers;

iii. Commencing a growing cycle wherein the growing trays are circulated between a plurality of treating stations disposed within the horticulture crop growing module;
iv. Monitoring and obtaining data associated with each growing tray and relating to ripeness and/or health of the crops growing on the growing trays;
v. Repeating steps iii and iv until crops are at harvesting state;
vi. Conveying the growing trays from the growing towers to the outlet port for collecting the growing trays.

Any one or more of the following features, designs and configurations can be applied to any one or more of the different aspects of the present disclosure, separately or in various combinations thereof:

The horticulture crop growing system can be received within a closed, treated environment location; The term treated environment refers to a clean environment, free of pesticides or any biological material, humidity and temperature controlled etc.;
The horticulture crop growing facility can be received within a closed, treated environment location;
The horticulture crop growing module can be received within a closed, treated environment location;
The growing tray preparation station can be received within a closed, treated environment location;
Prior to a growth cycle, the growing tray preparation station, the growing trays and the horticulture crop growing facility can be pre-treated to disinfect the vicinity and gear;
The one or more growing tray inlet port and the growing tray outlet port of the horticulture crop growing facility can be a uniform opening, or a dedicated opening for each of the inlet port and the outlet port, with a controlled door for maintaining the controlled environment at the vicinity of the facility;
The horticulture crop growing facility can be compartmented, wherein each horticulture crop growing module is received within a compartment, each of which is a controlled environment;
The growing towers are each configured with a growing tray support system, for retaining the trays vertically aligned wherein a duty, bottom most growing tray, is arrested by a tray arresting mechanism at a bottom portion of the support system, and wherein each consecutive growing tray is supported over another growing tray, however readily displaceable to move along the tower;
The growing tray manipulation system can comprise one or both of a top tray conveying system for loading growing trays into (or for unloading them from) the growing towers from a top end of each growing tower, and a bottom tray conveying system for loading growing trays into (or for unloading them from) the growing towers from a bottom end of each growing tower, respectively;
The growing tray manipulation system is configured for deploying growing trays into the growing towers and for transporting growing trays between the treating stations and the growing towers of the horticulture crop growing modules;
An illumination system can be configured for illuminating each growing tray;
The illumination system can be disposed on tray support rails of the growing tower, and/or at a bottom face of the growing trays;
The tray support rails define a sliding path wherein trays within a growing tower are slidingly displaceable there along, owing to gravitational force;
Irrigation can be applied to the growing trays at a cascade configuration, wherein irrigation is applied to one or more top growing trays at a growing tower, and irrigation liquid flows to growing trays below one another by gravitation;
Irrigation can be applied by drip irrigation to the topmost growing tray;
The growing trays can be configured with an irrigation inlet port disposed at a top portion thereof, and an irrigation outlet port disposed at a bottom portion thereof, with an irrigation flow path extending between said ports;
A normally closed valve can be provided at the irrigation outlet port of the growing trays, said valve configured for opening by a valve opening member configured at an inlet port of a neighboring bottom growing tray, only upon stacking the growing trays on top of one another within the growing towers;
One or both of the irrigation inlet port and the irrigation outlet port can be configured with a filtering arrangement to prevent growing bed material from drifting between growing trays;
The valve can be associated with the filtering arrangement, whereby liquid arriving at the valve is filtered;
A bottommost growing tray within a growing tower can be selectively engaged by a valve opening mechanism configured for opening the valve of the irrigation outlet port of said bottommost growing tray when disposed over said valve opening mechanism;
A bottommost growing tray within a growing tower can be disposed over a drainage container, and wherein a valve opening mechanism is configured for opening the valve of the irrigation outlet port of said bottommost growing tray when disposed over said drainage container;
The drainage container can be configured for treating the irrigation liquid (e.g., filtering, adding nutrition ingredients, treating water hardness, temperature regulating, etc.) and for recycling the irrigation liquid to the topmost growing tray;
Drainage containers within a horticulture crop growing module can be in flow communication with one another, or a common drainage container can be configured for two or more growing towers of the horticulture crop growing module;
Drained irrigation liquid from one or more of the growing towers within the horticulture crop growing module can be directly collected to an external irrigation liquid treating station;
Drained irrigation liquid from one or more of the growing towers within the horticulture crop growing module flow by gravity along growing trays within a growing tower, and after flowing through all growing trays within the tower the irrigation liquid flows to an irrigation liquid treating station, within or outside of the growing module, whereat the irrigation liquid is recycled after analyzing and treating, i.e., cleaned, adding nutrients and minerals, treating hardness and pH, etc.;
Each growing tray can be configured with a readable identifier e.g., a tray ID code, such as bar code, QR code, color code, RFID, digital code, etc., whereby tray data associated with each growing tray can be registered at the controller;

Tray data can include data relating to the location and status of the growing tray, and/or data concerning the growing cycle of the crops growing on said growing tray;

Data from sensors and control signals can be transmitted to an external control station (e.g., wirelessly and/or over a serial/parallel data bus);

An alert signal can be generated upon detecting of malfunction of the system and detection of unusual parameters along the growing cycle of the crops;

The growing towers are configured for accommodating a vertical stack of growing trays, supported between side bars, wherein a bottom most growing tray is arrestable by a tray arresting mechanism, wherein consecutive growing trays are disposed on top of one another, whereby disengaging the bottom most tray from the tray arresting mechanism facilitates loading of the bottom most tray onto the bottom tray conveying system, and further entailing downward shifting of the growing trays within the growing tray, under force of gravity;

The bottom tray conveying system can be implemented by a pair of conveyor chains disposed parallelly and configured for bearing opposite sides of a bottom surface of the growing trays;

A light illuminating device can be associated with each growing tray within the growing tower;

The light illuminating device can be articulated to the side bars of the growing tower;

Each growing tray can be illuminated from two sides:

A tray arresting mechanism is configured at a bottom portion of the growing tower, said tray arresting mechanism is manipulable between a normally tray arresting position, wherein one or more obstructing elements project into a space below a bottom most growing tray, and a disengaged position wherein the one or more obstructing elements are contracted from said space, thus facilitating a bottom most growing tray to displace from the growing tower;

The one or more obstructing elements of the tray arresting mechanism can be driven by different mechanisms, e.g., solenoid, cam-and-follower, hydraulic/pneumatic piston, electric motor, etc.;

the tray arresting mechanism of the growing towers within a horticulture crop growing module can be configured for simultaneous operation, whereby all tray arresting mechanisms within the horticulture crop growing module simultaneously shift between their respective tray arresting position and disengaged position, or the tray arresting mechanisms can shift upon a command signal received from a controller, wherein any one or more tray arresting mechanism can be individually operated;

According to a particular example, the tray arresting mechanism comprises an activating rod rotatably secured at a bottom portion of the horticulture crop growing module and configured with threaded portions disposed adjacent each growing tower; a plurality of threaded riders, at least one associated with each growing tower; each rider engaged over each threaded portion and restrained for axial displacement along the activating rod; and wherein each rider comprises a tray engaging member; whereby rotating the threaded rod in one direction entails simultaneous axial displacement of the riders into their tray arresting position, and rotating the threaded rod in an opposite direction entails simultaneous axial displacement of the riders into their disengaged position;

The tray engaging member can be a pin projecting from the rider and configured for arresting within an opening at a bottom portion of the bottom most tray;

The tray arresting mechanism can comprise a pair of facing pins, whereby at the tray arresting position said pins displace towards one another, and at the disengaged position said pins displace away from one another;

The growing trays can be solid trays made of metal or plastic material, having a flat growing portion and two parallel upright side frames disposed at opposite side ends of the tray, wherein growing trays within a growing tower are configured such that a bottom surface of a top growing tray bears over the side frames of a neighboring bottom growing tray;

A valve opening member (for opening normally closed valve at a top growing tray) is configured at an upright side frame of the neighboring bottom growing tray;

The growing trays can be engaged by the growing tray lift at a bottom of the trays or at the upright frame thereof;

The upright side frames of the growing trays can be configured with an engaging recess, and the top tray conveying system can be configured with two side rails each accommodating a plurality of pickup hooks, displaceable along the side rails, and configured for selective arresting with said engaging recesses;

The two side rails of the top tray conveying system can be fixed over the growing towers within the horticulture crop growing module, wherein engaging with one or more trays takes place upon displacing growing trays upwards towards said side rails;

Harvesting the crops can be selective, whereby only crops reaching a predefined (e.g., maturity) stage are harvested;

The horticulture crop growing module can be comprise a growing tray propelling unit configured for ascending or descending a bottom duty growing tray from/to a bottom tray conveying system into/from a respective growing tower;

Each growing module can be configured as an autonomous growing module, independent of other growing modules, and being self-supplied with all the necessary elements for obtaining a growing cycle, including an inlet/outlet port and a confined controlled environment;

The top tray conveying system can be fitted also for conveying growing trays to and from an outlet/inlet port.

The growing trays can comprise a perforated trough element configured to sprinkle irrigation liquids received from the irrigation inlet port.

The horticulture crop growing module can comprise an irrigation station configured to supply irrigation liquids to growing trays introduced thereinto via their irrigation inlet port.

The irrigation station can be configured to drain residual irrigation liquids accumulated in the growing trays via their irrigation outlet port.

The irrigation station can comprise a tilting mechanism configured to drain the residual liquids.

The bottom tray conveying system can comprise one or more rails extending below the growing towers, and a frame structure configured to move along the one or more rails and transfer or receive a growing tray from a selected one of the growing towers.

The frame structure can comprise a manipulator unit configured to engage the tray arresting mechanism of the growing tower and controllably change it between the tray arresting position and the disengaged position.

The frame structure can comprise a lift assembly configured to transfer a growing tray thereby carried to the growing tower, or receive a growing tray from the growing tower.

The horticulture crop growing module can be configured to change the tray arresting mechanism to its disengaged position when transferring the growing tray to the growing tower, and thereafter to change the tray arresting mechanism back to its tray arresting position for securing the transferred growing tray in a bottommost tray-location of the growing tower.

The horticulture crop growing module can be configured to change the tray arresting mechanism to its disengaged position when receiving the growing tray from the growing tower, and thereafter to change the tray arresting mechanism back to its tray arresting position for securing a downwardly translated growing tray in a bottommost tray-location of the growing tower.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5A is an enlargement of the portion marked 5A in FIG. 4A;

FIG. 5B is an enlargement of the portion marked 5B in FIG. 5A;

FIG. 5E is a bottom perspective view of the portion illustrated in FIG. 5B;

FIG. 8B is an enlarged view of the portion marked 8B in FIG. 8A;

FIG. 8C is an enlarged view of the portion marked 8C in FIG. 8A;

FIGS. 22A to 22H show an irrigation arrangement of other possible embodiments;

FIGS. 23A to 23C show a draining arrangement of possible embodiments;

FIGS. 27A and 27B demonstrate crop monitoring arrangement of possible embodiments.

DETAILED DESCRIPTION OF EMBODIMENTS

Figure 1A:
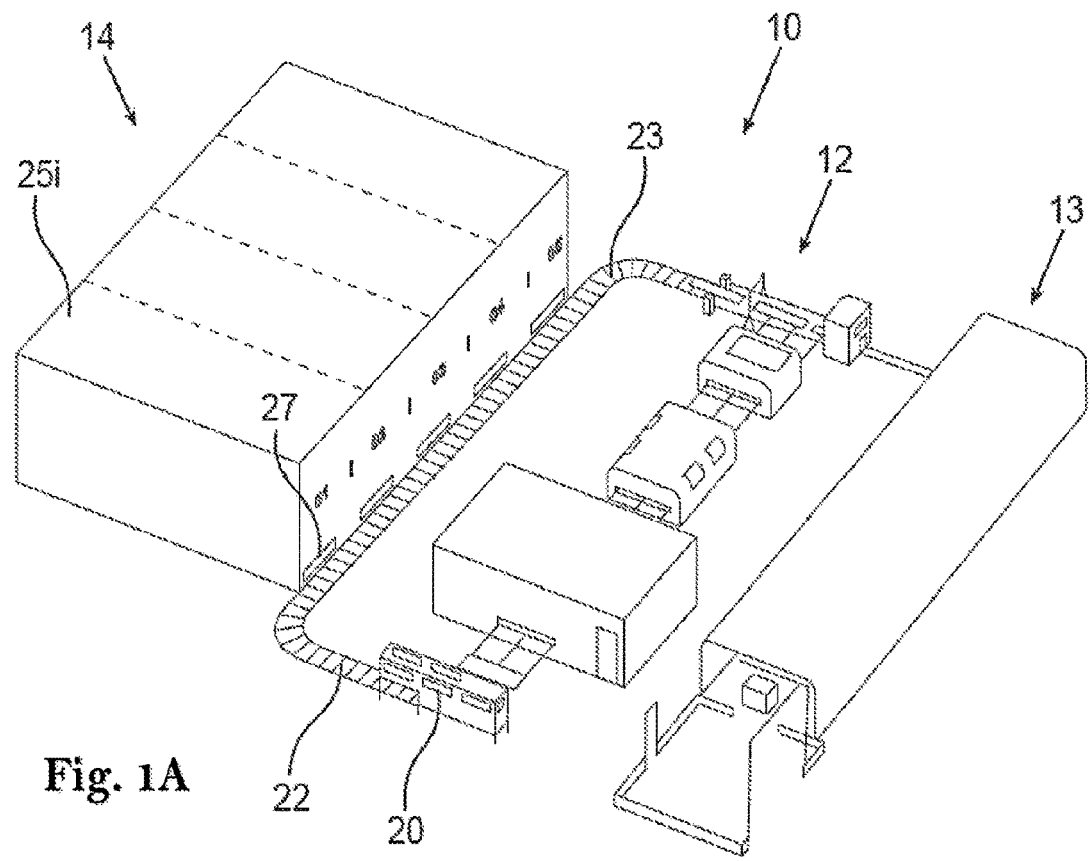
FIG. 1A is a schematic representation of a horticulture crop growing system according to an example of the present disclosure.
Figure 1B:
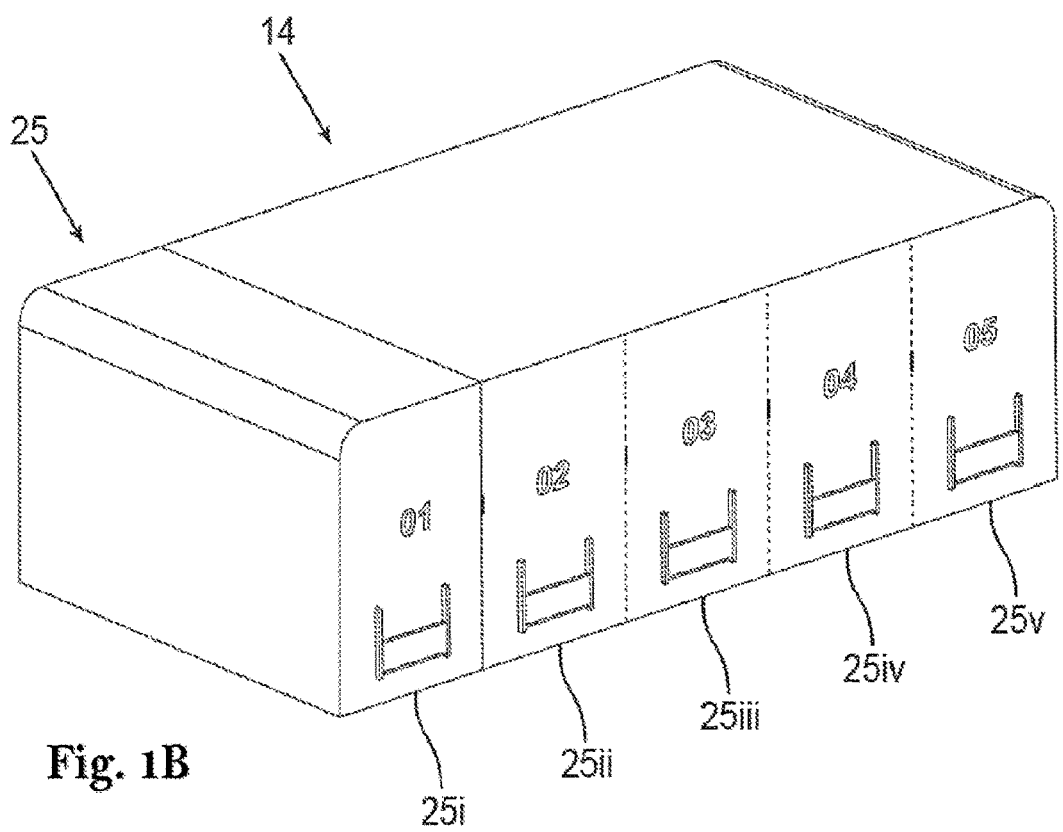
FIG. 1B illustrates a horticulture crop growing facility seen in the horticulture crop growing system of FIG. 1A.
Figure 2A:
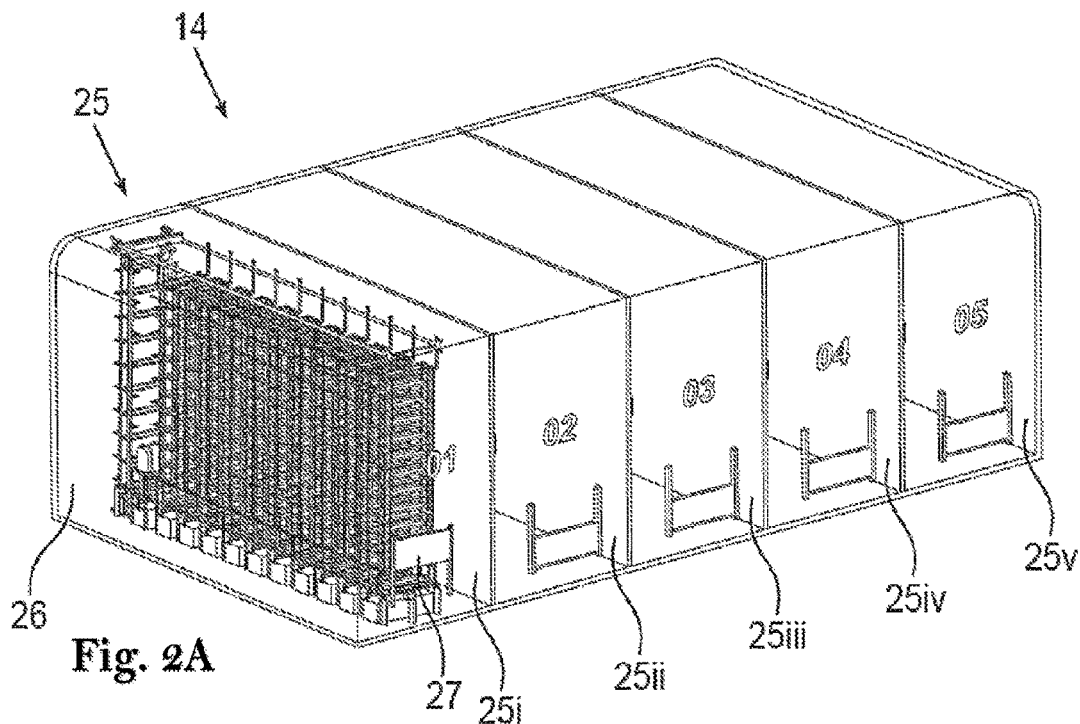
FIG. 2A illustrates the horticulture crop growing facility of FIG. 1A, with its walls made transparent for visualizing interior thereof and exposing a horticulture crop growing module.
Figure 2B:
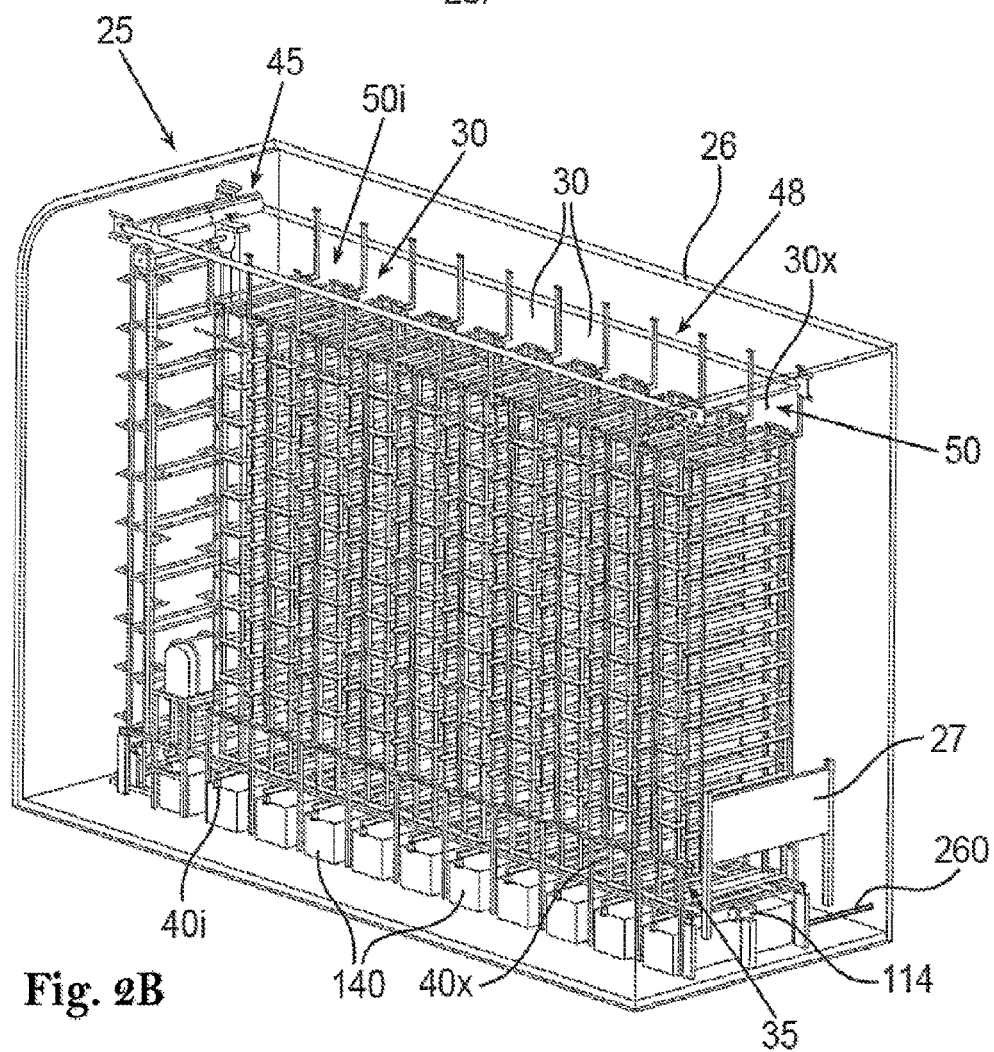
FIG. 2B is an enlargement of the horticulture crop growing module portion seen in FIG. 2A.
Figure 3A:
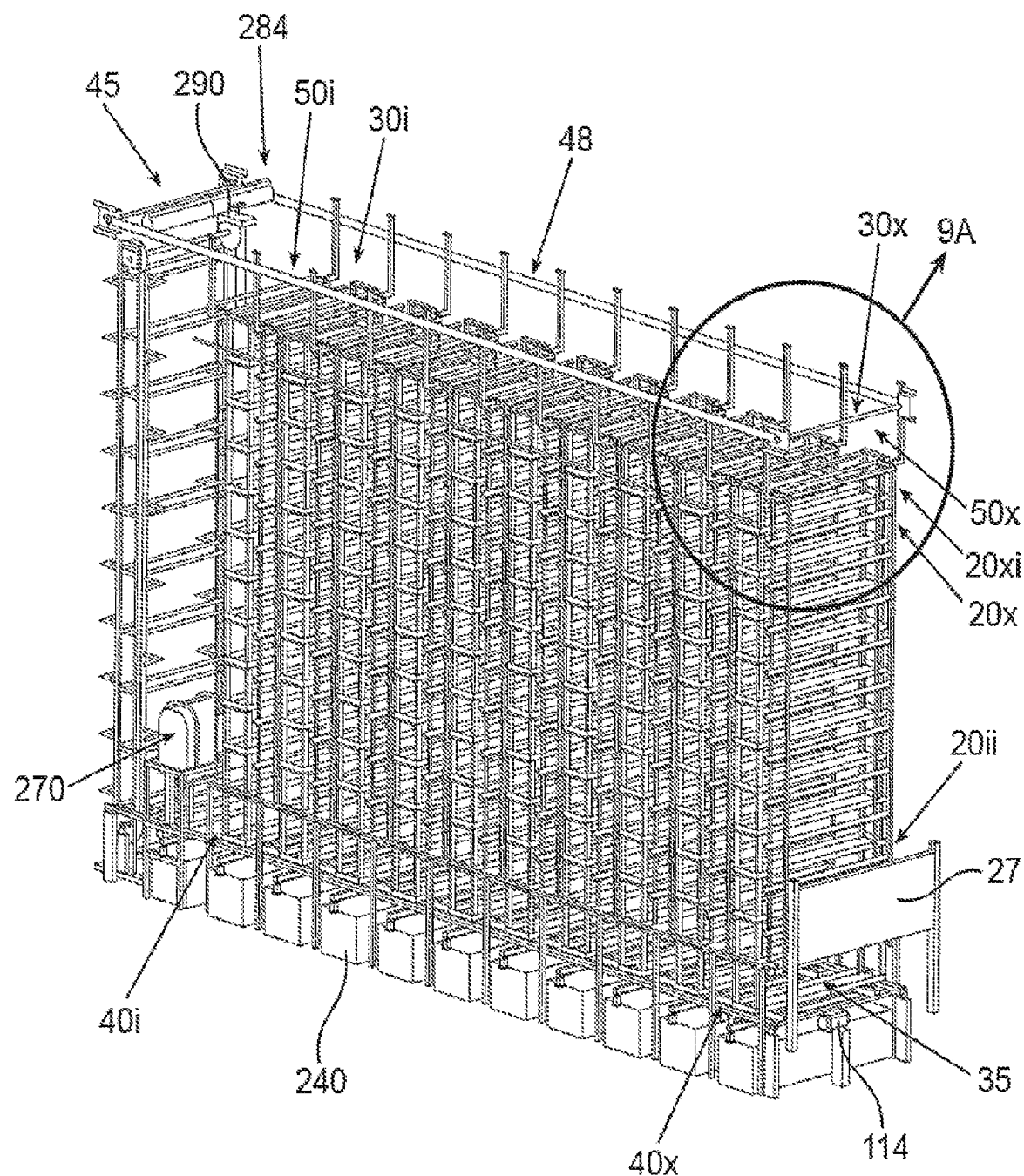
FIG. 3A is a front, right, perspective view of the horticulture crop growing module seen in FIG. 2B, with walls removed.
Figure 3B:
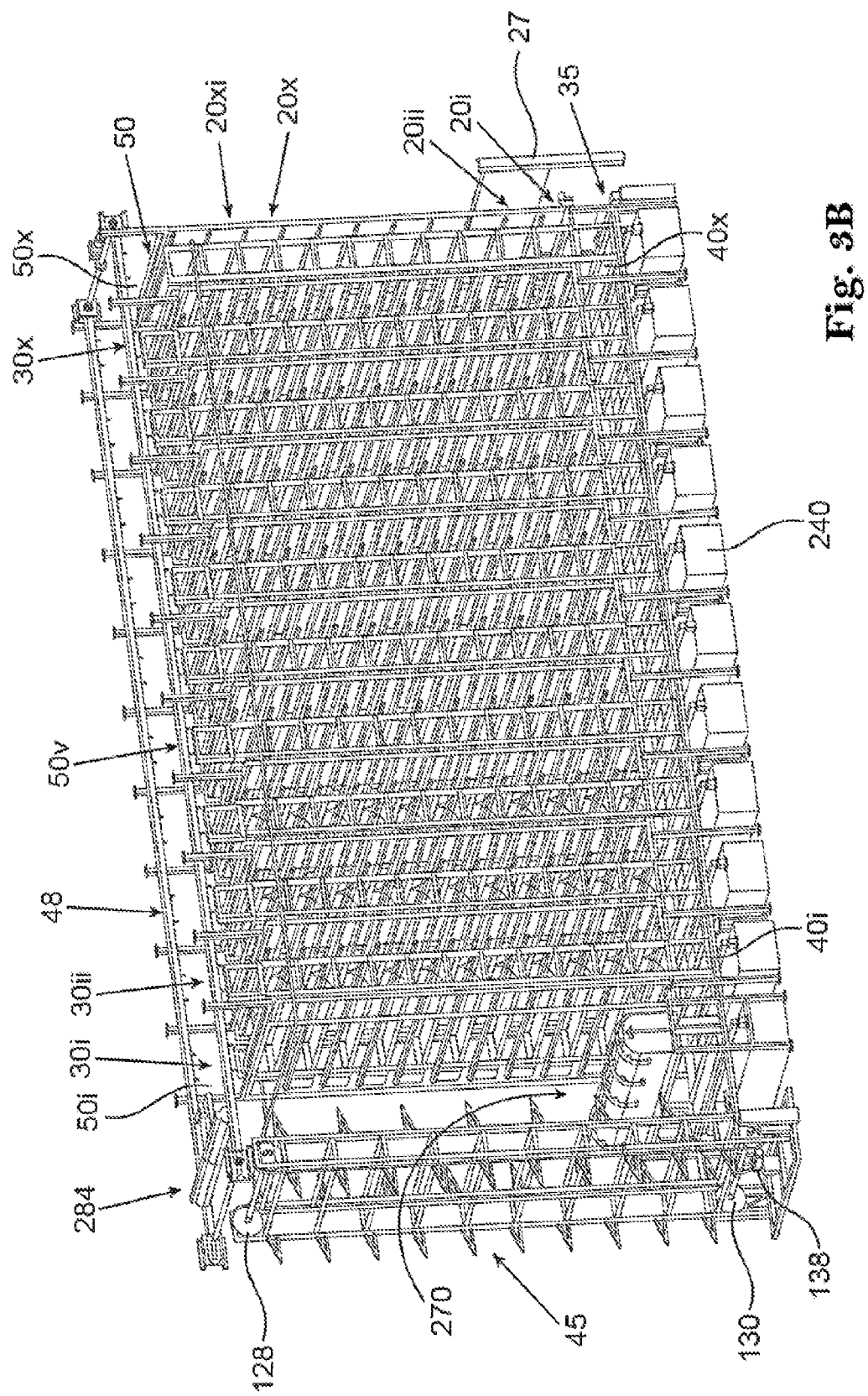
FIG. 3B is a front, left, perspective view of the horticulture crop growing module seen in FIG. 3A.

Attention is first directed to FIG. 1A of the drawings schematically illustrating a horticulture crop growing system according to an example of the disclosure, generally designated 10. The horticulture crop growing system 10 comprises a growing tray preparation station generally designated 12, a finished produce station generally designated 13, and a horticulture crop growing facility generally designated 14.

The growing tray handling and preparation station 12 is a closed, typically a treated environment, configured for cleaning and disinfecting growing trays, applying a growing media (i.e., any type of treated growing soil, natural or artificial, or a mixture thereof) and applying of growing material i.e., planting or sowing. The term 'treated environment' refers to a clean environment, substantially free of pesticides or any biological material, humidity and temperature controlled etc.

Once ready, a plurality of growing trays 20 are deployed from the growing tray preparation station 12 and are conveyed over a conveying system 22 towards the horticulture crop growing facility 14. It is appreciated that the conveying system 22 can be a closed environmental system (i.e., extending through a treated environment), or the horticulture crop growing system 10 at its entirety can be received within a treated environment.

The horticulture crop growing facility 14, is a closed structure, comprising one or more (five in the present example) horticulture crop growing modules generally designated 25 numbered $25_i$ to $25_v$, each of which being a separate treated environment. Each horticulture crop growing module 25 comprises a growing tray inlet/outlet port 27, fitted with a (e.g., guillotine-type) door, displaceable between a closed position and an open position facilitating inlet/outlet of a growing tray 20 therethrough. In the following figures the walls 26 of the horticulture crop growing module 25 have been removed for sake of clarity.

It is appreciated that each growing module can be configured as an autonomous growing module, independent of other growing modules, and being self-supplied with all the necessary elements for obtaining a growing cycle, including an inlet/outlet port and a confined controlled environment, as will be discussed hereinbelow.

Each horticulture crop growing module 25 is configured with a plurality of single-rowed growing towers generally designated 30, each configured for receiving an array of vertically supported growing trays 20. The horticulture crop growing module 25 is further configured with a growing tray manipulation system for receiving planted growing trays 20 at the growing tray inlet port 27 and loading them to allocated tray locations at the growing towers 30, and for displacing the growing trays between allocated tray locations and through treating stations within the horticulture crop growing module, and for displacing the growing trays to the growing tray outlet port, to be explained herein after in greater detail. In the present example each horticulture crop growing module 25 comprises ten growing towers designated $30_i$ to $30_x$.

The growing tray manipulation system is configured with a bottom tray conveying system generally designated 35 extending below the growing towers 30 and configured for receiving/delivering growing trays 20 from/to the inlet/outlet port 27, and for conveying the growing trays 20 to a tray loading/unloading station generally designated 40 (numbered with the same index $40_i$ to $40_x$, as of the respective growing tower) below each growing tower $30_i$ to $30_x$. The bottom tray conveying system 35 is further designed for conveying the growing trays 20 to a growing tray lift, generally designated 45, positioned at an opposite end of the horticulture crop growing module 25 and configured for receiving the growing trays 20 from the bottom tray conveying system 35 and transporting them to a top tray conveying system, generally designated 48, extending along the horticulture crop growing module 25 and above the growing towers $40_i$ to $40_x$, wherein the top tray conveying system 48 is configured for conveying the growing trays 20 to a tray unloading station 50 above each respective growing tower, generally designated 50 (numbered with the same index $50_i$ to $50_x$, as of the respective growing tower), as will be explained hereinafter. According to another example of the disclosure, the top tray conveying system 48 can be fitted also for conveying growing trays to and from an outlet/inlet port, said outlet/inlet port can be a single port or an auxiliary port, i.e., configured in addition to port 27.

Figure 11A:
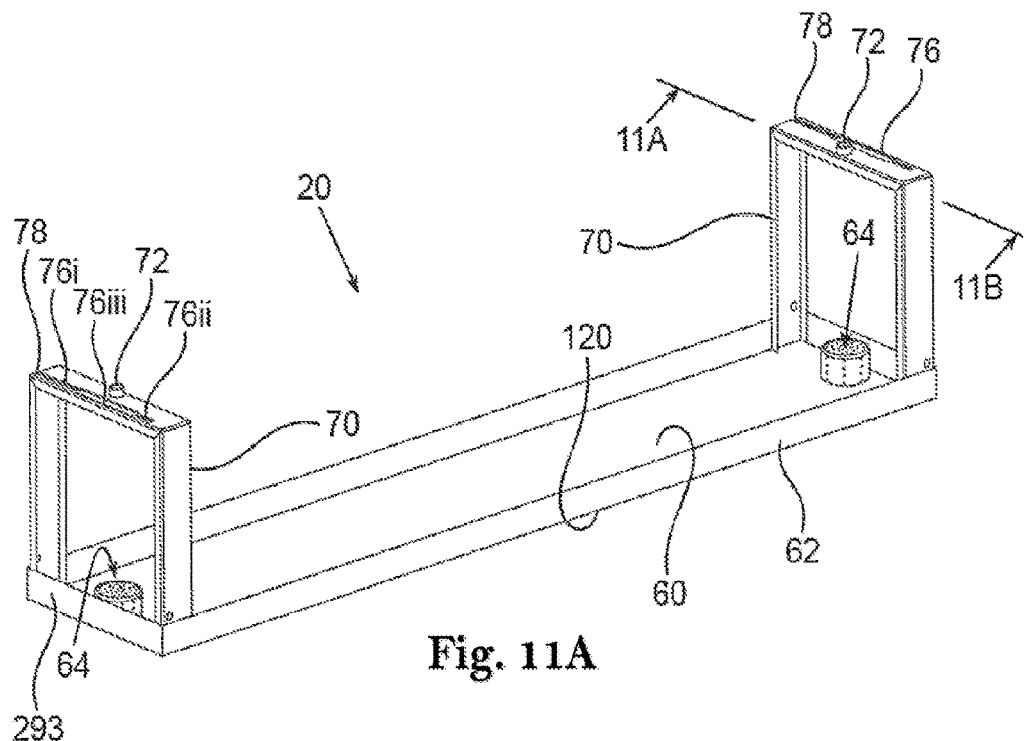
FIG. 11A is a perspective view of a growing tray according to an example of the disclosure.
Figure 11B:
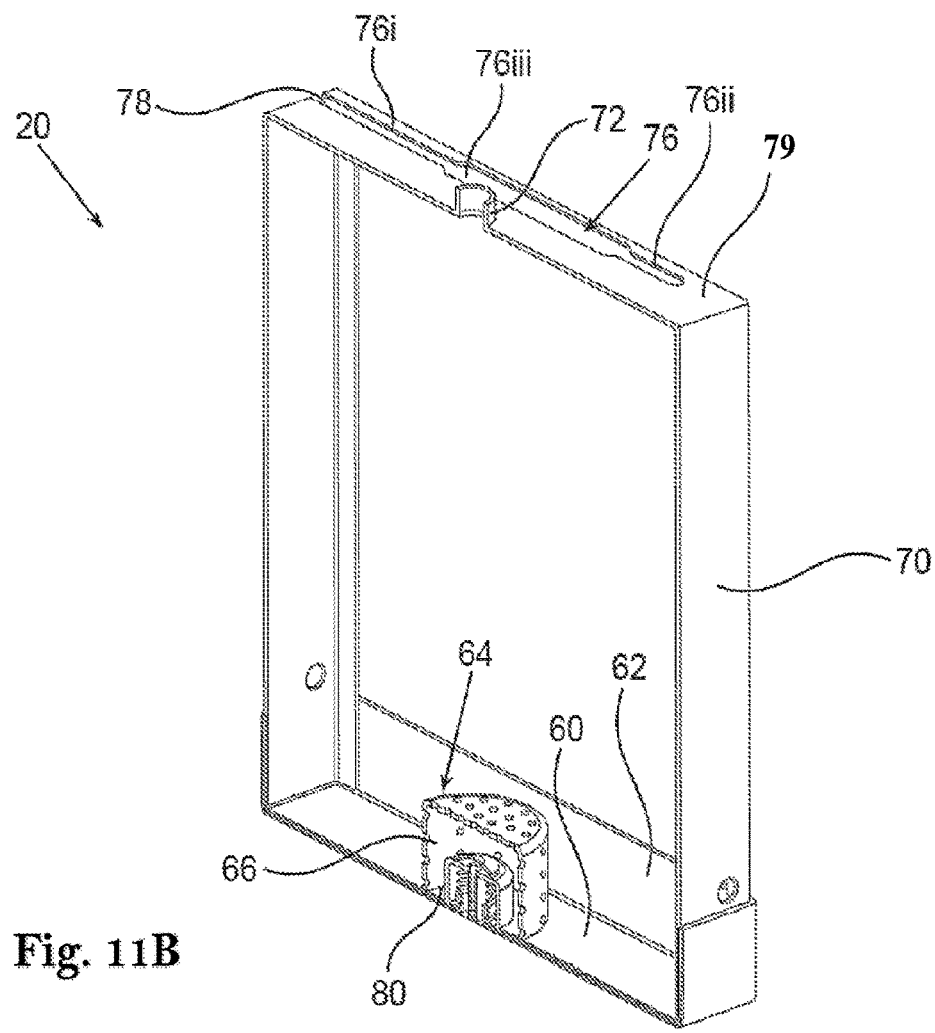
FIG. 11B is a vertical section along line 11B-11B in FIG. 11A.

Further attention is directed to FIGS. 11A and 11B illustrating a growing tray 20 comprising a tray-like portion 60 with a peripheral side wall 62 configured for receiving a growing media (not shown in the Figs.), and configured with two normally closed valves 64 each disposed near a respective end of the growing tray 20 and covered by a screen-cover 66, to prevent soil or growing media from malfunctioning valve operation as will be discussed hereinafter. The growing tray 20 is further configured at its respective ends with a frame support 70, fitted at a center, top-most portion thereof with a valve manipulating hollow tubular segment 72, and an engaging recess 76 along the top bar 79 of the frame 70, with an opening 78 defining a pickup hook engagement opening. It can be seen that the engaging recess 76 has a first narrow section $76_i$, a second narrow section $76_{ii}$ and an intermediate wider section $76_{iii}$ connecting between the first and second narrow sections, $76_i$ and $76_{ii}$.

Figure 7A:
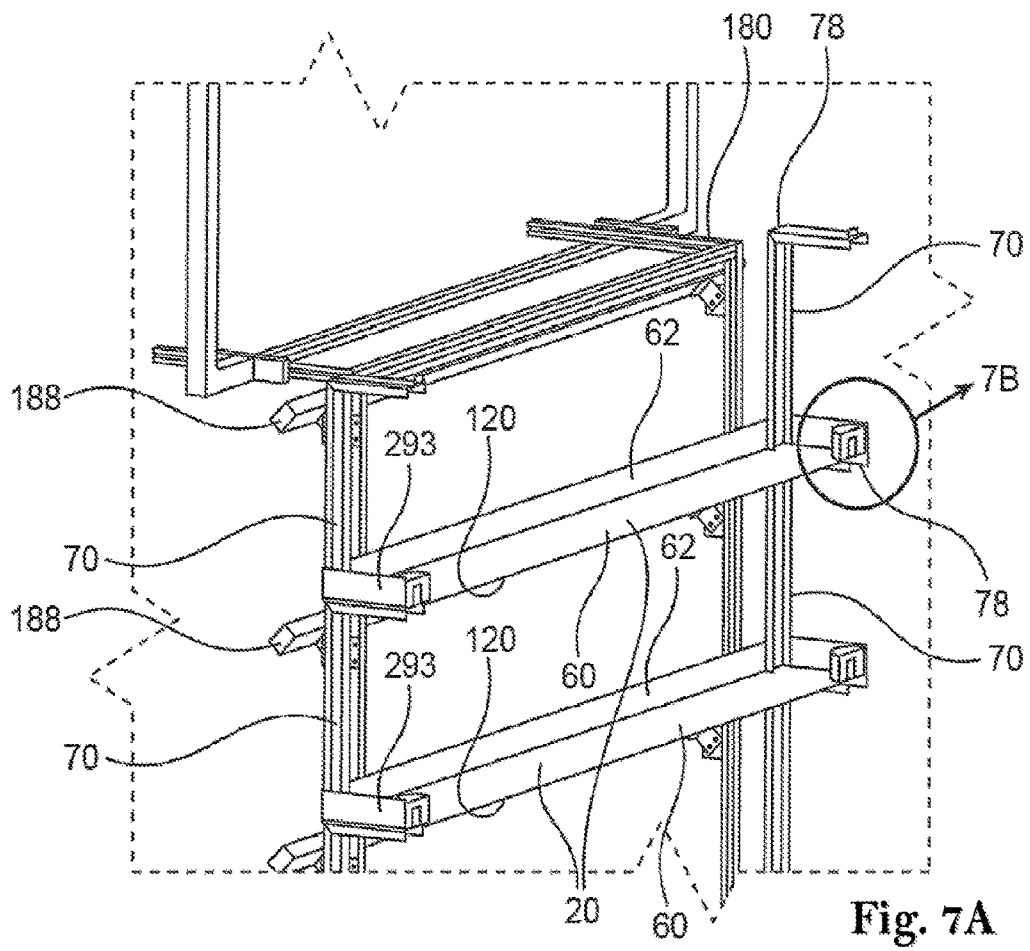
FIG. 7A is a vertical section along line 7A-7A in FIG. 4D
Figure 7B:
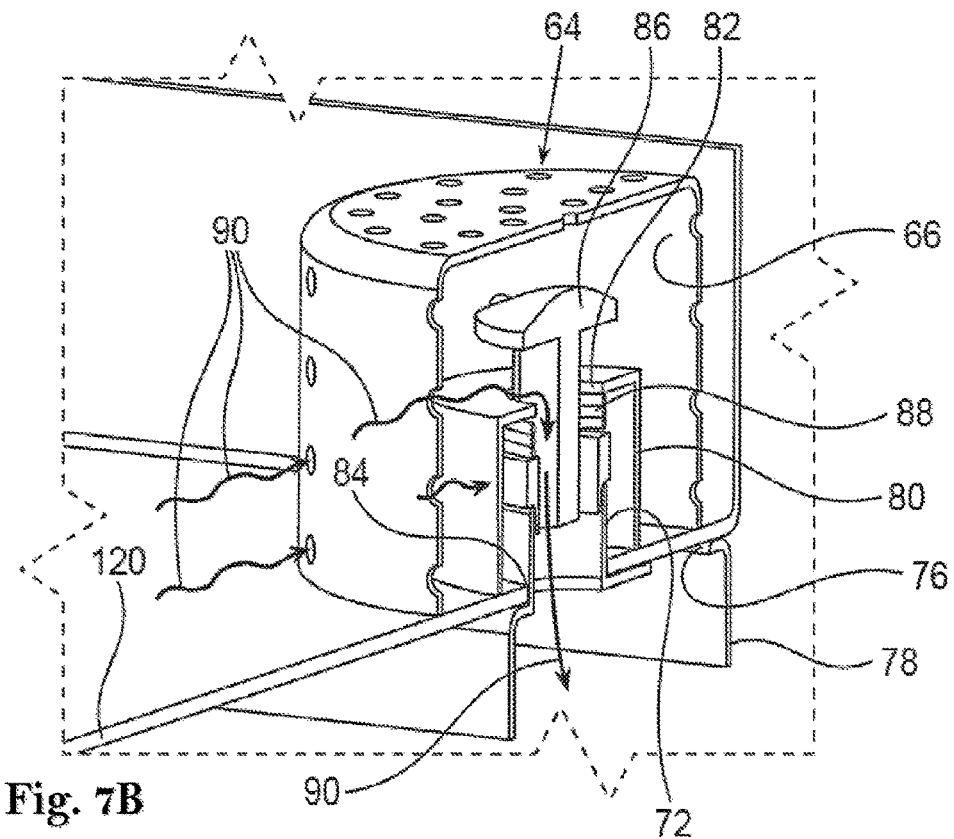
FIG. 7B is an enlarged view of a valving system seen in the portion marked 7B in FIG. 7A, the valve at its open position.
Figure 7C:
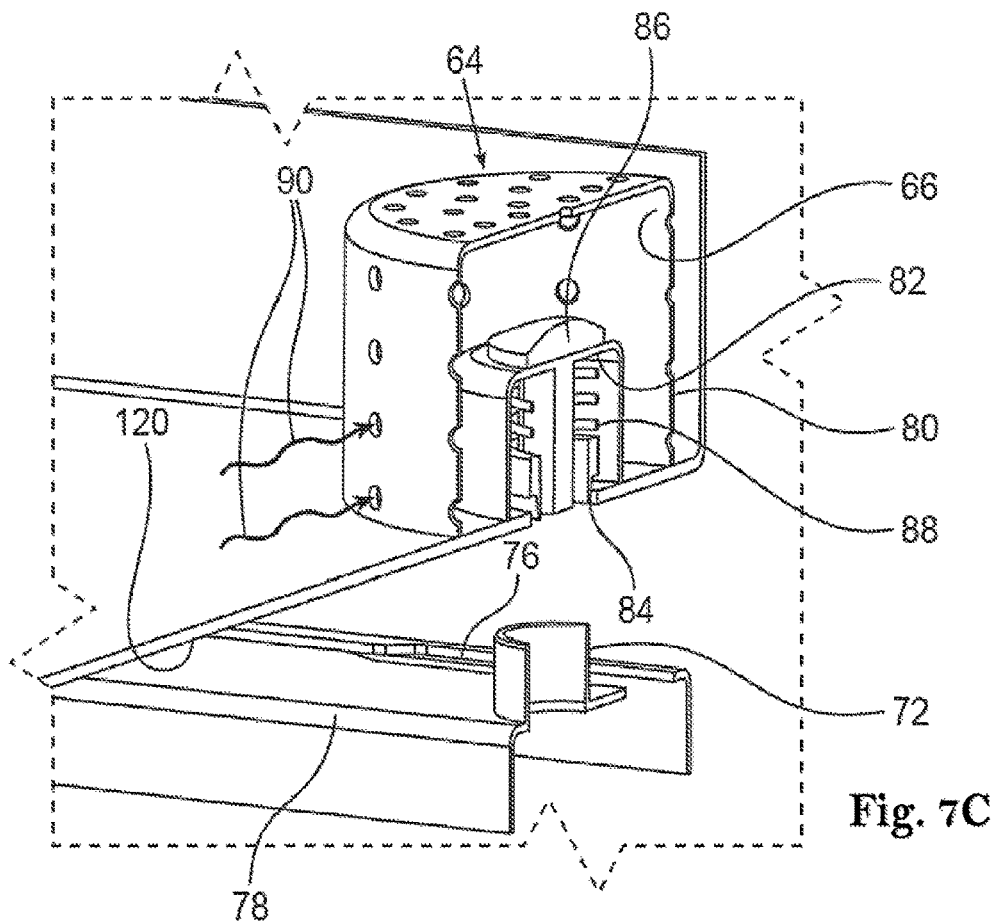
FIG. 7C is the same as FIG. 7B, with the valve at a closed position.
Figure 7D:
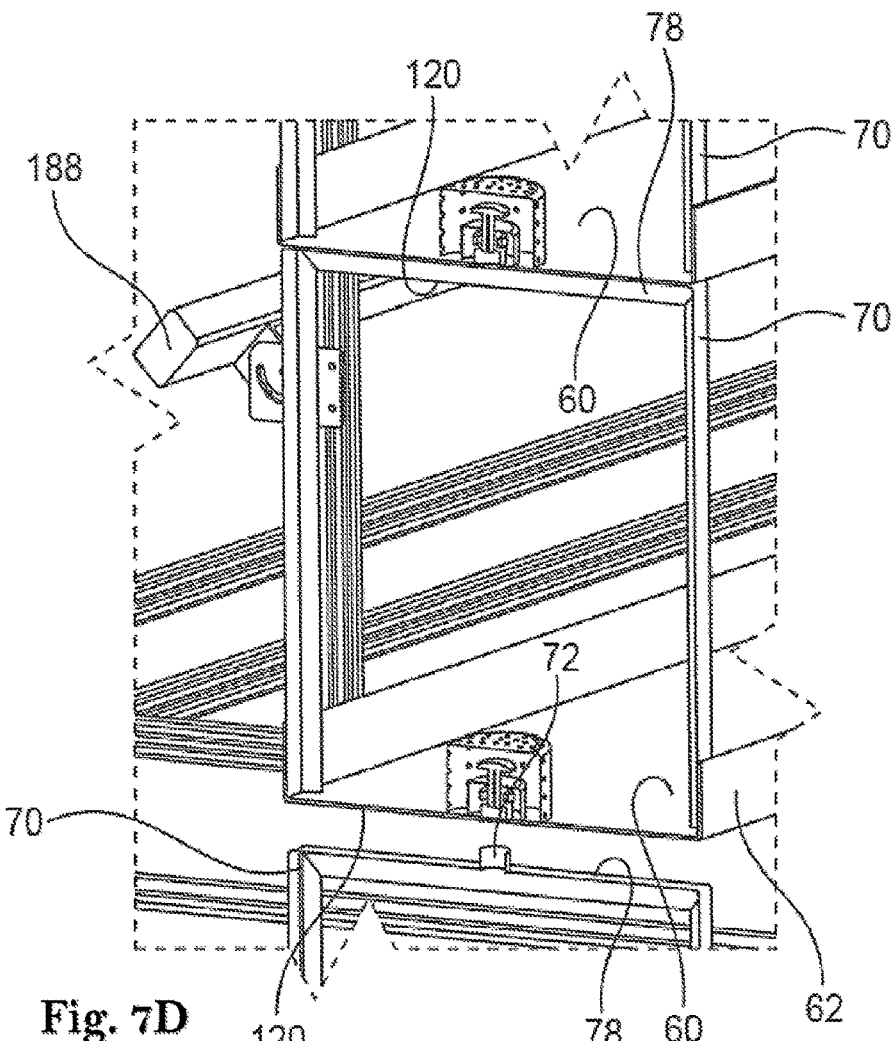
FIG. 7D is a vertical section along line 7D-7D in FIG. 4C.
Figure 8A:
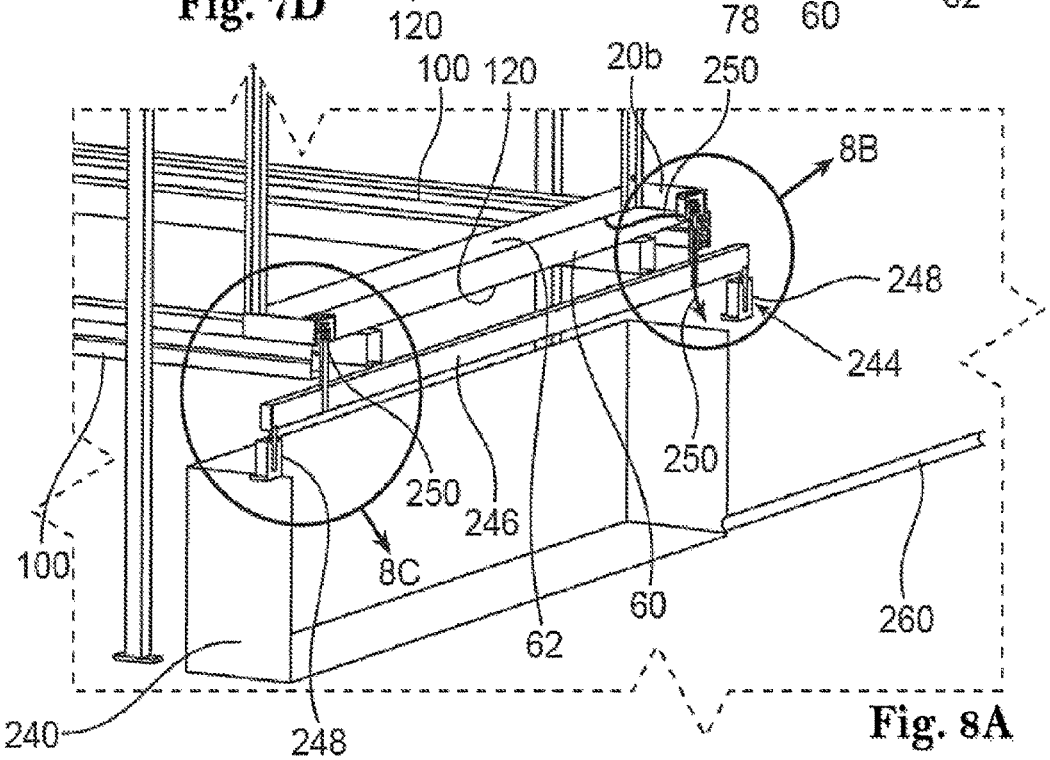
FIG. 8A is a vertical section along line 8A-8A in FIG. 4C.

As can be further seen, best in FIGS. 7B, 7C, 7D, 8B, 8C and 11B) the valve 64 comprises a tubular housing 80 with a top inlet opening 82 extending to a bottom outlet opening 84, with a sealing mushroom-like plunger 86 biased by a coiled spring 88 into a normally closed position (FIG. 7C). Thus, the arrangement is such that the valve 64 is normally sealed when the plunger 86 sealingly bears over the top inlet opening 82, and however displaces into an open position (e.g., see FIGS. 7B and 8B) upon penetration of a valve manipulating hollow tubular segment 72, of a neighboring bottom tray, into the bottom outlet opening 84, thus displacing the plunger 86 into the open position, disengaged from the top inlet opening 82, wherein liquid can flow from the top tray along arrowed lines 90 (see FIG. 7B) into the tubular segment 72 and down to the neighboring bottom tray, as will further discussed hereinafter.

Further attention is now directed to elements of the tray manipulation system. Referring first to the bottom tray conveying system 35 (see e.g., FIGS. 4A, 4C, 5B, 8B and 8C) there is a pair of parallelly extending support rails 100, each in the form of a double hollow profile accommodating an endless tray conveying belt 102, wherein a top portion of the belt 102 slightly projects through a recess 106 at a top one of the hollow profiles, and wherein the conveying belt 102 is tensioned over an idle pulley 107 (see FIGS. 4C and 5C) and a driving pulley 108 secured over a pulley rod 110 which in turn is engaged with an electric motor 114. The arrangement is such that a bottom surface 120 of a bottom transit growing tray $20_b$, bears overs the conveying belt 102

(projecting through the hollow profile), whereby displacing the conveying belt 102 (upon rotating the motor 114 in either direction) entails corresponding linear displacement of the bottom transit growing tray $20_b$ between locations along a path extending between an inlet/outlet station adjacent the inlet/outlet port 27 and a growing tray lift position adjacent the growing tray lift 45. It should be appreciated that an outside surface of the conveying belt 102 and/or the bottom surface 120 of the growing trays 20 can be configured with a friction enhancing arrangement.

Next sub-assembly, part of the tray manipulation system, is the growing tray lift generally designated 45, disposed adjacent a distal end of the bottom tray conveying system 35 and configured for receiving therefrom a tray at a time and elevating it towards the top tray conveying system 48.

Figure 5C:
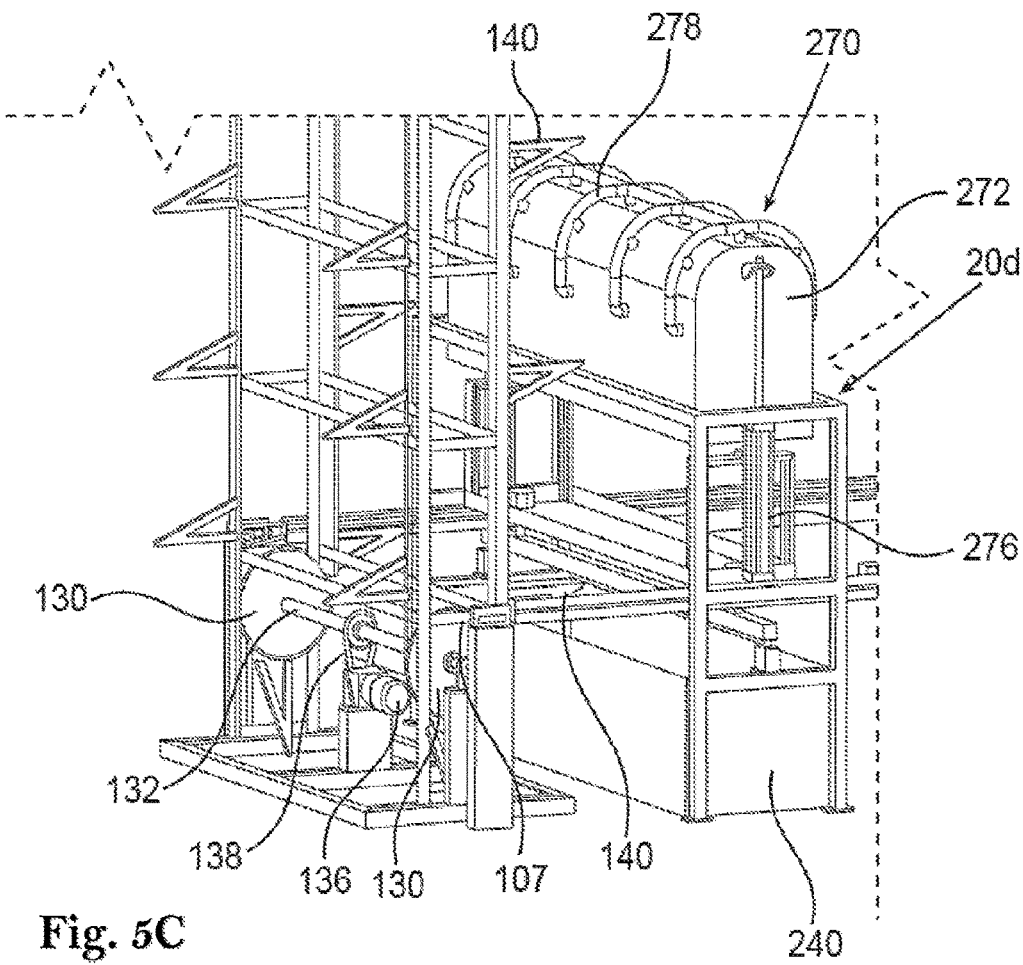
FIG. 5C is a left side perspective view of the portion illustrated in FIG. 5B.
Figure 5D:
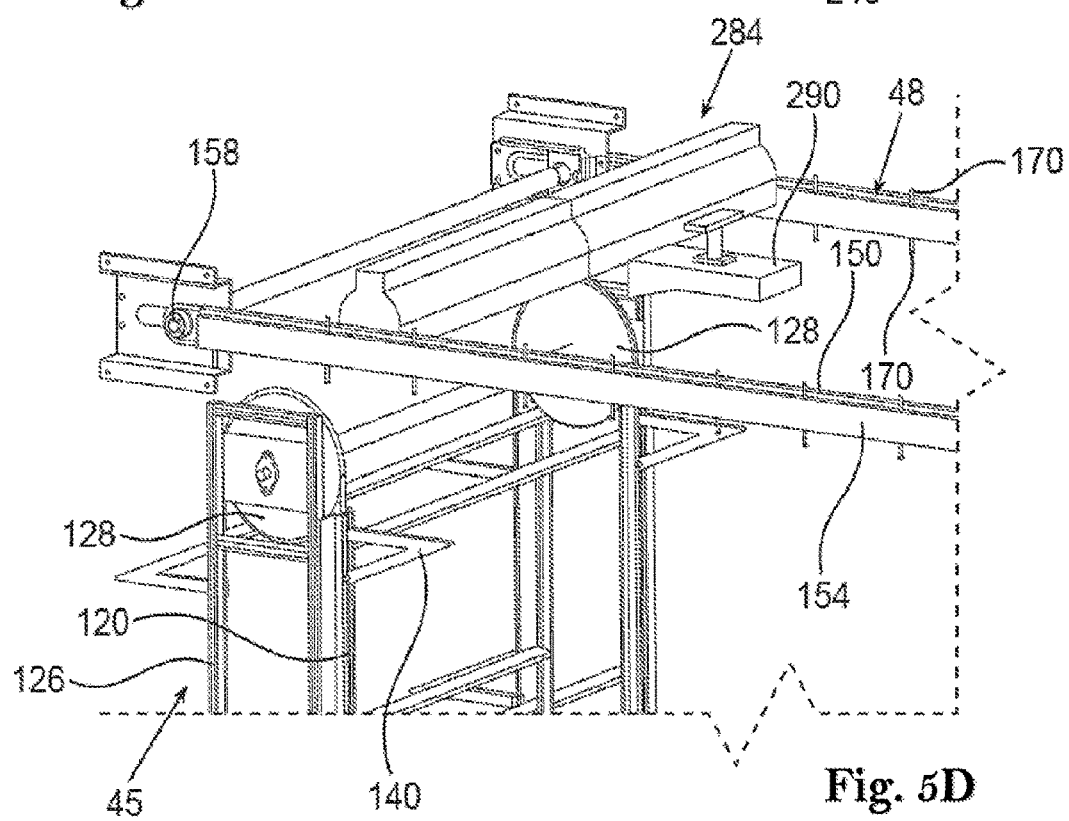
FIG. 5D is an enlargement of the portion marked 5D in FIG. 5A.
Figure 6:
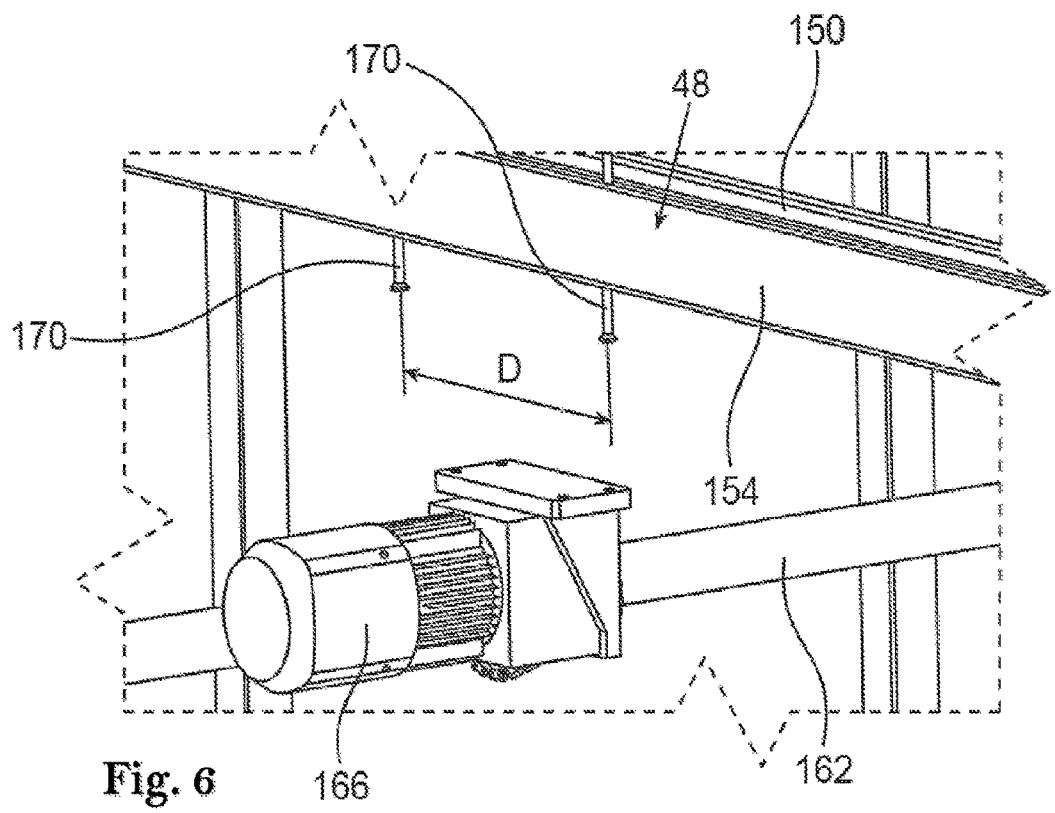
FIG. 6 is an enlargement of the portion marked 6A in FIG. 4D.

With reference to FIGS. 5A, 5C and 5D, the growing tray lift 45 comprises an endless belt 120 supported by a ladder-like rigid frame structure 126, said endless belt 120 tensioned between a pair of top, idle pulleys 128, coaxially coupled to the frame 126, and a pair of bottom, driving pullies 130 coaxially mounted on an axle 132, which in turn is coupled to an electric motor 136 via chain 138 (see FIG. 5C). A plurality of pairs of growing tray support arms 140 are fixedly secured to the endless belt 120 and are displaceable in a carousel-like fashion about the frame 126, as the endless belt 120 is rotated by motor 136. The growing tray support arms 140 are configured such that when a pair of arms are disposed at a tray collecting position, they extend below a bottom duty growing tray $20_{db}$ (see FIG. 5E) at a distal end of the bottom tray conveying system 35, whereby the duty growing tray $20_{db}$ can be lifted by the growing tray lift 45 to a top level, designated $20_{dt}$ (see FIG. 10B), ready for collecting by the top tray conveying system 48.

Figure 4A:
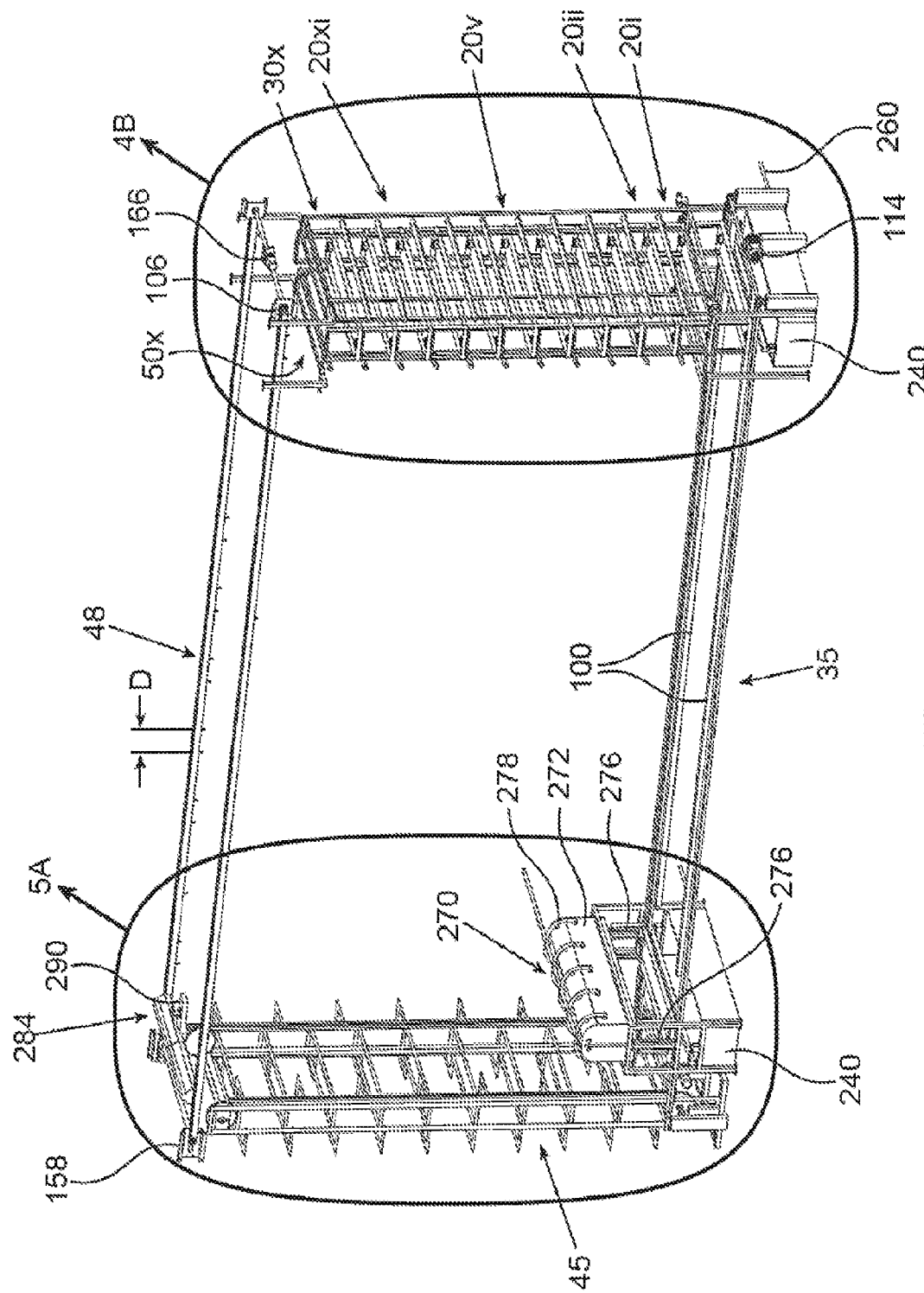
FIG. 4A illustrates the horticulture crop growing module seen in FIG. 3A, with some elements removed for sake of simplification.
Figure 10A:
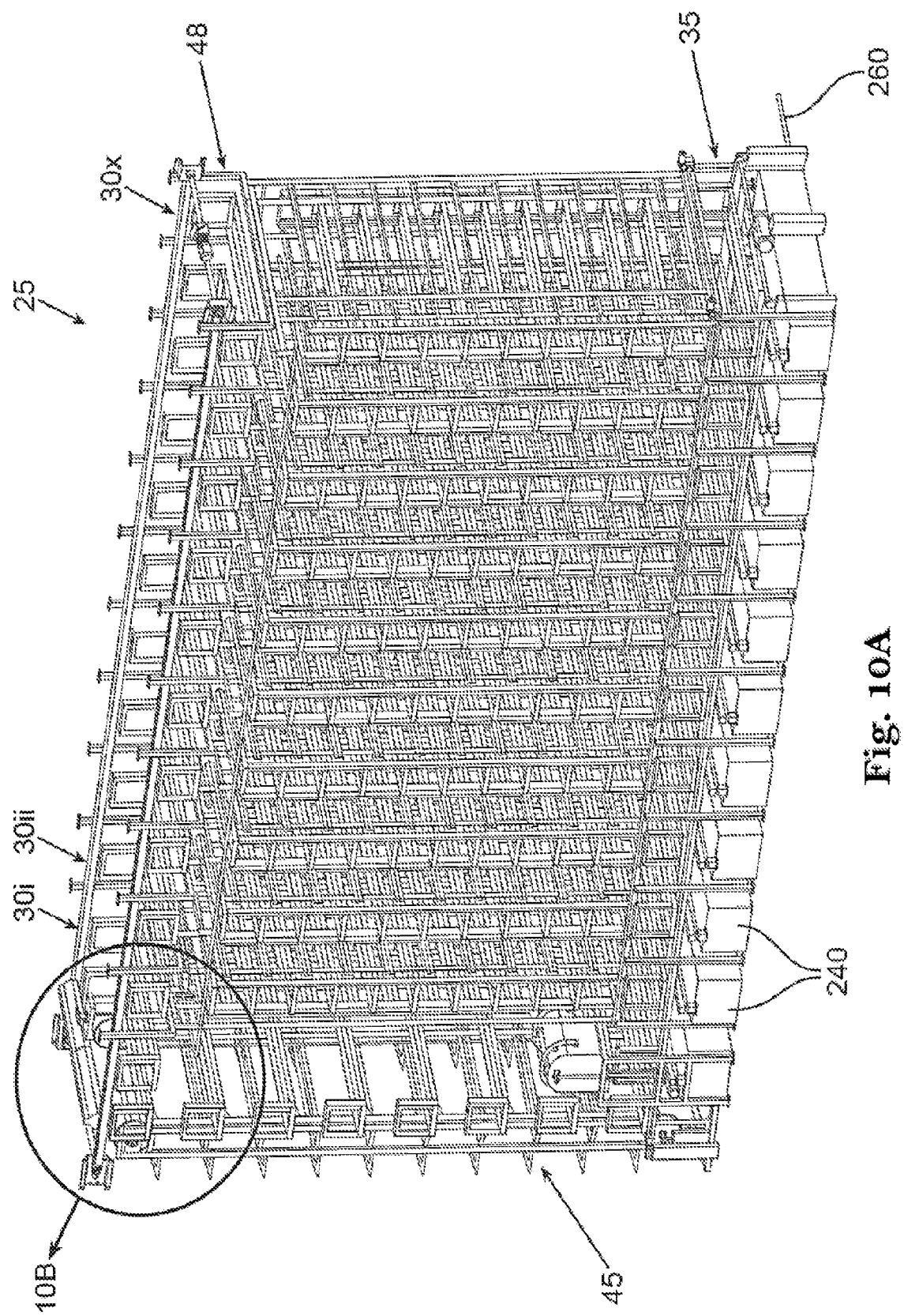
FIG. 10A is the same as FIG. 3A, with a growing tray lift loaded with growing trays.
Figure 10B:
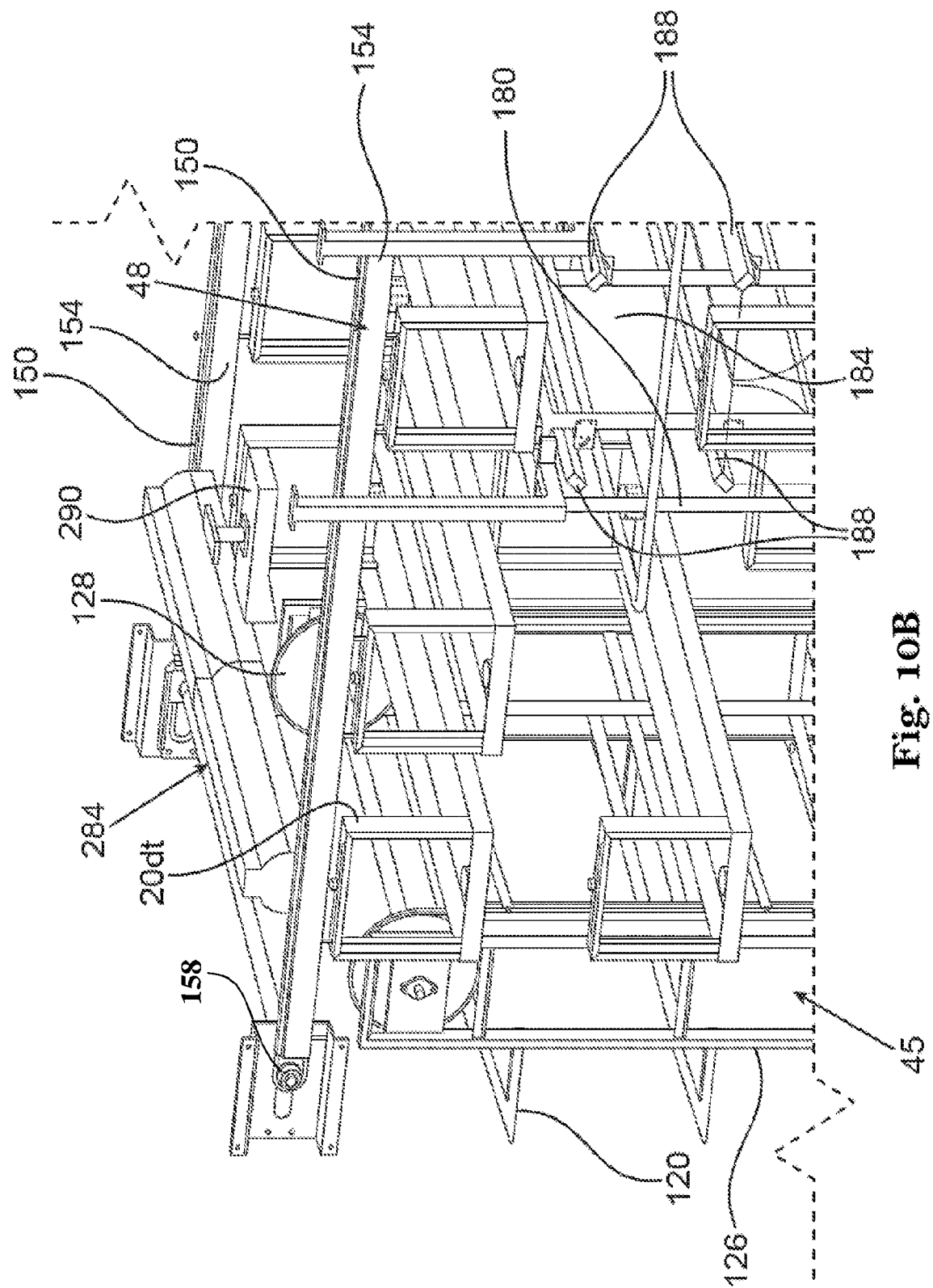
FIG. 10B is an enlarged view of the portion marked 10B in FIG. 10A.

Turning now to the top tray conveying system 48, which as seen in FIG. 10B comprises two parallelly extending endless belts 150 each supported by a longitudinal rail 154 and each tensioned between an idle pulley 158 (extending behind the growing tray lift 45, as better seen in FIG. 4A) and a driving pulley 160 (seen in FIG. 4D extending before the tray loading/unloading station designated $30_x$), said driving pullies 160 coaxially mounted on an axle 162 coupled for rotation by an electric motor 166.

Figure 9A:
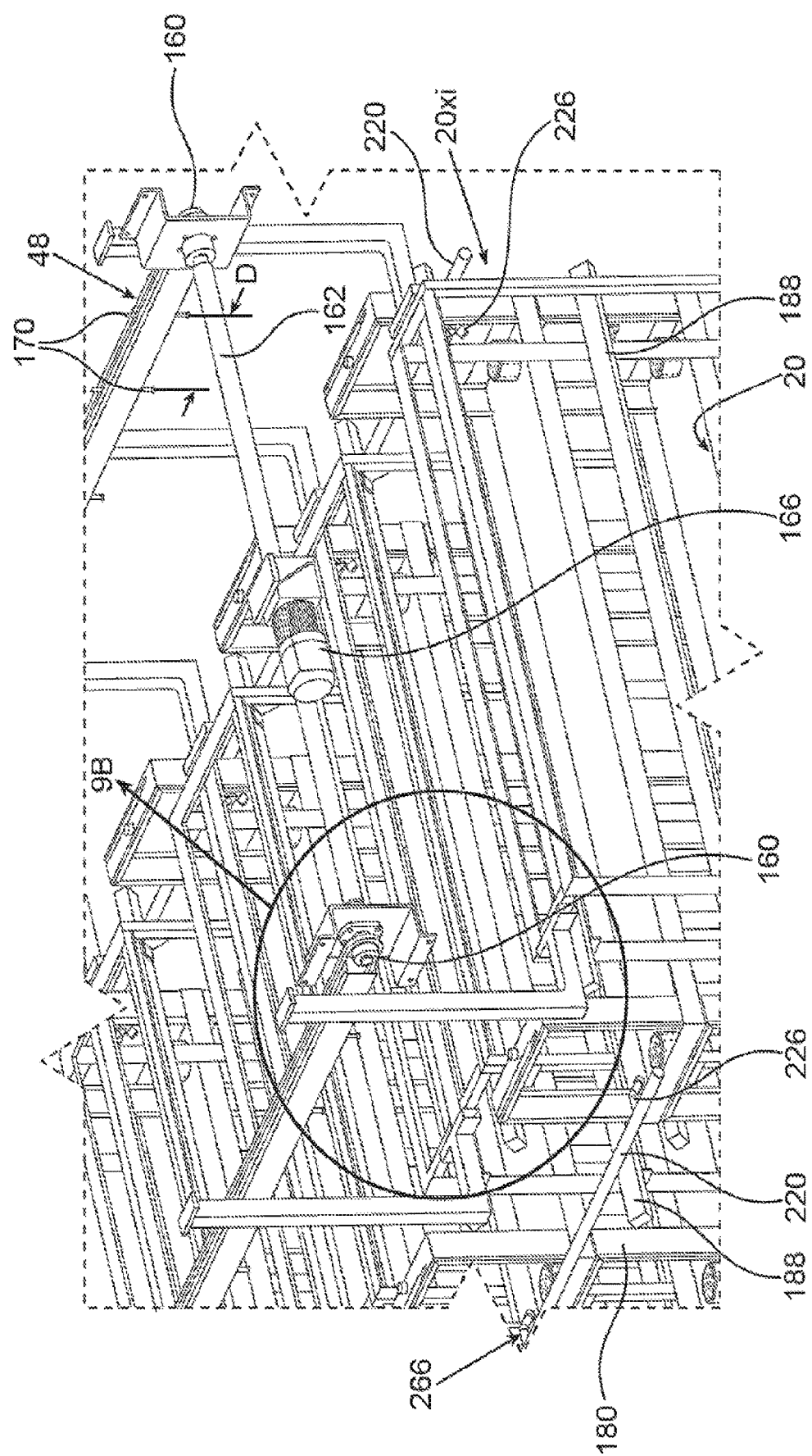
FIG. 9A is an enlarged view of the portion marked 9A in FIG. 3A.
Figure 9B:
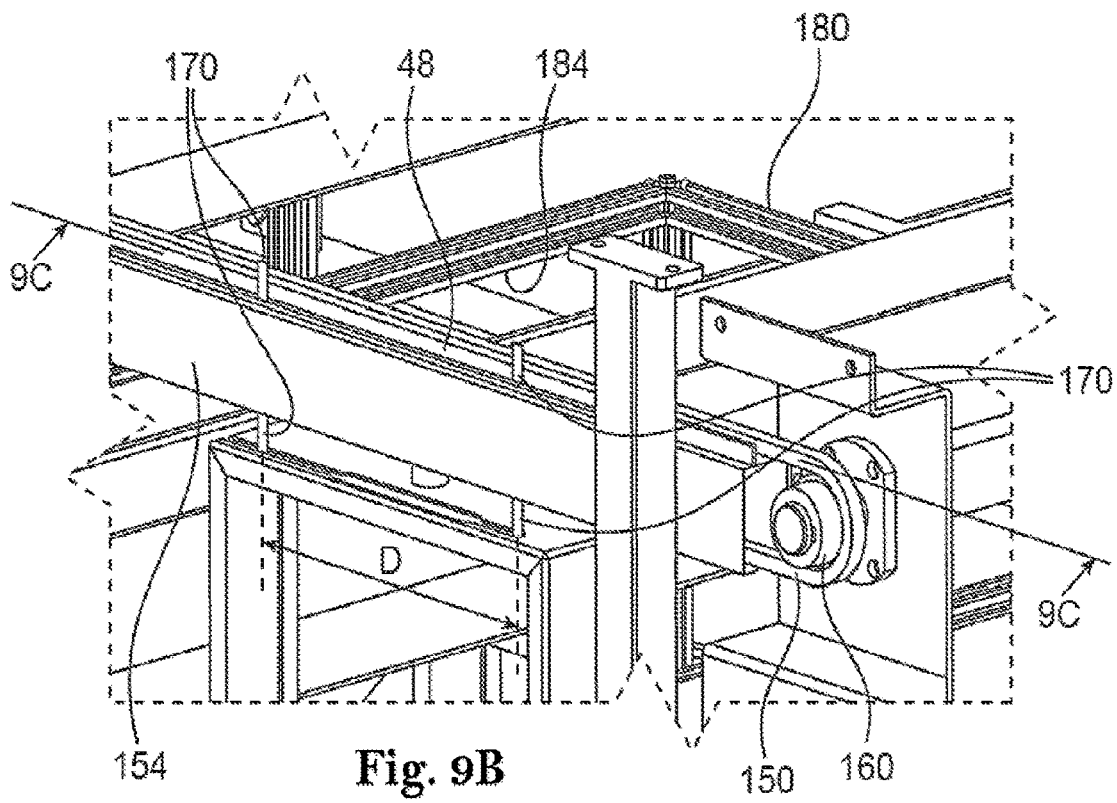
FIG. 9B is an enlarged view of the portion marked 9B in FIG. 9A.
Figure 9C:
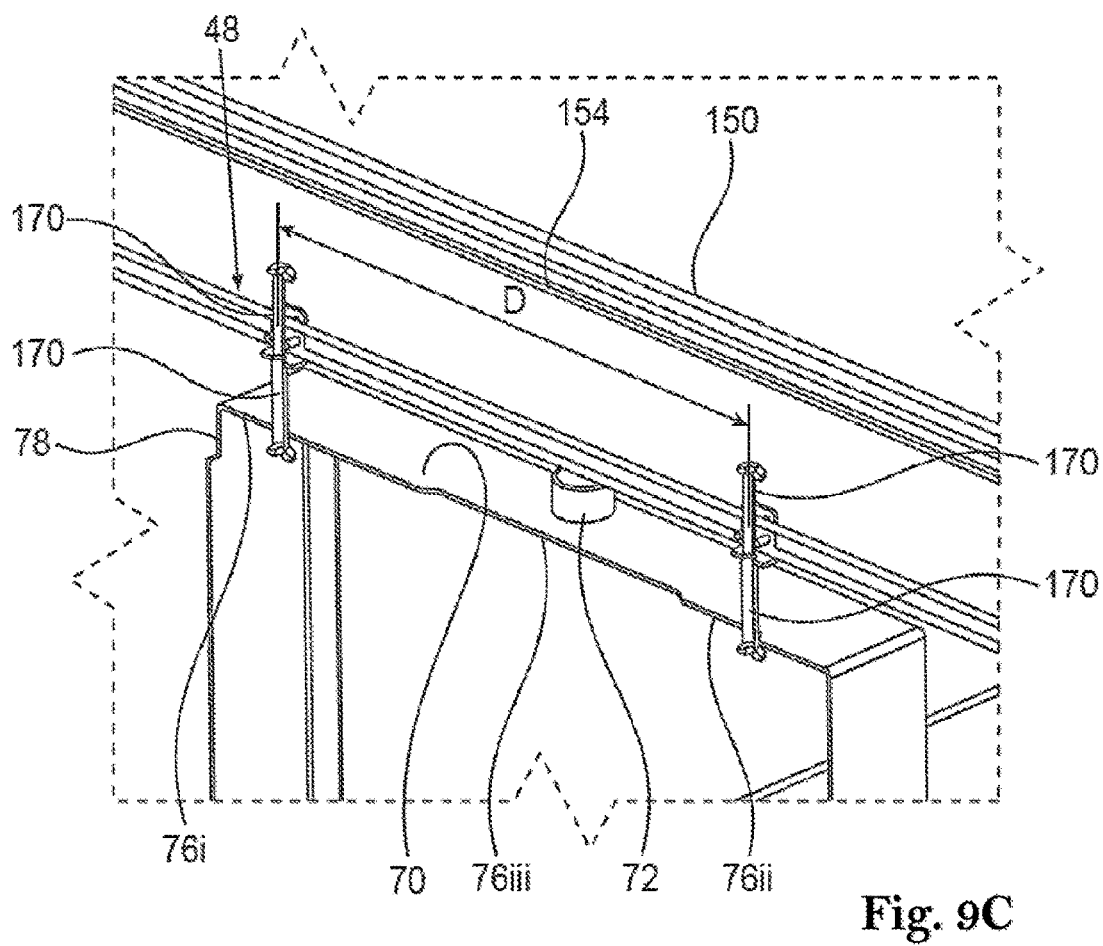
FIG. 9C is a vertical section along line 9C-9C in FIG. 9B.

The two endless belts 150 are each configured with a plurality of equally spaced pairs of pickup hooks 170, each having an inverted mushroom like cross section, i.e., radially extending from the belt such that the mushroom stem-like portion is articulated to the endless belt 150, whereby the configuration is such that the pickup hooks 170 are suspended upside-down from the bottom path of the endless belt. As can be seen, best in FIGS. 9B and 9C, the thickness of the stem portion of the pickup hooks 170 is smaller than the width of the narrow sections $76_i$ and $76_{ii}$ of the engaging recess 76 for allowing the same to pass therealong, and the diameter of a head-like portion of the pickup hooks 170 is greater than the thickness of the wider section $76_{iii}$ of the engaging recess 76 to allow it to pass therethrough. However, the diameter of the head-like portion of the pickup hooks 170 is smaller than the width of hook engagement opening 78 (see FIGS. 9B, 9C), to thereby enable introducing the pickup hooks 170 therethrough into the engaging recess 76. The distance D between each pair of pickup hooks 170 is greater than the length of the wider section $76_{iii}$, however smaller than the overall length of the engaging recess 76, for securing the grip of the pair of pickup hooks 170 over the top bar 79 of the frame 70. The distance between each neighboring pair of pickup hooks 170 is similar with the distance between the growing towers $30_i$ to $30_x$.

Figure 4B:
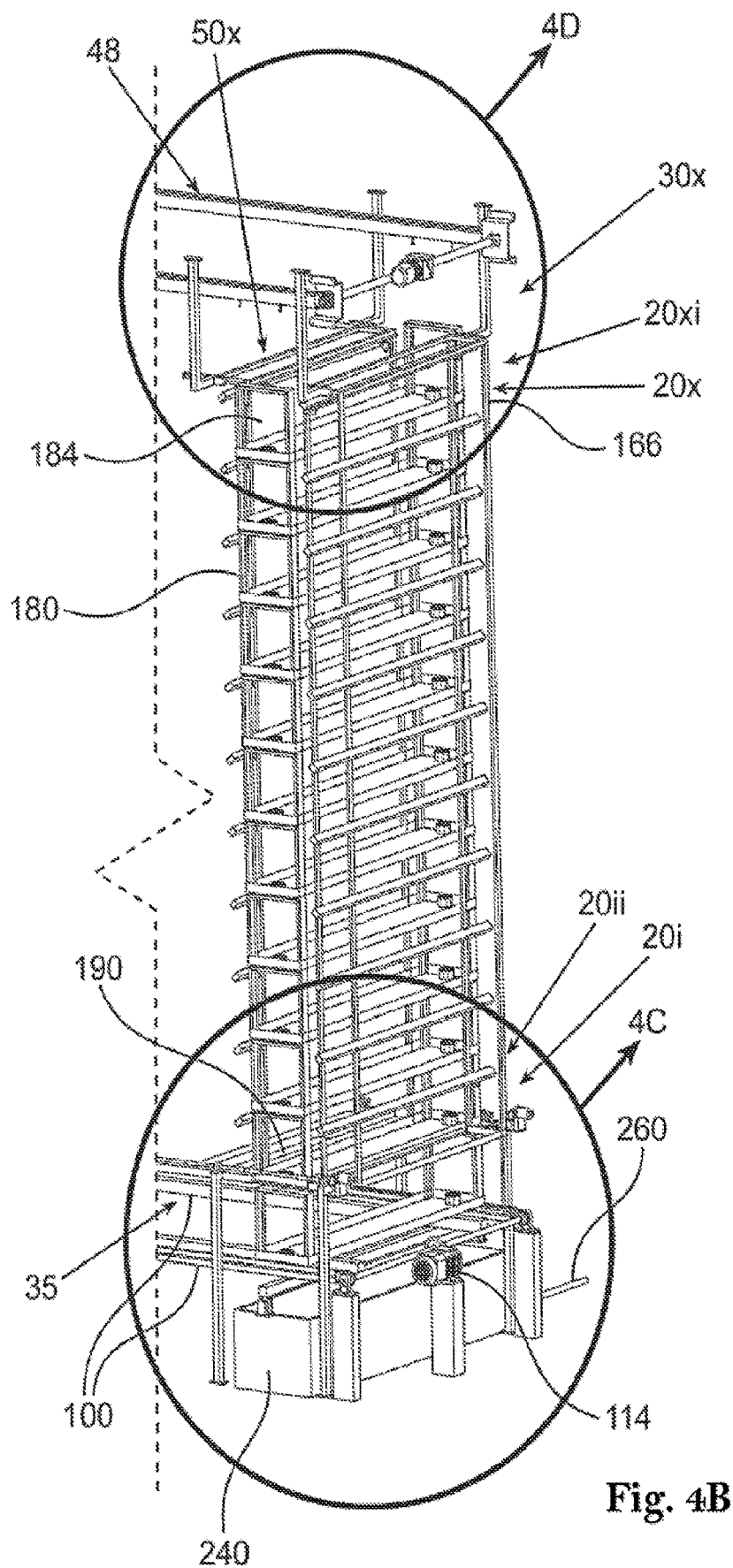
FIG. 4B is an enlargement of the portion marked 4B in FIG. 4A.
Figure 4D:
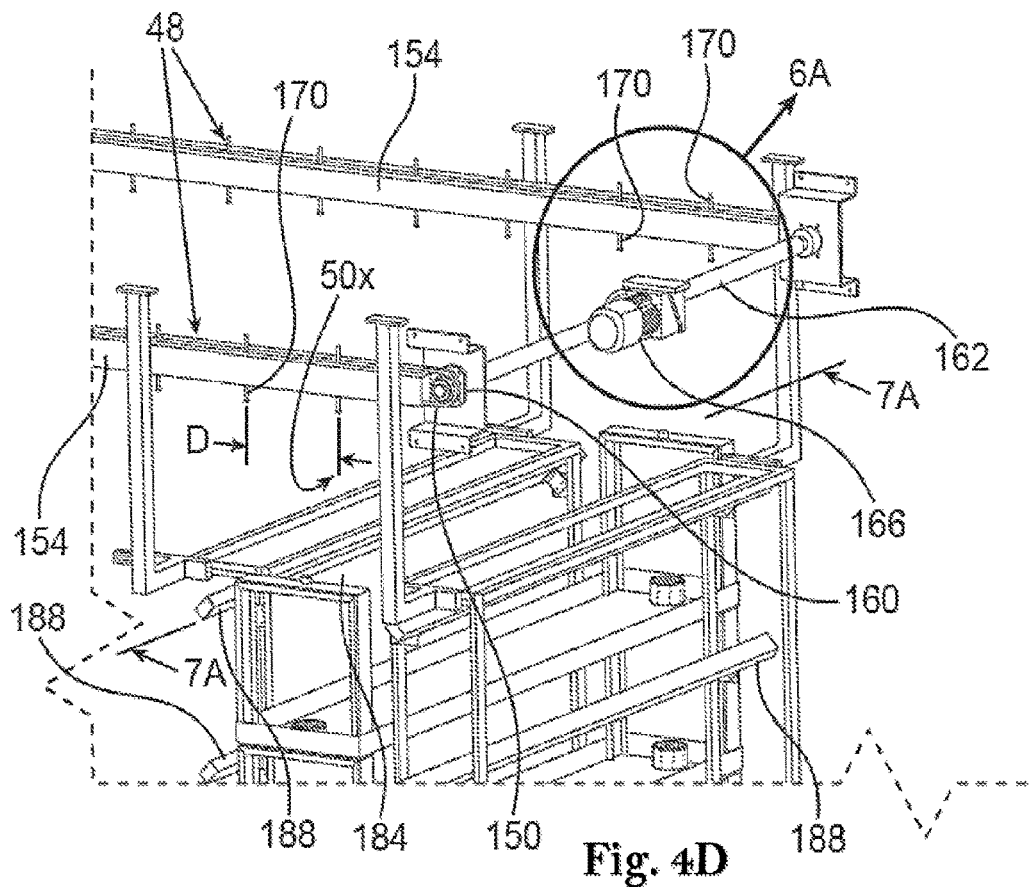
FIG. 4D is an enlargement of the portion marked 4D in FIG. 4B.
Figure 4C:
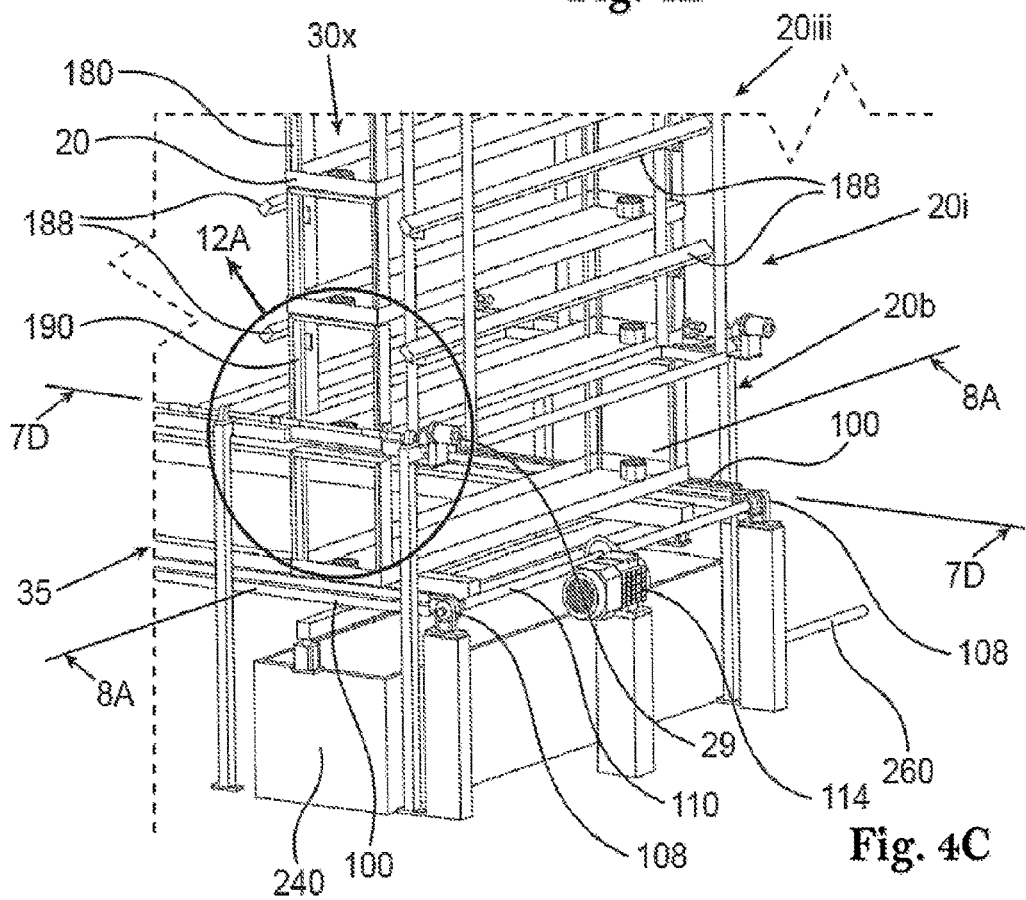
FIG. 4C is an enlargement of the portion marked 4C in FIG. 4B.

The horticulture crop growing module 25 further comprises a growing tray loading/unloading arrangement configured for loading trays into growing tower $30_i$ to $30_x$. Hence, as seen in FIG. 4B, each of the growing towers $30_i$ to $30_x$ comprises a cage-like support frame 180, wherein the growing trays 20 are slidingly displaceable therealong, with little clearance. A top end 184 of the support frame 180 is open, whereby a growing tray placed over the top end 184 is free to descend, under force of gravity, until it comes to rest over an obstacle, typically another growing tray 20 disposed below, as will be explained. As seen in FIG. 4D, the support frame 180 is fitted with an array of treating members 188, which according to a specific example are an array of light emitters, typically LED bars, extending at both sides of each growing tray 20, for ideal light exposure. Noteworthy, the treating members 188 can comprise also heat radiating units, optical sensors, temperature/humidity sensors, etc.

Figure 12A:
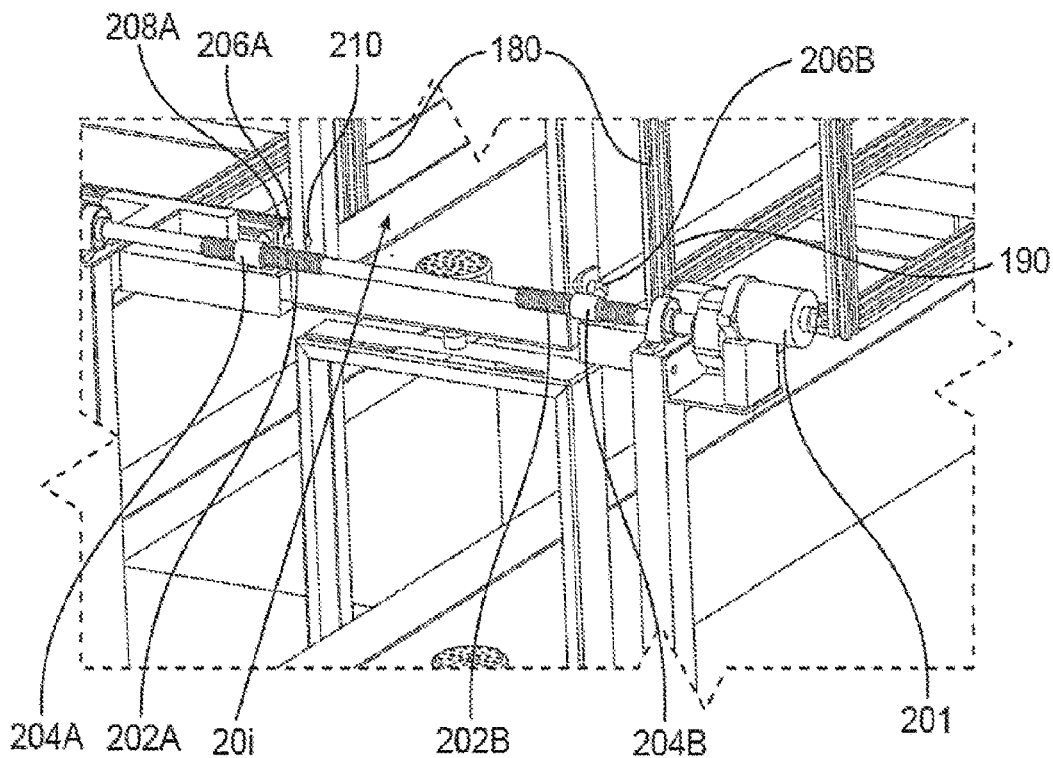
FIG. 12A is an enlargement of the portion marked 12A in FIG. 4C, illustrating the growing tray locking mechanism at a tray arresting position.
Figure 12B:
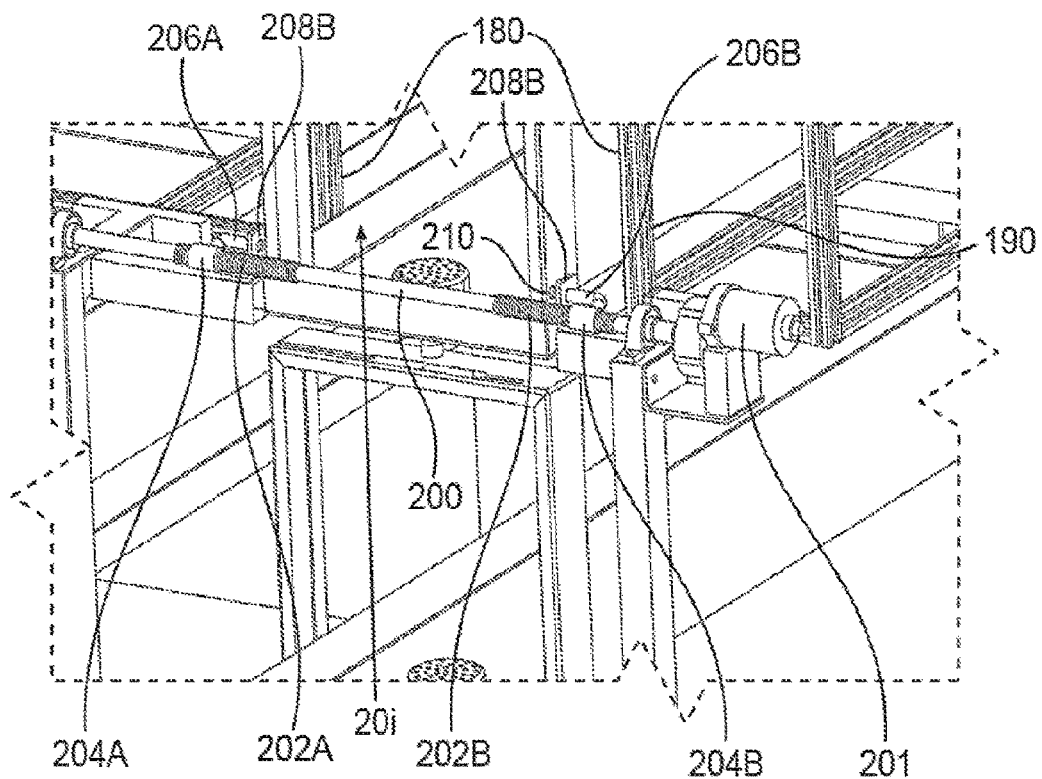
FIG. 12B illustrates the growing tray locking mechanism at a tray loading position.

With further attention directed to FIGS. 12A and 12B, it can be seen that a bottom end 190 of the support frame 180 is open, however fitted with a growing tray locking mechanism, disposed at both sides of the horticulture crop growing module 25 Reference is made to the front system only, for sake of clarity, though it is appreciated that both front and rear locking mechanisms can be identical and synchronized in operation. The growing tray locking mechanism comprises in this example an elongated rod 200 extending along the bottom end of all the growing towers $30_i$ to $30_x$. The rod 200 is coupled for receiving rotary motion from an electric motor 201 and is configured with reverse-threaded portions 202A and 202B disposed at intervals in association with each growing tower 30, with a threaded rider 204A and 204B mounted over the respective threaded portions 202A and 202B. The riders 204A and 204B are configured with an arresting pin 206A, 206B extendible through an opening in an arresting plate 208A, 208B, whereby rotation of the rod 200 entails axial displacement of the riders 204A 204B towards and away from one another. When the riders 204A and 204B displace towards one another (see FIG. 12A) the tip of the arresting pins 206A, 206B projects into an opening 210 configured at the bottom of each growing tray 20, thus arresting a bottom most growing tray $20_i$ and preventing it from displacing within the support frame 180, and further wherein said bottom most growing tray $20_i$ supports the load of consecutive growing trays stacked thereover within said growing tower. However, once the rod 200 rotates at a reverse direction the riders 204A and 204B axially displace away from one another (see FIG. 12B), whereby the tip of the arresting pins 206A, 206B disengage from the opening 210 at the growing tray $20_i$, whereby said tray can be displaced upwards by a bottom duty growing tray $20_{db}$ as will be discussed hereinafter, or it can displace towards onto the bottom tray conveying system 35.

The growing tray loading/unloading arrangement is further configured with a growing tray propelling unit configured for ascending bottom duty growing trays $20_{db}$ from the bottom tray conveying system 35 into the respective growing towers 30, or for receiving bottom most growing trays $20_i$ and placing them on the bottom tray conveying system 35 for displacing towards the inlet/outlet port 27 or towards the growing tray lift 45 (with optional treating stops along the path).

Figure 13A:
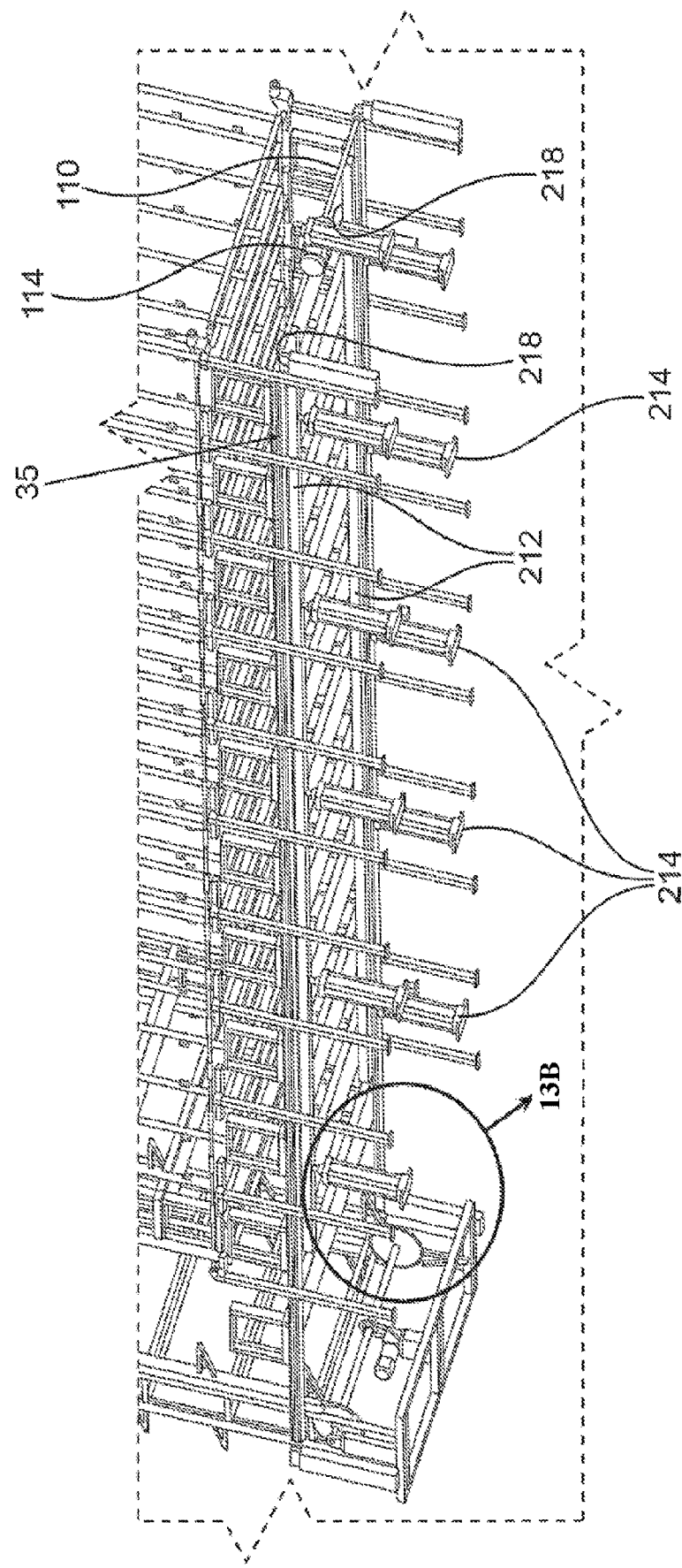
FIG. 13A is a bottom perspective view illustrating a growing tray propelling unit according to an example, whereby several other subassemblies have been hided for sake of clarification.
Figure 13B:
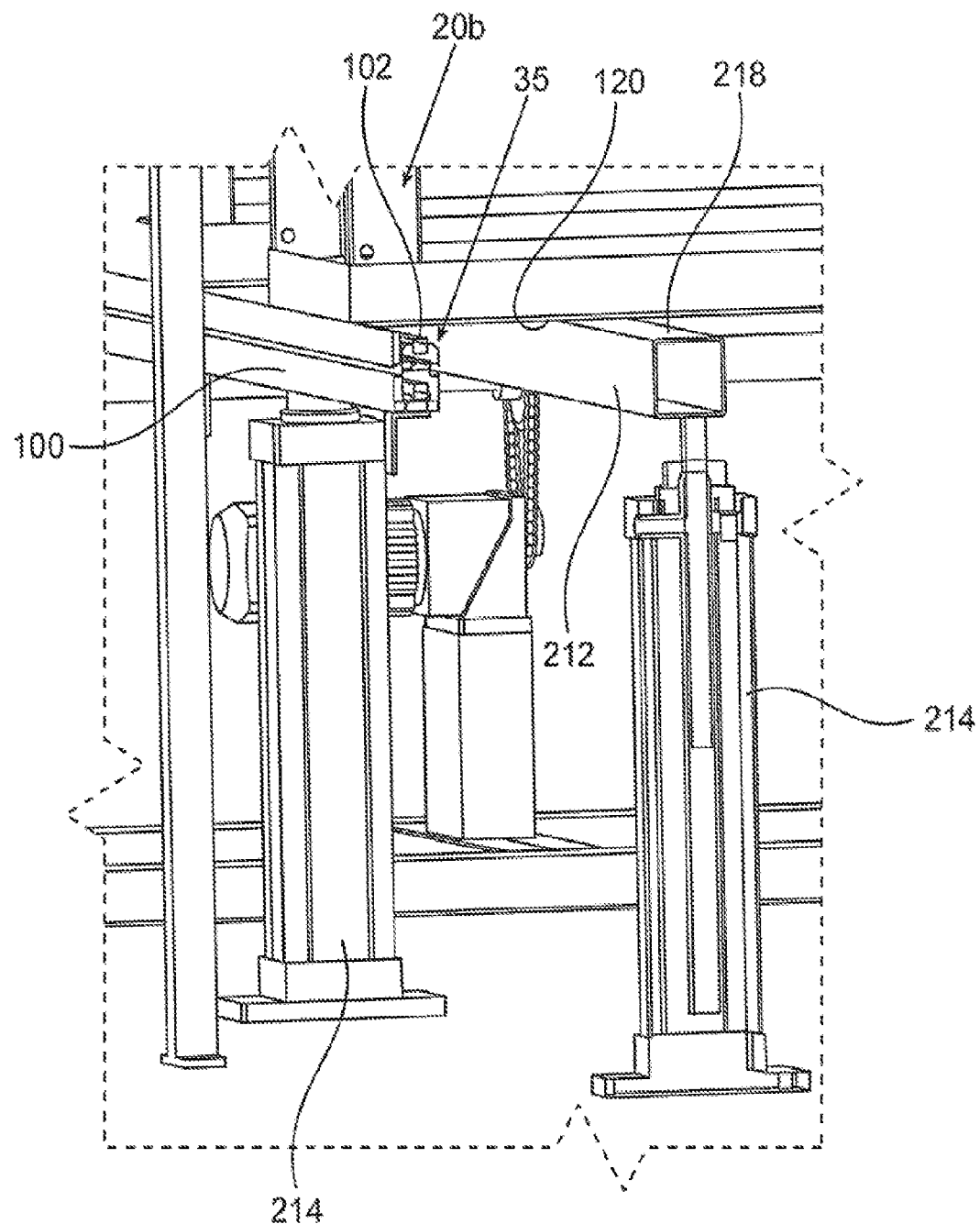
FIG. 13B is an enlarged vertically sectioned view of the portion marked 13B in FIG. 13A.

The growing tray propelling unit, best seen in FIGS. 13A and 13B, comprises a pair of solid bars 212 extending below the horticulture crop growing module 25, under all the growing towers 30, with a plurality of pistons 214 (or other mechanical equivalent mechanism) configured under said bars 212 and being manipulable between a contracted position (as seen in the Figs.) and an extended position. The arrangement is such that bottom surface 120 of a bottom transit growing trays $20_b$ extend above top surface 218 of the bars, whereby manipulating the pistons 214 into the extended position entails vertical deploying of the bottom transit growing trays $20_b$ into the respective growing towers $30_i$ to $30_x$ (providing that the growing tray locking mechanism is at an open position). Likewise, discharging trays from the growing towers $30_i$ to $30_x$ onto the bottom tray conveying system 35 takes place by opening/unlocking the growing tray locking mechanism, and allowing the bottom most growing trays $20_i$ to displace downwardly (under gravity) and come to rest over the conveying belt 102 of the bottom tray conveying system 35.

The horticulture crop growing module 25 is further configured with an irrigation and draining system. For irrigation, in some embodiments there is an irrigation supply line 220 (best seen in FIG. 9A) extending along both sides of the horticulture crop growing module 25 at adjacent a topmost level $20_{xi}$ of growing trays (11 tiers in the present example), with a plurality of irrigation spouts 226, each configured for irrigating the soil of an adjacent growing tray. The irrigation regime can be controlled, i.e., whether flood/drip/or spray irrigation takes place, or alternatingly.

Irrigation of growing trays $20_i$ to $20_x$ within each growing tower $30_i$ to $30_x$ takes place by liquid flow between levels/tiers, wherein each bottom growing tray activates to open liquid flow through a valve 64 at a growing tray above it, in a cascade fashion, as discussed by way of example in connection with FIGS. 7B and 7C.

The irrigation system further comprises in some embodiments a plurality of drainage containers 240, each disposed under a respective growing tower 30, and configured with a valve manipulating arrangement 244 (FIGS. 8A to 8C) for draining the bottom most level/tier of growing trays $20_i$. The valve manipulating arrangement 244 comprises an activating bar 246 mounted over a pair of activators 248 (hydraulic/pneumatic pistons, solenoids, etc.), with a pair of hollow plungers 250 in register with the valves 64 of the lowest tier of growing trays $20_i/20_b$, whereupon when the activators 248 are activated by a command signal they propel the bars 246 upwardly into engagement with the plunger 86 of valves 64, so as to open the valves to thereby facilitate liquid flow through the hollow plungers 250 and into the drainage containers 240 (as schematically represented by arrowed lines 253).

Figure 21A:
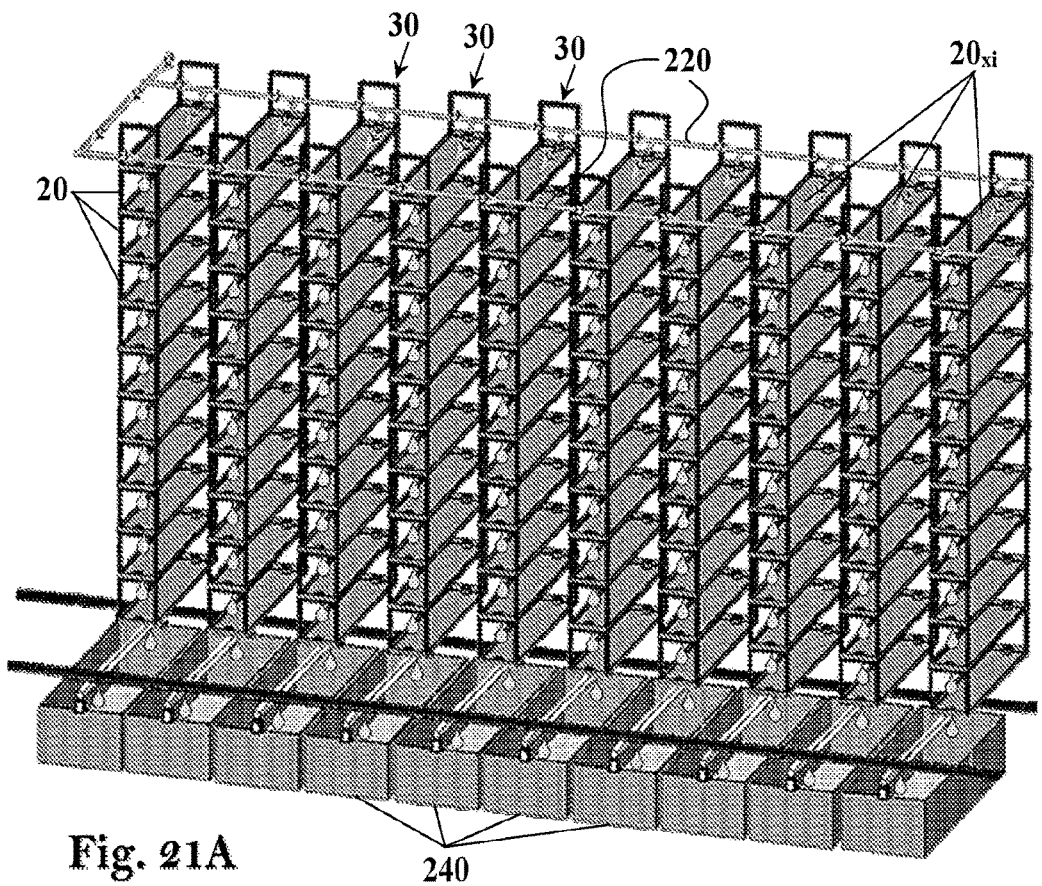
FIGS. 21A to 21C show irrigation arrangements of possible embodiments.
Figure 21B:
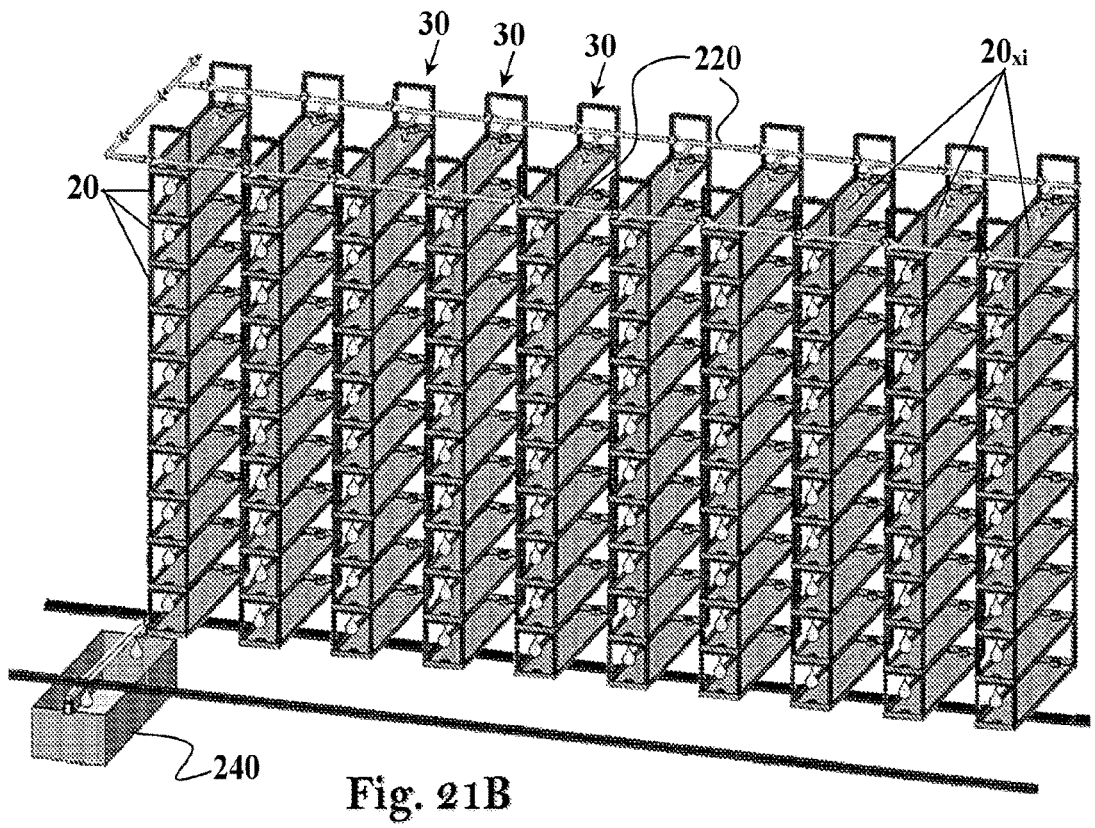

In the illustrated example, each growing tower 30 is associated with drainage containers 240, which in turn comprises a drainage outlet 260, for collecting all the irrigation liquid and treating it for a new irrigation cycle, e.g., filtering, hydrogenating, enriching with nutrients and minerals, temperature control, disinfecting, etc., from where it is recycled into the irrigation system. However, it is appreciated that rather than a separate drainage container 240 per growing tower 30, as shown in FIG. 21A, there may be an arrangement wherein one or more drainage containers are provided for any two or more growing towers, or a unitary, single drainage container for the horticulture crop growing module 25, either below the module or a side (as shown in FIG. 21B).

In some embodiments the drained irrigation liquid from one or more of the growing towers 30 within the horticulture crop growing module 25 flow by gravity along the growing trays 20 within a growing tower, and after flowing through all growing trays within the tower the irrigation liquid flows to an irrigation liquid treating station, within or outside of the growing module, whereat the irrigation liquid is recycled after analyzing and treating, i.e., cleaned, adding nutrients and minerals, treating water hardness and pH, etc.

The horticulture crop growing module 25 is further configured in some embodiments with several treating stations. For example, as seen in FIGS. 5A and 5B, there is a treating station 270 disposed at the distal end of the module, said treating station comprising a dome 272 manipulable by a pair of pistons 276 (or other equivalent mechanism) for displacing between a raised position (as in the drawings) and a lowered position. An inside space (not shown) of the dome 272 is configured with a plurality of nozzles 278z (seen in FIG. 25E) with tubes 278 connected to said nozzles 278z.

Figure 25A:
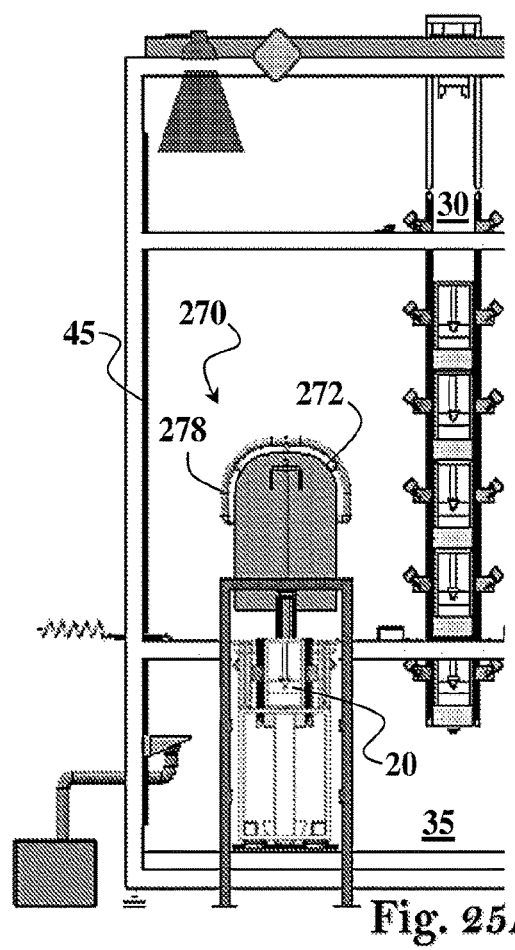
FIGS. 25A to 25H show a pollination sequence of possible embodiments.
Figure 25B:
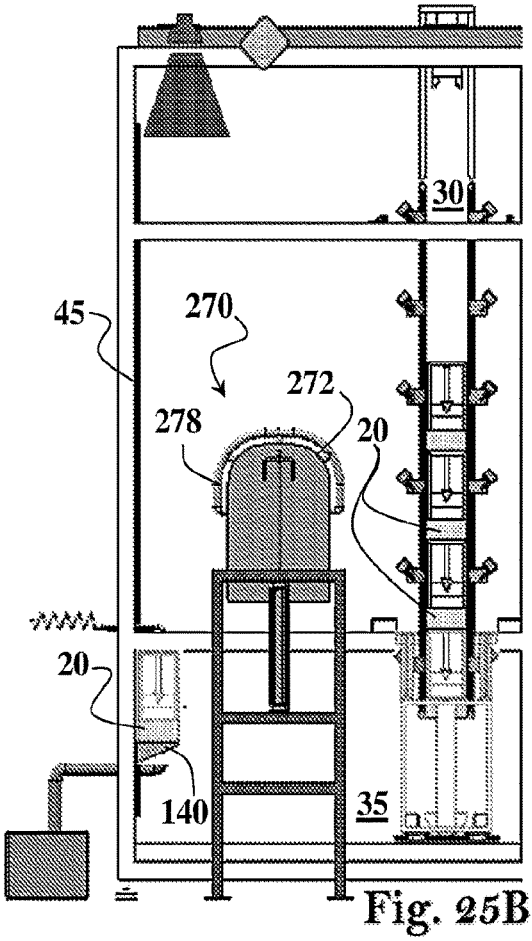
Figure 25C:
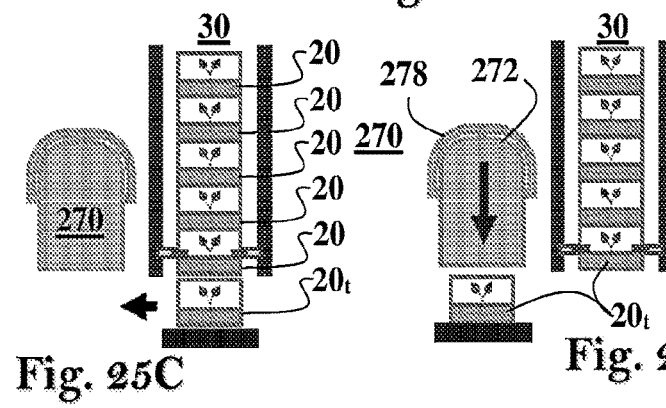
Figure 25D:
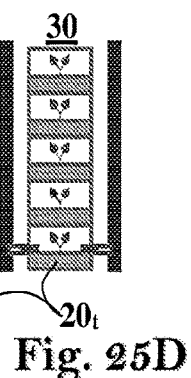
Figure 25E:
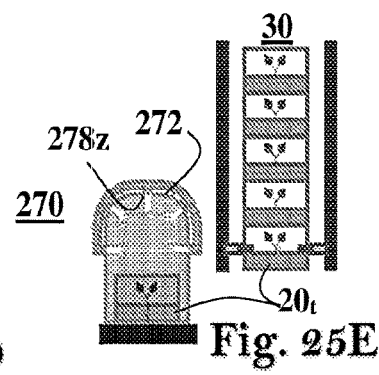
Figure 25F:
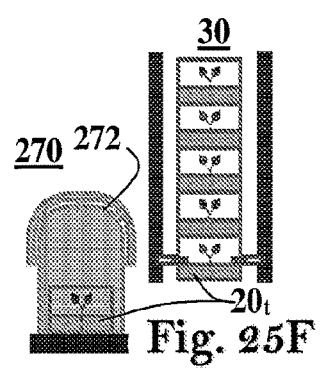
Figure 25G:
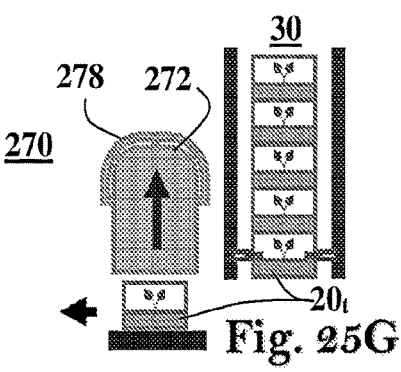
Figure 25H:
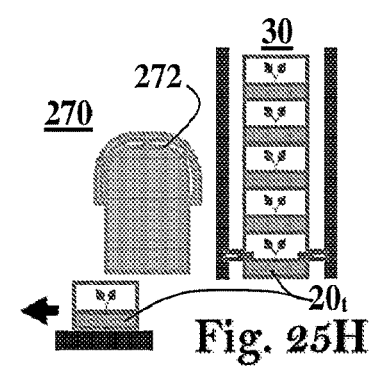

In some embodiments, the arrangement is such that a duty treated growing tray $20_t$ reaches the treating station 270 e.g., utilizing the bottom tray conveying system 35 as shown in FIGS. 25A to 25C, then the dome 272 is lowered to cover the growing tray $20_t$ and treating agent is applied to the growth by the nozzles, through tubing 278 e.g., as shown in FIGS. 25D to 25F. Upon completion of the treatment, the pistons 278 raise the dome 272, whereby the treated growing tray $20_t$ moves on (by the bottom tray conveying system 35) e.g., to the growing tray lift 45, as shown in FIGS. 25G-25H and 25A-25B, and the treating station 270 is now ready for receiving and treating another growing tray.

It is appreciated that the treating station 270 can provide one or more different treatments, e.g., pollination, disinfection, heating/chilling/airing, poeticizing, etc.

Yet, as best seen in FIG. 10B, a treating station, generally designated 284, is positioned in some embodiments at a distal top location of the horticulture crop growing module 25, said treating station 284 being static and configured for treating the growing trays as they are discharged from the growing tray lift 45 and collected by the top tray conveying system 48. Treating station 284 has a dome shape facing the growing trays such that the treat is applied as they reach the top location of the top tray conveying system 48. The Treating station 284 can be for example a radiation station, sterilization station, etc., and/or it can comprise an imaging unit for obtaining images of the growth of plants on the growing trays.

The horticulture crop growing module 25 is further configured with a control system comprising a controller (77 in FIG. 20), a plurality of sensors and actuators. The controller 77 is configured for controlling the environment within the module and growth treatment (i.e., temperature, humidity, illumination, irrigation, pollination, nutrition, etc.), for detecting and determining and monitoring the growth progress of teach growing tray, and for cycling the growing trays from the time they enter the module, till the time they are discharged, with a growth ready for harvest, as will be discussed hereinafter.

A crop control station 290 is illustrated, by way of example, positioned juxtapose said treating station 284, as the growing trays discharged from the growing tray lift 45.

For obtaining data relating to each growing tray individually, each growing tray is configured in some embodiments with a readable identifier (e.g., ID code 20y in FIG. 27B), such as bar code, QR code, color code, RFID, digital code, etc., whereby tray data associated with each growing tray 20 can be registered at the controller 77.

Reverting now to the finished produce station 13 (FIG. 1A), there is a finished produce conveying system 23 (in fact an extension of conveying system 22) extending from each of the at least one inlet/outlet ports 27, configured for carrying growing trays from the one or more horticulture crop growing modules 25 towards the finished produce station 13. Growing trays 20 received at the finished produce station 13 enter an automated, hands-free handling station wherein the growth (e.g., fruits such as strawberry) are harvested, then packed and optionally wrapped and stored at appropriate conditions, ready for delivery/shipment.

A horticulture crop growing method using a horticulture crop growing module 25 according to the present disclosure, comprising the following steps:
  i. Receiving a plurality of planted growing trays 20 into the horticulture crop growing module 25 through the inlet/outlet port 27 and loading them onto a bottom tray conveying system 35;
  ii. Loading the growing trays 20 from the bottom tray conveying system 35 into the growing towers 30;
  iii. Commencing a growing cycle wherein the growing trays 20 are circulated between a plurality of treating stations 270, and/or 284, and/or 290, disposed within the horticulture crop growing module 25;
  iv. Monitoring and obtaining data associated with each growing tray 20 and relating to ripeness of the crops growing on the growing trays;
  v. Repeating steps iii and iv until crops are at harvesting state;
  vi. Conveying the growing trays 20 from the growing towers 30 to the inlet/outlet port 27 for collecting the growing trays;
  vii. Transporting the trays 20 to the finished produce conveying system 13 e.g., for an automated, hands-free harvesting, packing and delivery station.

With attention to the drawings, reference is made to steps of the horticulture crop growing method utilizing a horticulture crop growing system 10 as described hereinabove, with particular attention to steps ii) to vi) above.

Figure 14:
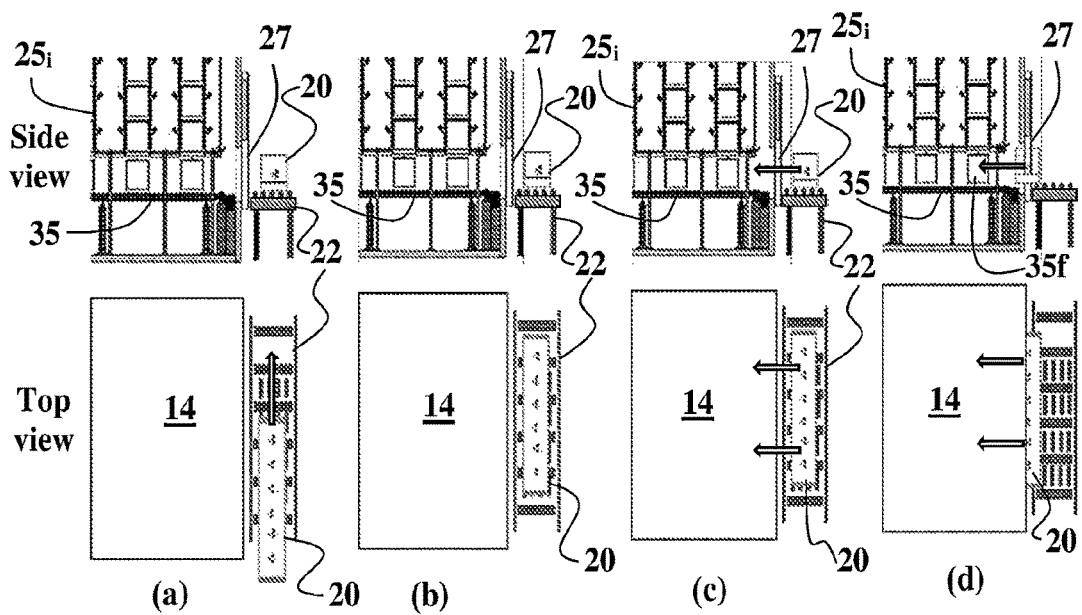
FIG. 14 demonstrates growing tray loading stages of possible embodiments.

At step (i), after preparation at the growing tray handling and preparation station 12, a plurality of growing trays 20 are conveyed over conveying system 22 to the inlet port 27 of an allocated horticulture crop growing module 25, as depicted in stages (a) and (b) of FIG. 14. In stage (c), upon entry into the vicinity of the module 25, in stage (d) the growing trays 20 are placed over the bottom tray conveying system 35 and are gradually displaced (in direction towards the growing tray lift 45) until the conveyor belt 35 is fully occupied by growing trays 20. As seen, in some embodiments the growing trays 20 are transferred from the conveying system 22 onto a sliding frame structure 35f of the bottom tray conveying system 35, which is described hereinbelow in details with reference to FIGS. 15A to 15D.

At step (ii), once a duty growing trays $20_{db}$ is disposed below each of the growing towers $30_i$ to $30_x$, then the growing tray locking mechanism is shifted into an unlocked position by activation motor 201, entailing retraction of the arresting pins 206A and 206B to displace away from one another into an unlocked position, whereafter the growing tray propelling unit is activated by pistons 214 vertically displacing the solid bars 212 upwards, entailing upwards displacement of the duty growing trays $20_{db}$ into the respective growing tower $30_i$ to $30_x$. Once the duty growing trays $20_{db}$ are positioned within the growing tower, the growing tray locking mechanism is activated again, at an opposite sense, whereby the arresting pins 206A and 206B displace into arresting engagement within the opening 210 at the growing tray $20_i$. this step is repeated until the growing towers are loaded with a plurality of growing trays.

A growing cycle then commences (step (iii)), wherein each growing tray receive 'horticulture attention' namely each tray is individually or collectively treated in the respective tower or at dedicated treating stations. Such treating can include any one or more of irrigation, illumination, humidity, air temperature, fertilizing/nutrition, hydrogenation, growing tray heating, radiation at different wavelength, playing sound, pollination, sterilization, etc.

Figure 21C:
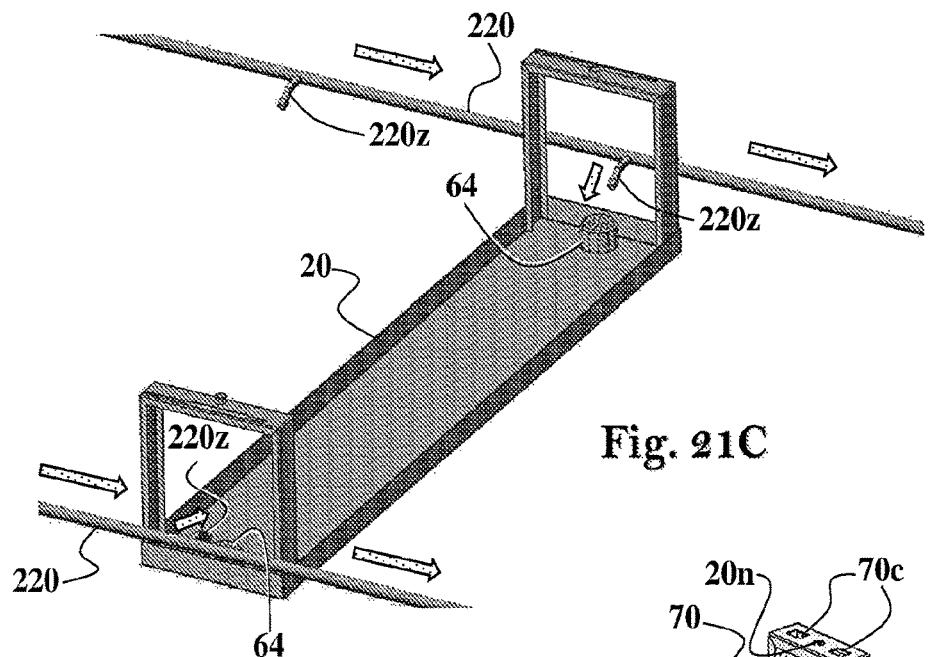

With reference to FIG. 21A to 21C, irrigation takes place in some embodiments by applying the irrigation liquid through irrigation supply line(s) 220 to the topmost growing tray $20_{xi}$ of each growing tower 30 via one or more nozzles 220z e.g., in this specific example each topmost growing tray 20 is irrigated by two nozzles 220z, wherefrom irrigation liquid flows to growing trays 20 below the topmost growing tray at a cascade configuration, by gravity, as demonstrated in FIGS. 21A and 21B. Irrigation liquid from the bottom most growing trays drains into the drainage containers 240, wherefrom it is collected and transferred for treating it towards a new irrigation cycle, e.g., filtering, hydrogenating, enriching with nutrients and minerals, temperature control, disinfecting, etc., from where it is recycled back into the irrigation system.

The growing cycle further comprises circulating the growing trays with the horticulture crop growing module 25, and in particular shifting the growing trays 20 along the different treating and monitoring stations. Accordingly, at prescribed periods, as controlled by the controller 77 and depending on growth parameters, a growing tray shifting cycle takes place. For that purpose, the bottommost growing tray within each tower 30 is displaced onto the bottom tray conveying system 35 (a tray at a time can displace onto the bottom tray conveying system 35 owing to controlled operation of the growing tray locking mechanism). And then a tray at a time can be displaced towards the treating station 270 as discussed hereinabove. Once treated, said duty treated growing tray $20_t$ moves e.g., onto the growing tray lift 45 whereat the trays engage the growing tray support arms 140, to then be elevated to the top level, for collecting by the top tray conveying system 48.

Each tray reaching the top level of the growing tray lift 45 is then engaged by the pickup hooks 170 of the endless belts 150, as explained herein before, and once extending above a respective growing tower the growing tray can be released from the top tray conveying system 48, allowing it to displace into the growing tower 30 under gravity, to rest over the tray below. Once a growing tray is positioned above another growing tray, the valve and filtration system is activated, as mentioned hereinbefore, facilitating irrigation liquid flow at the cascade-like fashion.

The growing process can be entirely automated and constantly monitored and controlled (step (iv)), wherein each growing tray receives prescribed and monitored amount of treatment. Once the controller identifies that the growth on a tray has reached a so-called ready/maturity stage, the particular tray is displaced to the outlet port 27. This takes place by identifying the tray (by the readable identifier/ID code $20y$) and once it reached the bottom tray conveying system 35, the conveyor belt turns at an opposite direction (an unloading direction), displacing said growing tray towards the outlet port.

The control unit 77 is configured in some embodiments to implement some or all of the above-described method step, utilizing sensor units, identifier readers, and various plan treatment and/or monitoring units, as disclosed herein. For example, in some embodiments one or more imagers/cameras are installed in each horticulture crop growing module 25, and used to control one or more of the following: disease quantification i.e., level of disease in plants; plant healthiness i.e., level of disease in the plant and growing conditions; plant senescence i.e., how the plant ages for adjusting nutrient solution, LED exposure, Temp, Humidity, and suchlike; chlorophyll levels so as to adjust quality of growth e.g., by LED illumination exposure; carotenoid content indicative of level of light absorption.

N-Content, level of nitrogen in the growing media.
Flowering State to start pollination process.
Pollination Control to re pollinate or adjust pollination parameters.
Crop Maturing to start harvesting.

Figure 15A:
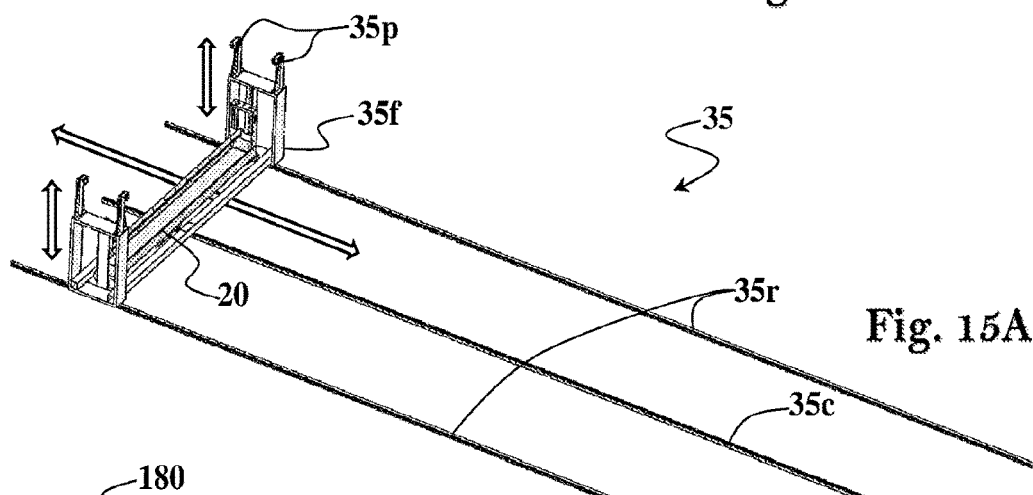
FIGS. 15A to 15D show possible configurations of the bottom tray conveying system and lifting mechanism thereof.

FIG. 15A shows another possible embodiment of the bottom tray conveying system 35, wherein the growing tray 20 is received in a sliding frame structure 35f and thereby transported over rails 35r. As better seen in FIG. 15C, the sliding frame structure 35f comprises an actuator (e.g., linear actuator/motor) 35f coupled to a gear rack rail 35c configured to move (e.g., rack-pinion conveyor transmission) the sliding frame structure 35f over the rails 35r along the horticulture crop growing module 25. This way, the growing tray 20 received from the inlet/outlet port 27, or from the growing tray lift 45, can be moved to any one of the growing towers 30, and vice versa.

Figure 15B:
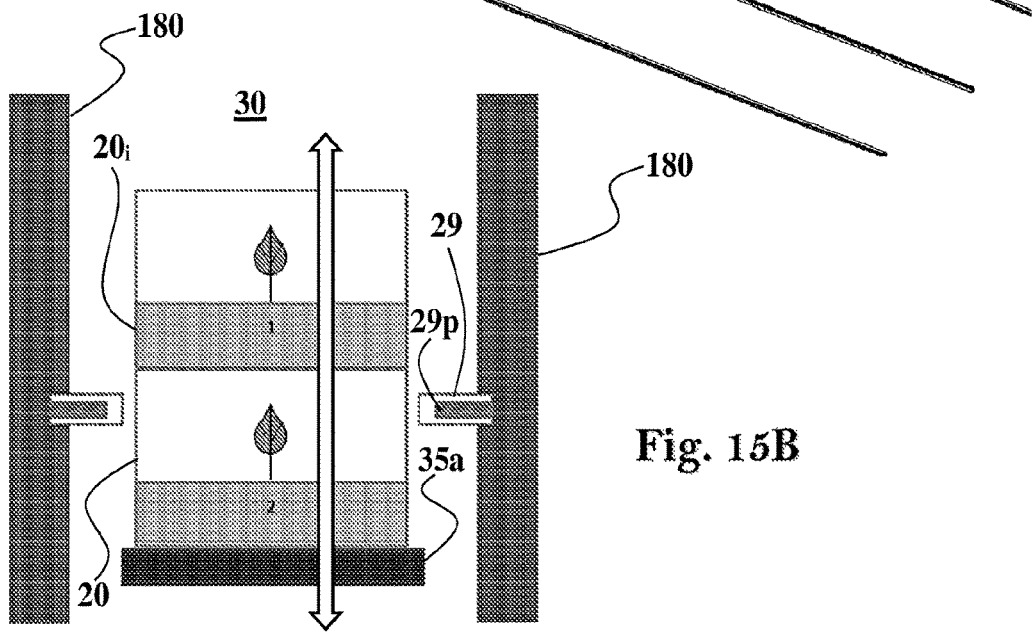

The sliding frame 35f comprises a lifting mechanism configured to transfer the growing tray 20 from sliding frame 35f to growing towers 30, and vice versa. The lifting mechanism comprises a lift-platform 35a on which the growing tray 20 is placed and vertically moved along vertical bars 35b (e.g., by linear actuation) of the sliding frame 35f. FIG. 15B demonstrates vertical movement of the growing tray 20 by the lift-platform 35a in growing tower 30, and securing/releasing the bottommost growing tray 20 in the growing tower 30 by a locking mechanism 29 e.g., four locking mechanisms 29 for securing the growing tray 20 in each growing tower 30 are exemplified here.

For example, the lift-platform 35a can lift the growing tray 20 placed thereon upwardly towards and along the support frame 180 of the growing tower 30, thereby pushing the bottommost growing tray $20_i$ of the growing tower 30, and any other growing tray 20 stacked thereon, upwardly. After the growing tray 20 placed on the lifting platform 35a reaches the bottommost tray-location in the growing tower 30, the locking (e.g., spring) mechanisms 29 mounted to the support frame 180 are changed from an unlocked state into their locked state by pushing a locking pin 29p thereof into the securing openings 210 of the growing tray 20. Once the growing tray 20 is securely locked in the bottommost tray-location of the growing tower 30 by the locking mechanism 29, the lifting platform 35a is moved downwardly back to the bottom base/floor of the sliding frame 35f.

Figure 15C:
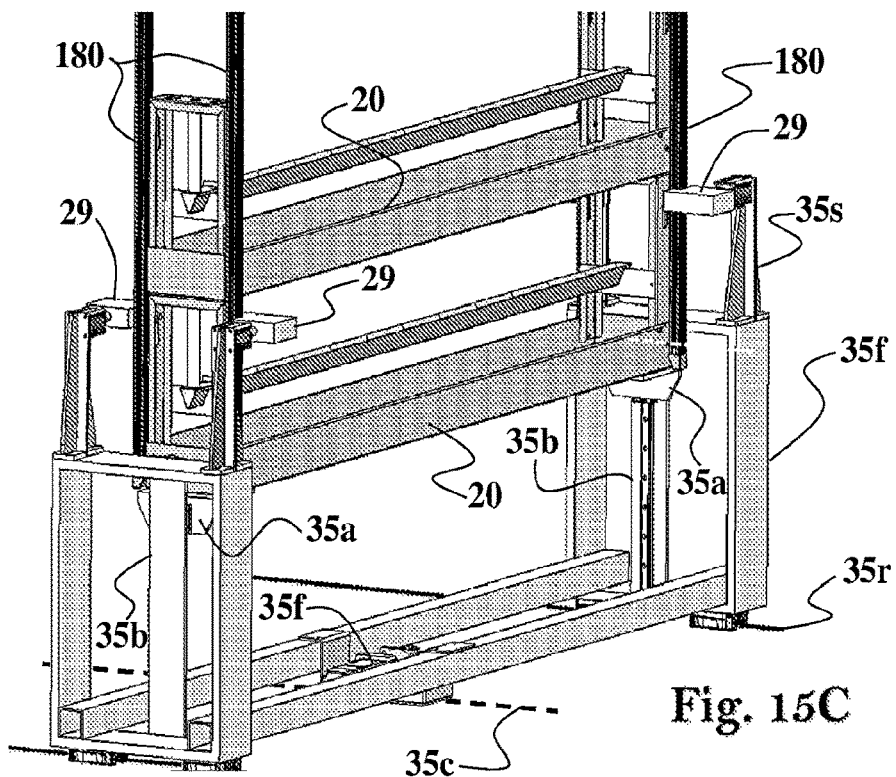
Figure 15D:
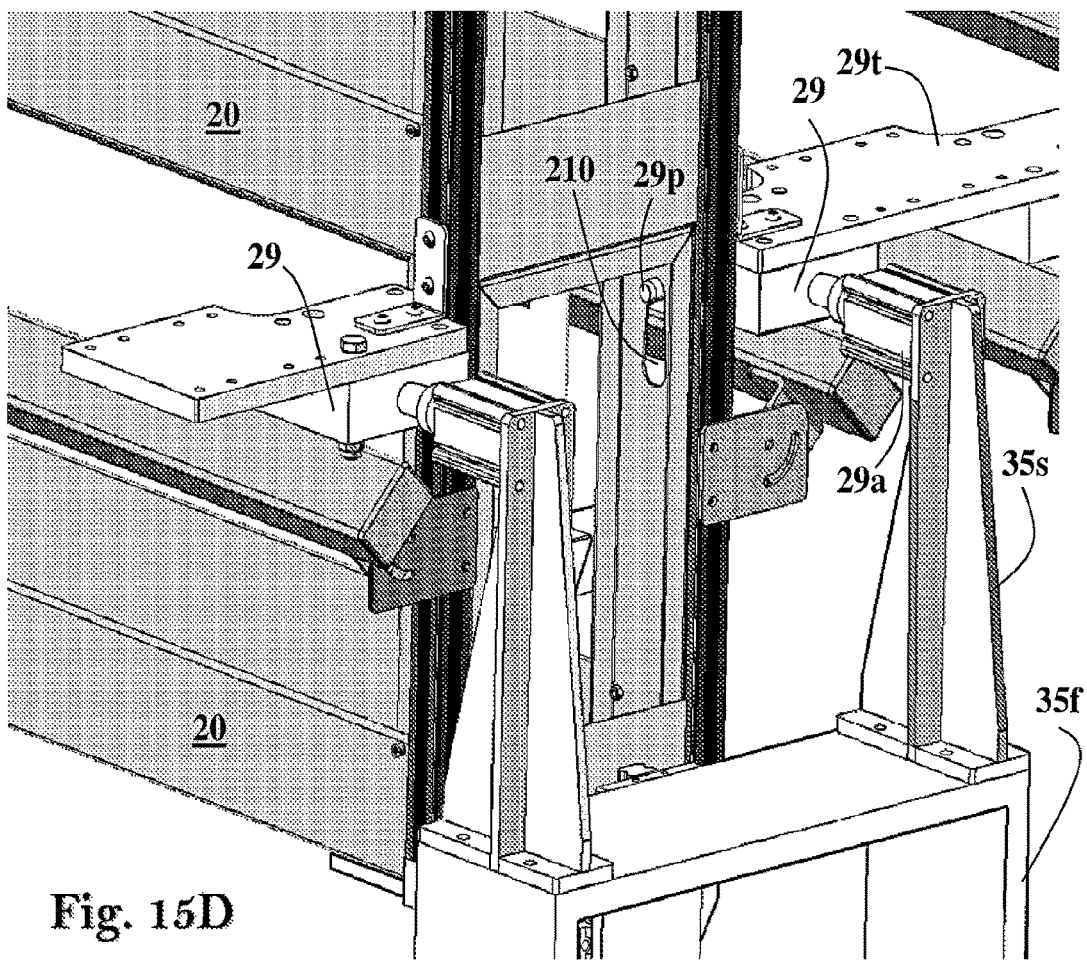

FIGS. 15C and 15D illustrate growing tray 20 displacement by the lifting mechanism, and utilizing a lock manipulator (e.g., piston mechanism) 29a mounted on support elements 35s vertically upwardly extending from the sliding frame 35f. Each lock manipulator 29a is configured to engage a respective locking mechanism 29 of the growing tower 30 and (e.g., mechanically, magnetically, electrically) manipulate it to change the locking pin 29p between the released and locked states.

Figure 16A:
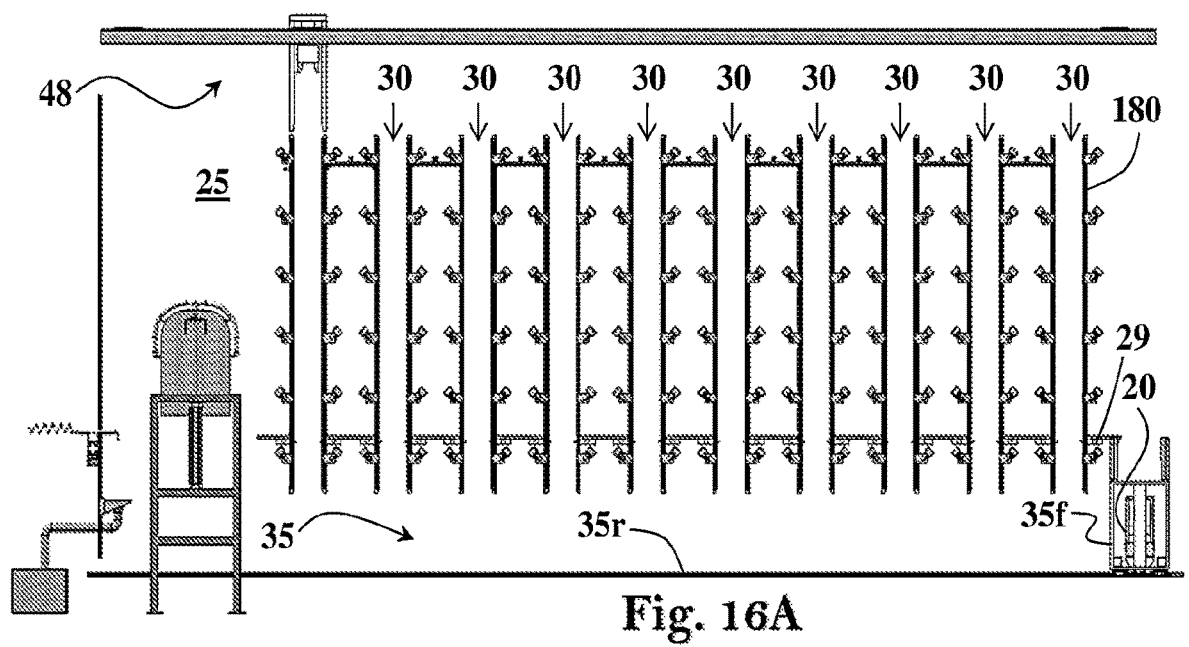
FIGS. 16A to 16E exemplify a growing tray loading according to possible embodiments.
Figure 16B:
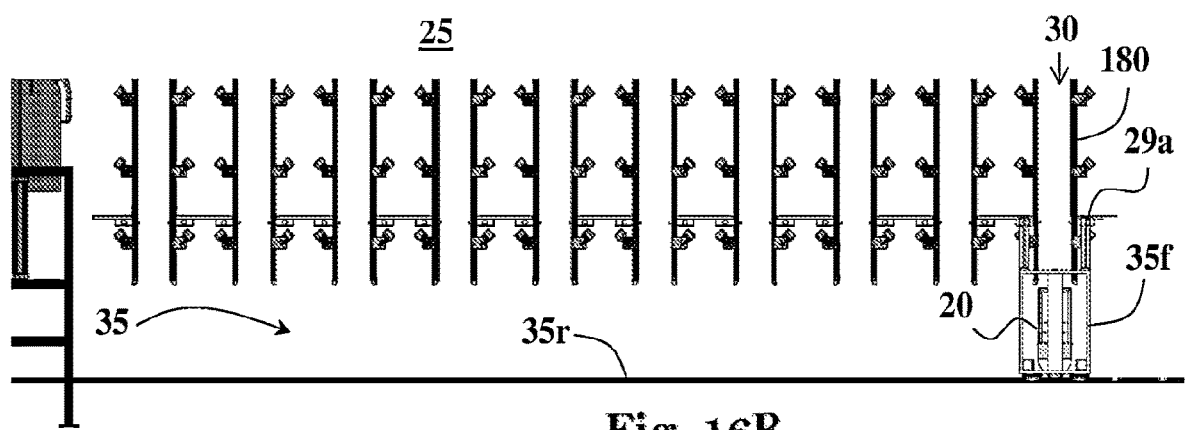

FIGS. 16A to 16E illustrate a crop growing module 25 population sequence according utilizing the bottom tray conveying system 35 of FIGS. 15A to 15D. In FIG. 16A the growing towers 30 of the crop growing module 25 are all empty, and a first growing tray 20 is introduced into the crop growing module 25 e.g., via its inlet/outlet port 27, and loaded onto the sliding frame 35f of the bottom tray conveying system 35. In FIG. 16B the sliding frame 35f is moved to a selected one of the growing towers 20, and its lock manipulators 29a are engaged with their respective locking mechanisms 29 of the growing tower 30 and operated for moving the respective locking pins 29p into their released state.

Figure 16C:
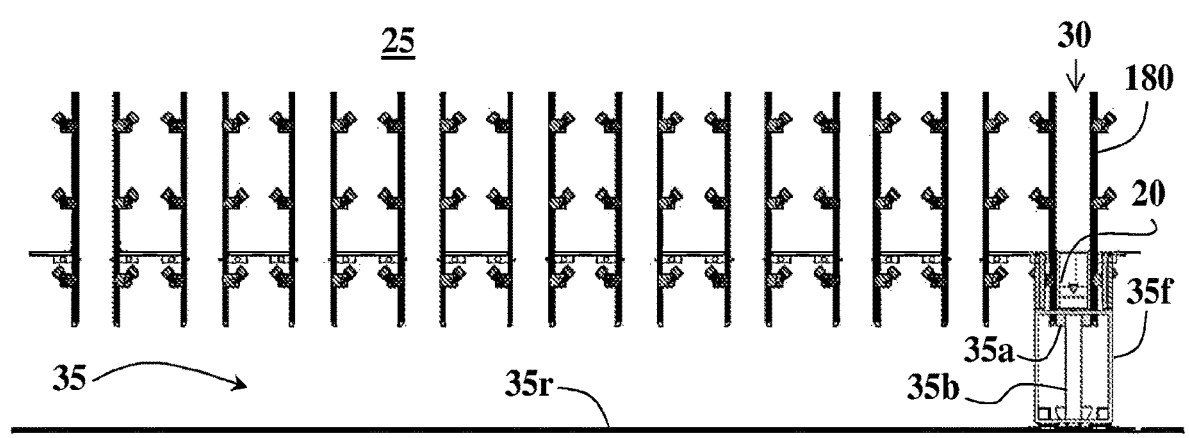
Figure 16D:
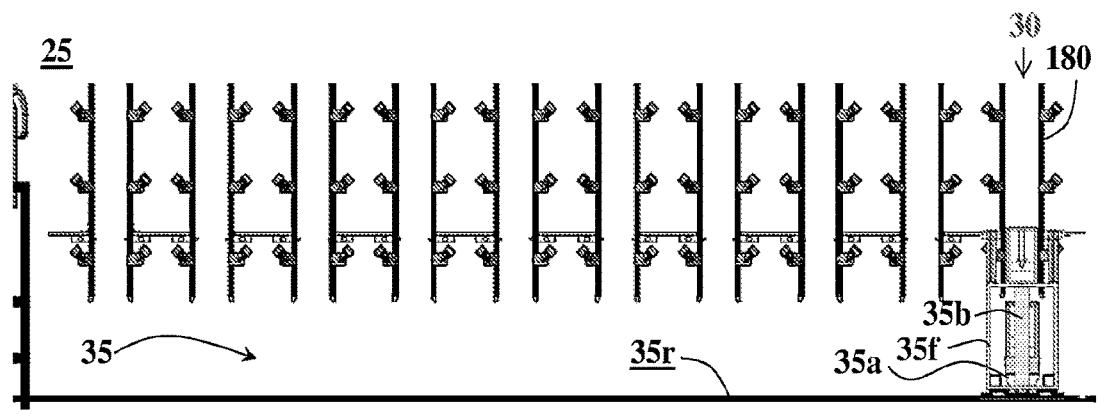

In FIG. 16C the lift-platform 35a is moved vertically along the vertical bars 35b of the sliding frame 35f to translate the growing tray 20 into the bottommost tray-location of the growing tower 30, whereupon the lock manipulators 29a are operated again to cause their respective locking mechanisms 29 to move the locking pins 29p into their locked states, thereby securing the growing tray 20 at the bottommost tray-location of the growing tower 30. In FIG. 16D the flit platform 35a is moved vertically downwardly to the base of the sliding frame 35f.

Figure 16E:
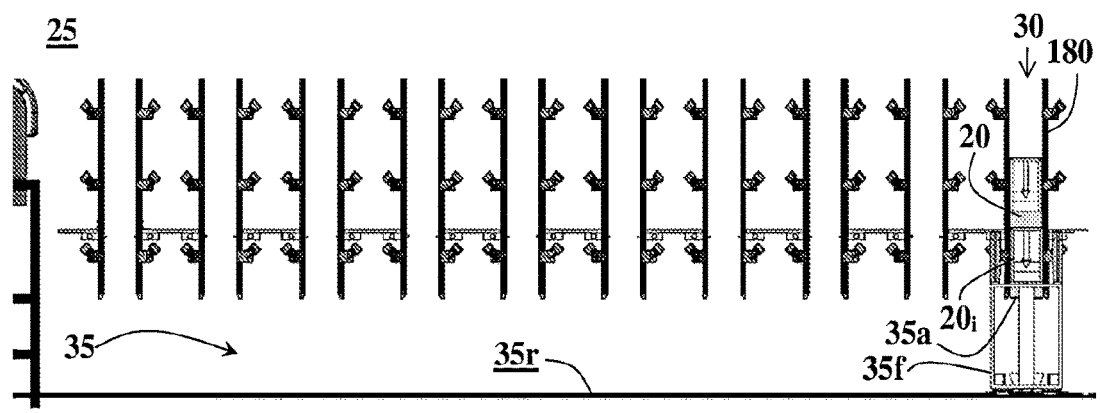

In FIG. 16E a new growing frame $20_i$ is introduced onto the sliding frame 35f e.g., via its inlet/outlet port 27, and lifted vertically upwardly by the lift platform 35a into the growing tower 30 after its lock manipulators 29a are operated for changing the respective locking pins 29p into their released state. As the new growing tray $20_i$ is moved upwardly in the growing tower 30 is pushes the bottommost growing tray 20, and any other growing tray 20 stacked thereon, upwardly along the growing tower. When the new growing tray $20_i$ is positioned in the bottommost tray-location in the growing tower 30, its lock manipulators 29a are operated for changing the respective locking pins 29p into their locked states, whereafter the lift platform 35a is moved back downwardly to the base of the sliding frame.

The growing tray population sequence demonstrated in FIGS. 16A to 16E can be repeated any number of times to introduce new growing trays to selected growing towers 30 of the crop growing module 25, until allocated tray-locations of the growing towers 30 are fully/partially populated. After the crop growing module 25 is fully/partially populated with growing trays 20 growing cycle can be commenced, as disclosed herein.

Figures 17A, 17B, 17C:
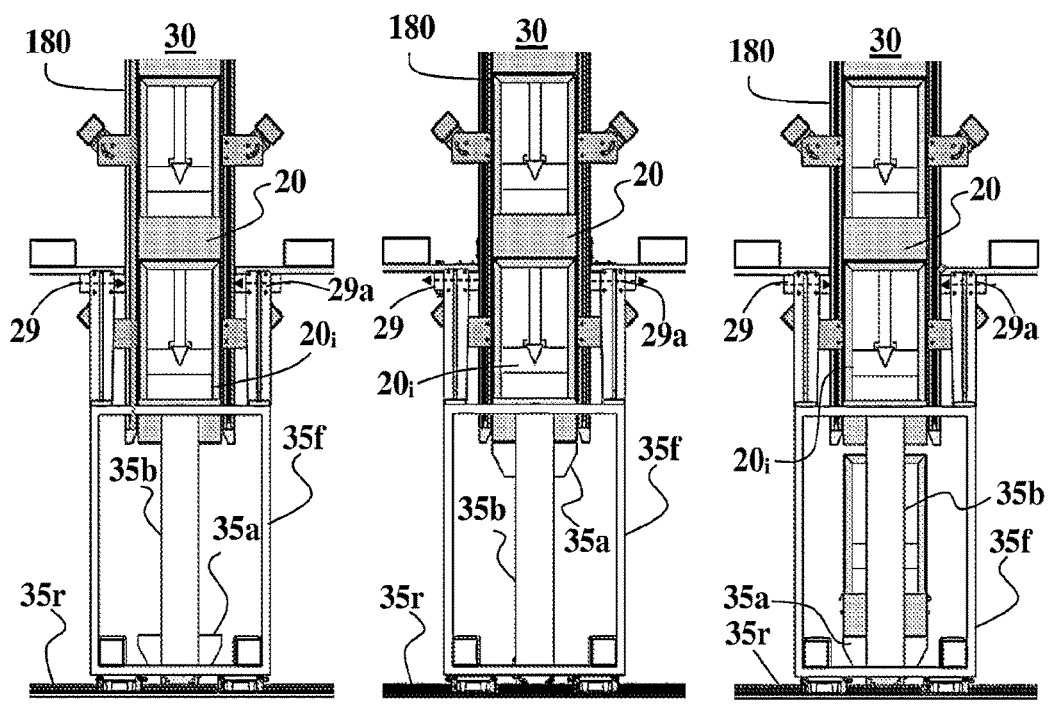
FIGS. 17A to 17C exemplify growing tray unloading according to possible embodiments utilizing a tray locking mechanism.

FIGS. 17A to 17D exemplify a growing tray 20 unloading sequence according to possible embodiments. In FIG. 17A the sliding frame 35f is moved over the rails 35r to a selected one of the growing towers 30, and its lock manipulators 29a are engaged with the respective locking mechanisms 29 of the growing tower 30. In FIG. 17B the lift platform 35a is moved vertically upwardly until it reaches the growing tray $20_i$ at the bottommost tray-location in the growing tower 30, whereupon its lock manipulators 29a are operated for changing the respective locking pins 29p into their released states for releasing the growing tray $20_i$ onto the lift platform 35a. In FIG. 17c the lift platform 35a is moved downwardly back to the base of the sliding frame 35f, thereby translating the growing tray placed thereon into the sliding frame, and causing all other growing trays stacked thereon to move one level downwardly. This way, when a growing tray 20 from an upper level of the growing tower 30 reached the bottommost tray-location, the lock manipulators 29a are operated again for changing the respective locking pins 29p into their locked states, thereby the securing the growing tray 20 descending from the upper level in the bottommost tray-location of the growing tower 30.

Figure 18A:
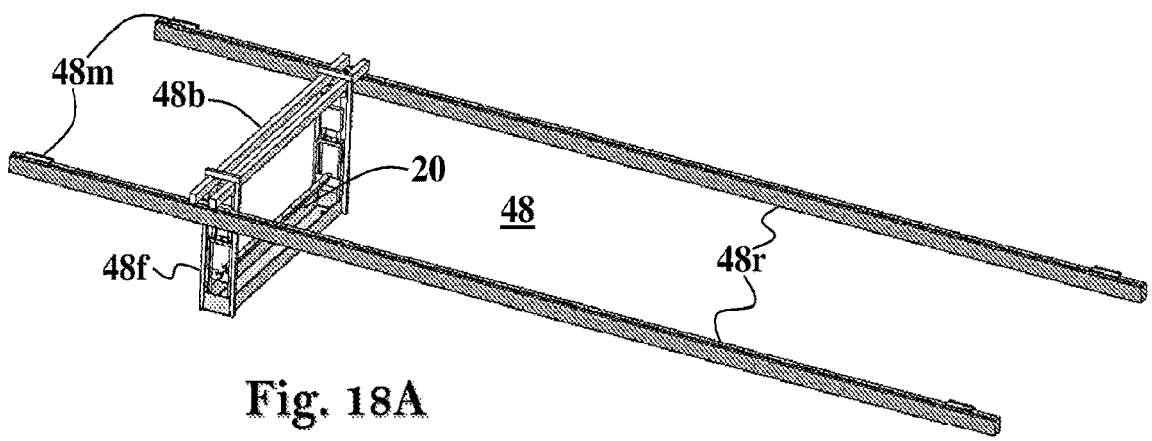
FIGS. 18A to 18F show a possible configuration of the top tray conveying system.
Figure 18B:
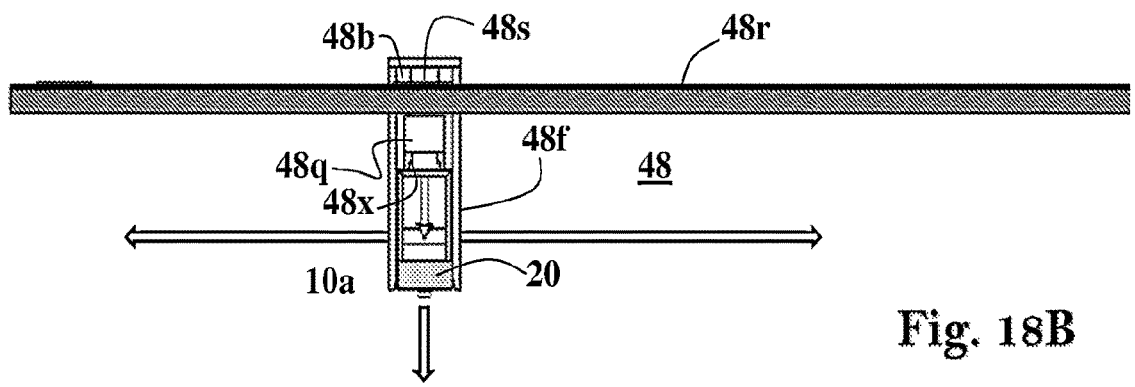
Figure 18C:
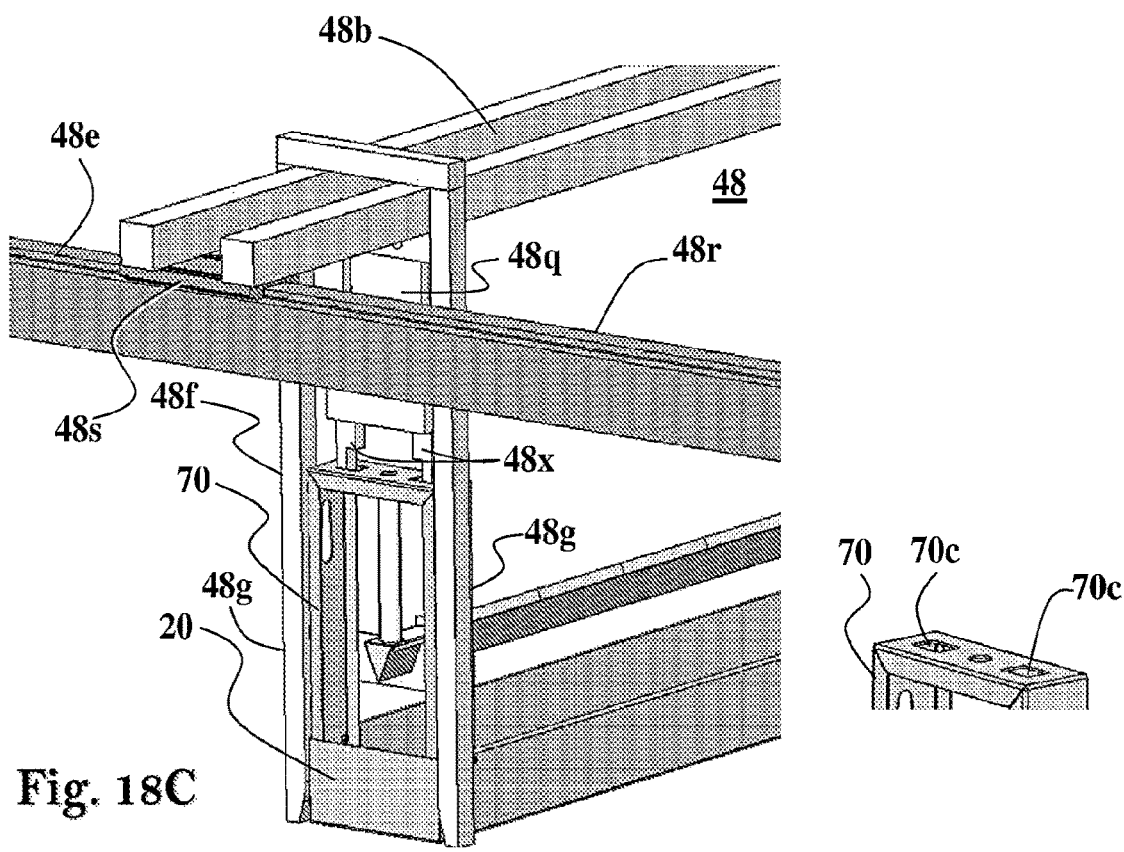

FIGS. 18A to 18C illustrate a top tray conveying system 48 according to some possible embodiments. The top tray conveying system 48 comprises elongated rails 48r extending above and along the horticulture crop growing module 25, a motor transmission unit 48m coupled for revolving a (e.g., timing) endless belt 48e passing along or inside the elongated rails 48r, and a tray carrier assembly 48f coupled to the endless belt 48e via one or more support elements 48s, so as to translate the tray carrier assembly 48f along the elongated rails 48r. This way the tray carrier assembly 48f can be moved to one end of the elongated rails 48r to receive/transfer a growing tray 20 from/to the growing tray lift 45, and therefrom to any one of the growing towers 30 of the horticulture crop growing module 25 to transfer/receive growing tray 20. In some embodiments one or more plant treatment and/or monitoring stations are located above at least some of the growing towers 30, and top tray conveying system 48 is utilized to transfer growing trays from the growing tray lift 45, or from one of the growing towers 30, to the treatment and/or monitoring stations for thereby applying one or more treatments and/or monitoring.

The tray carrier assembly 48f comprises one or more carrier bars 48b (two in this specific example) coupled to the support elements 48s for moving the tray carrier assembly 48f along the elongated rails 48r, two pairs of linear guides 48g extending downwardly from the end portions of the carrier bars 48b, and a tray slider mechanism 48q movable located between each pair of linear guides 48g. The tray slider mechanism 48q is configured to grip and hold a growing tray 20 and controllably slide the growing tray 20 thereby gripped along the pair of linear guides 48g, for moving the growing tray 20 downwardly or upwardly to/from a selected one of the growing tower 30 or the support arms 140 of the growing tray lift 45, or for approaching and gripping a topmost growing tray 20 in one of growing towers and moving it therefrom upwardly e.g., for transfer by growing tray lift 45 or to another one of the growing towers 30, or for applying one or more treatments and/or monitoring in one or more of the treatment/monitoring stations.

Figure 18F:
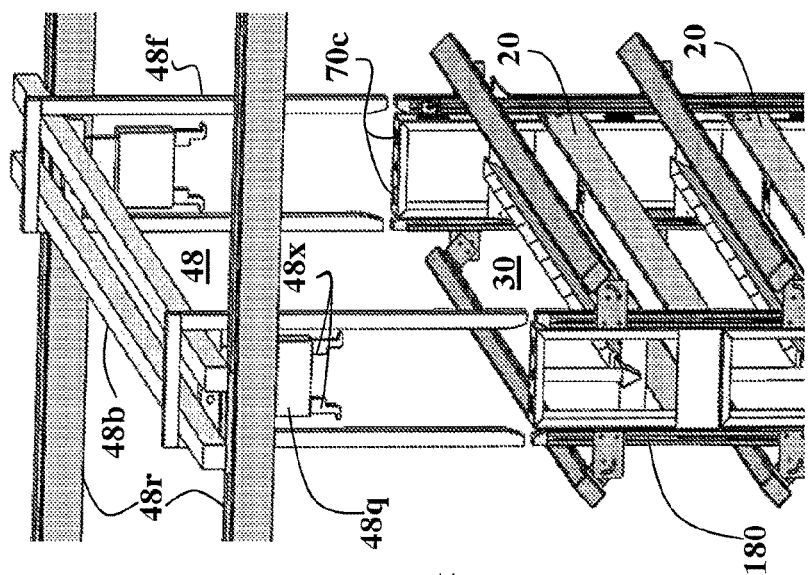
Figure 18E:
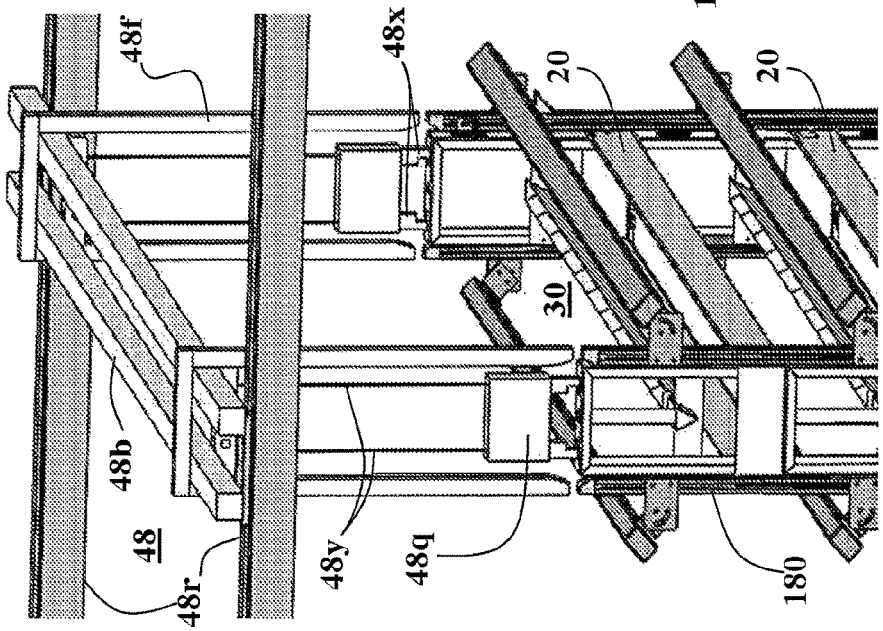
Figure 18D:
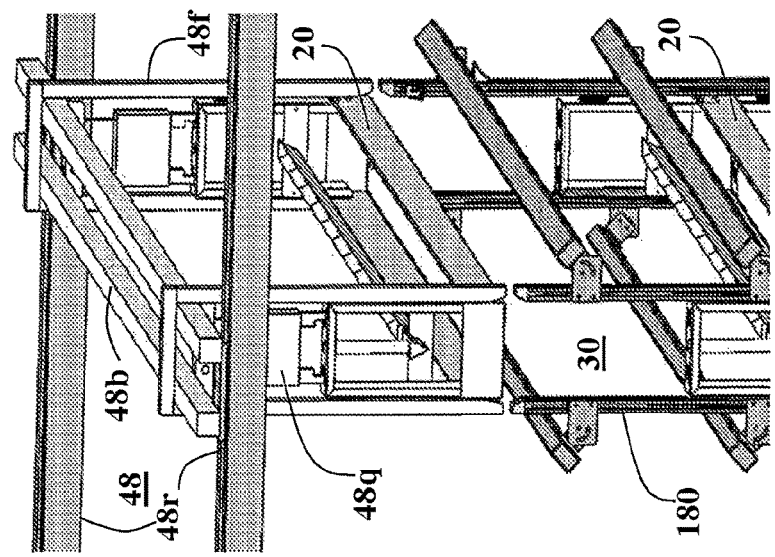

In this configuration the frame 70 of the growing tray 20 comprises one or more gripping holes 70c e.g., two gripping holes 70c formed in the upper portion of the frame 70, configured to receive respective gripping arms 48x of the tray slider mechanism 48q for gripping and moving the same. FIGS. 18D to 18F illustrates a growing tray transfer sequence carried out utilizing the top tray conveying system 48. In FIG. 18D the tray carrier assembly 48f loaded with a growing tray 20 gripped by its tray slider mechanism 48q for moving the tray 20 to a selected one of the growing towers 30 e.g., fetched from another one of the growing towers 30 or from the growing tray lift 45.

Figure 22A:
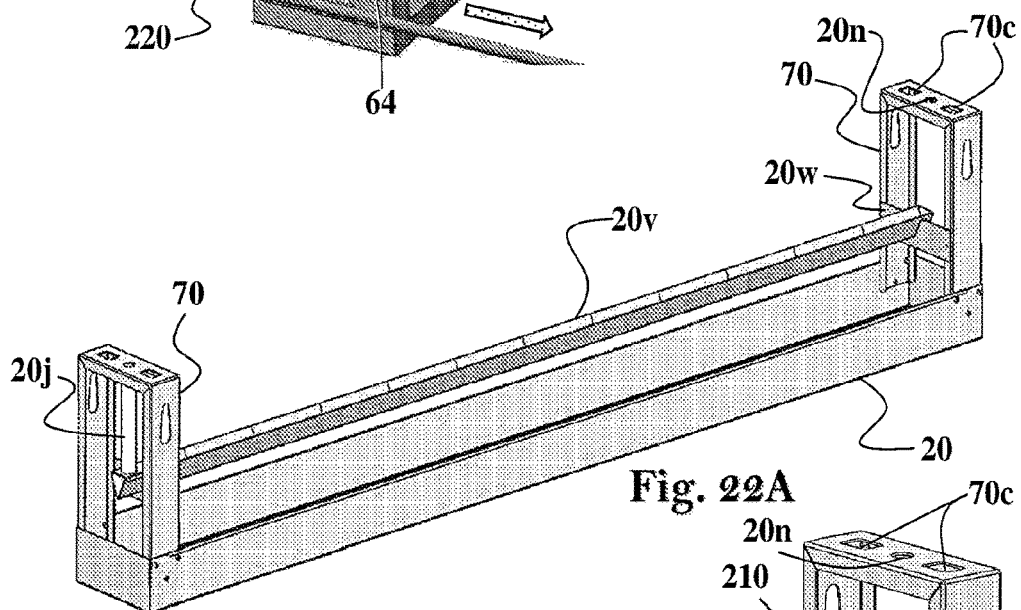
Figure 22B:
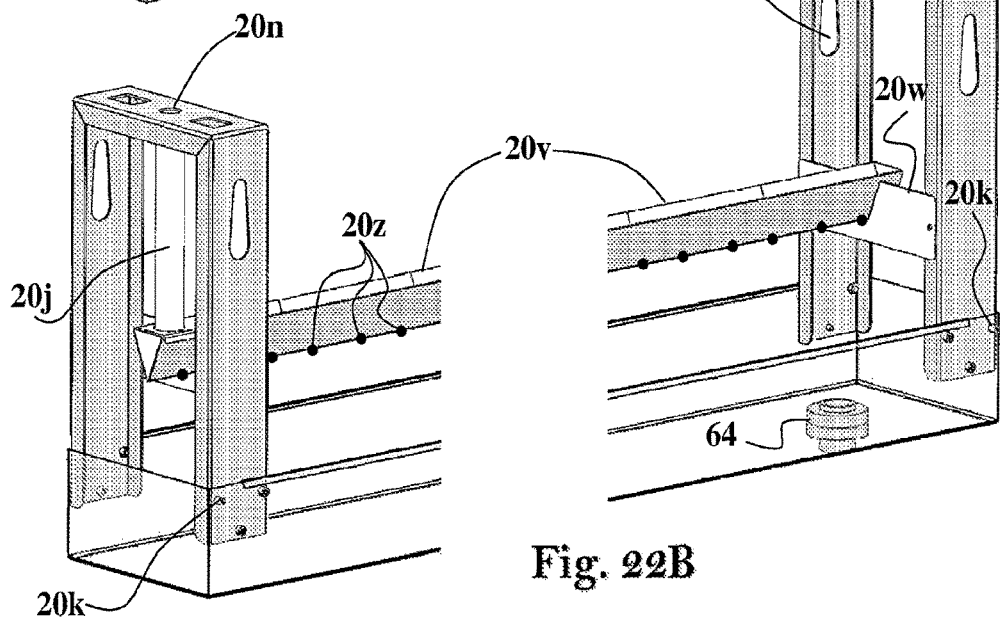
Figure 22C:
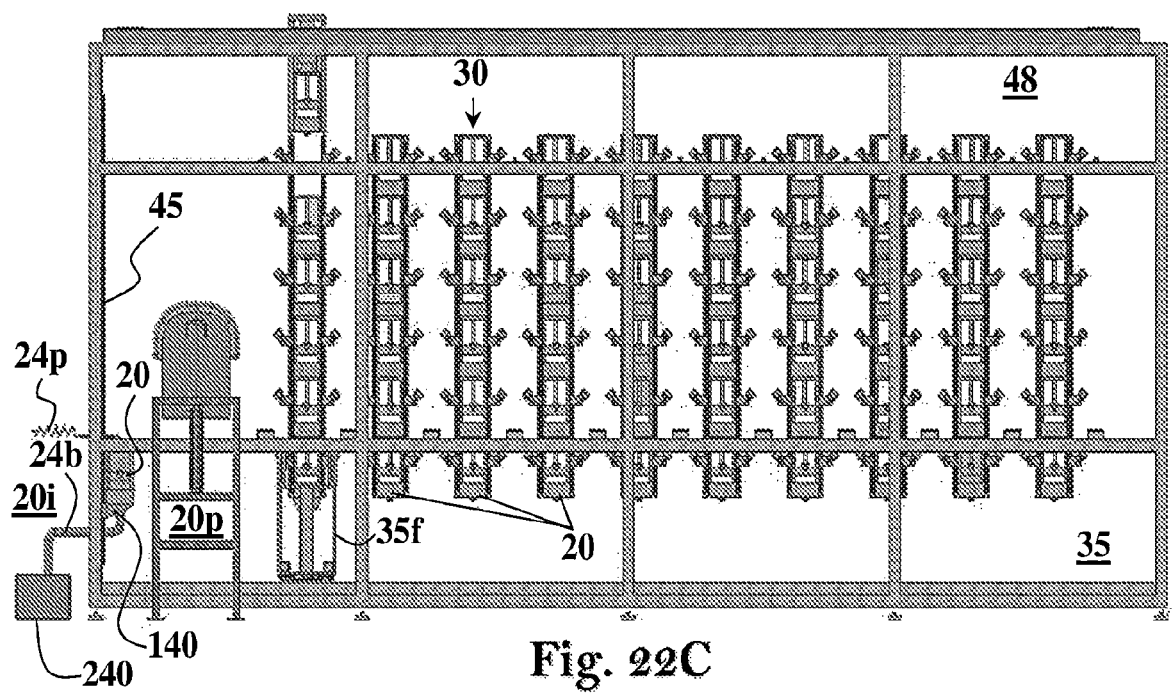
Figure 22D:
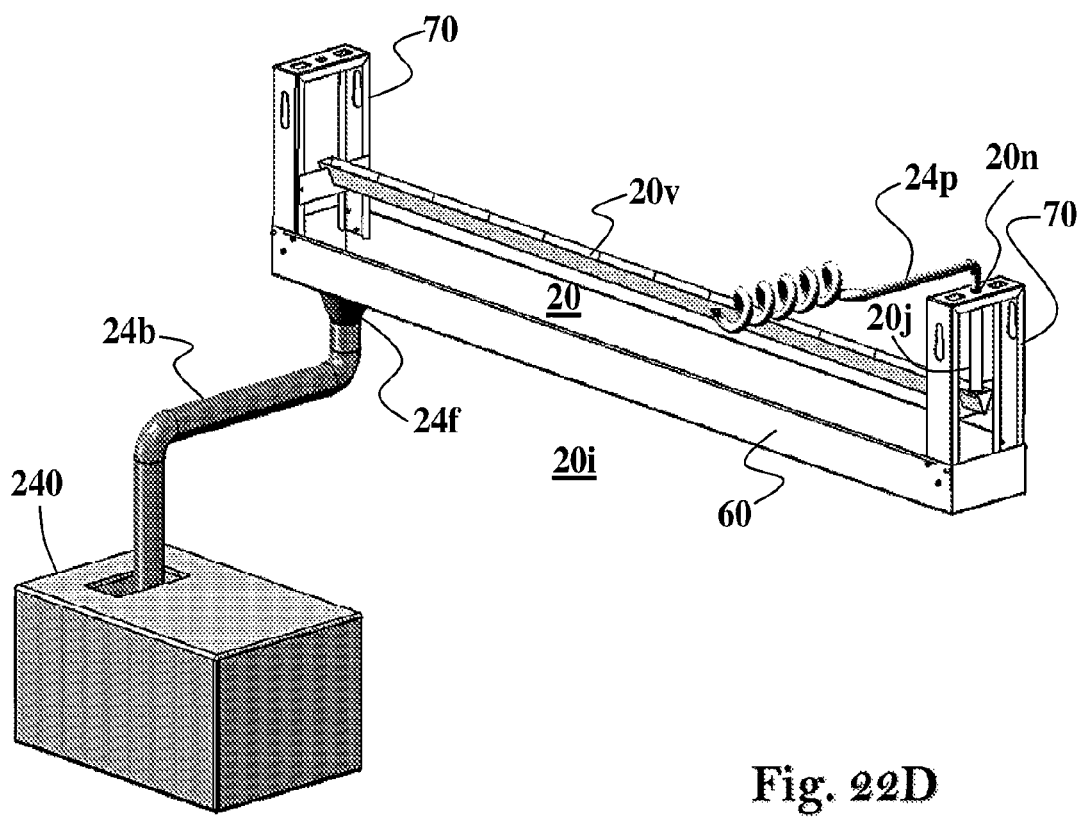
Figure 24A:
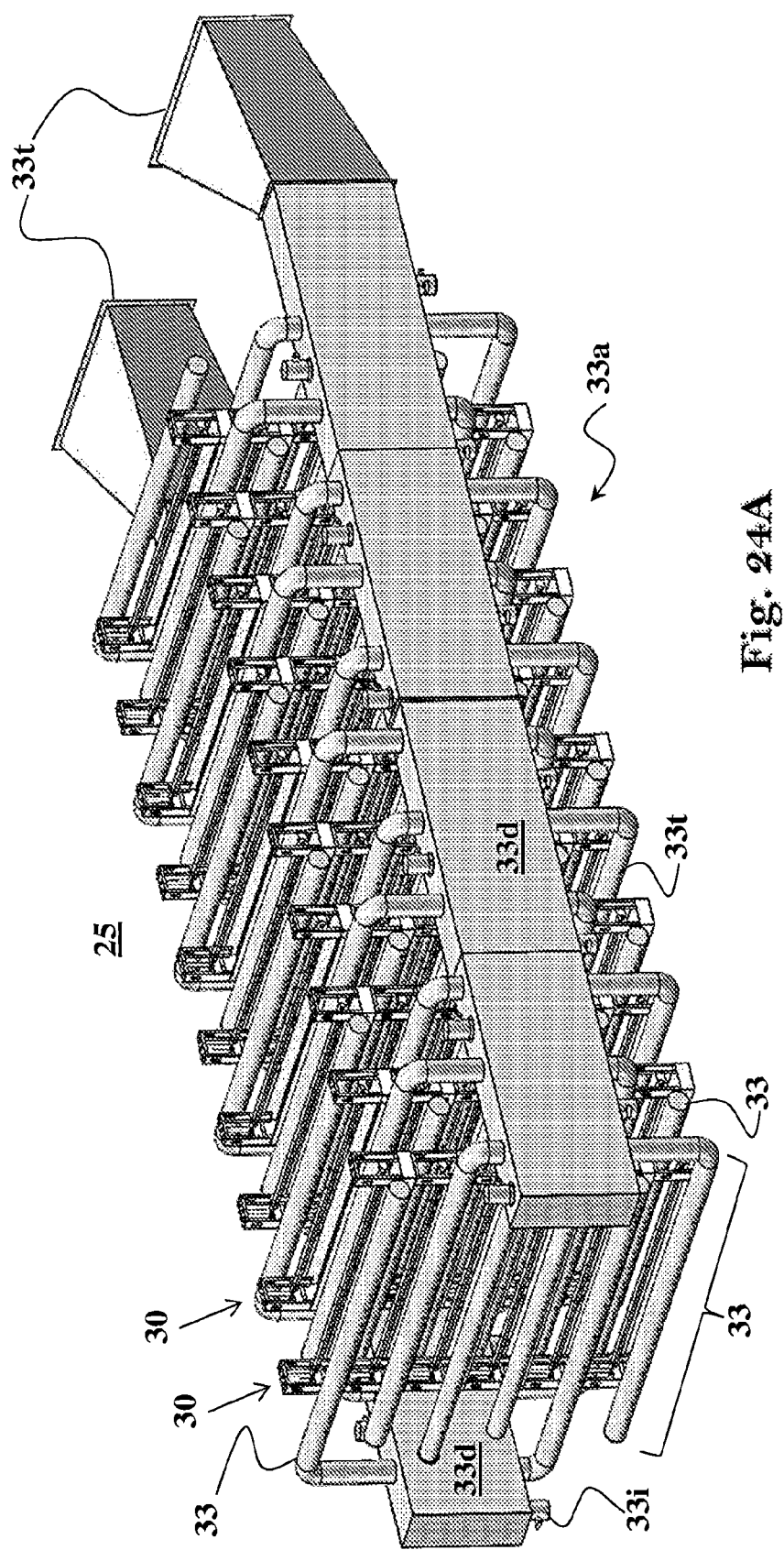
FIGS. 24A to 24D show a system ventilation arrangement of possible embodiments.
Figure 24B:
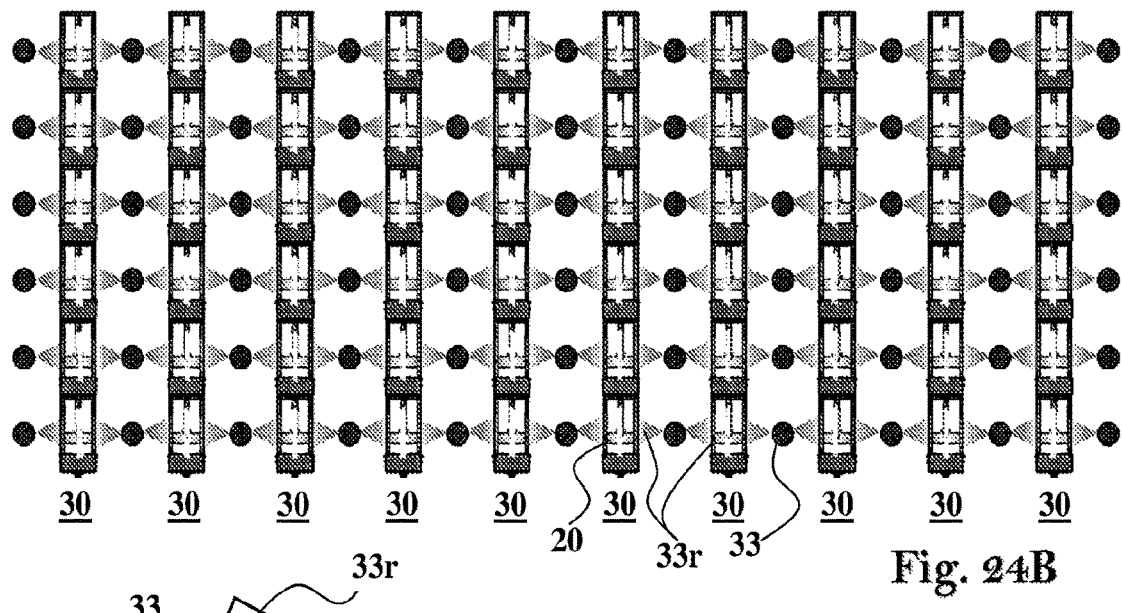
Figure 24C:
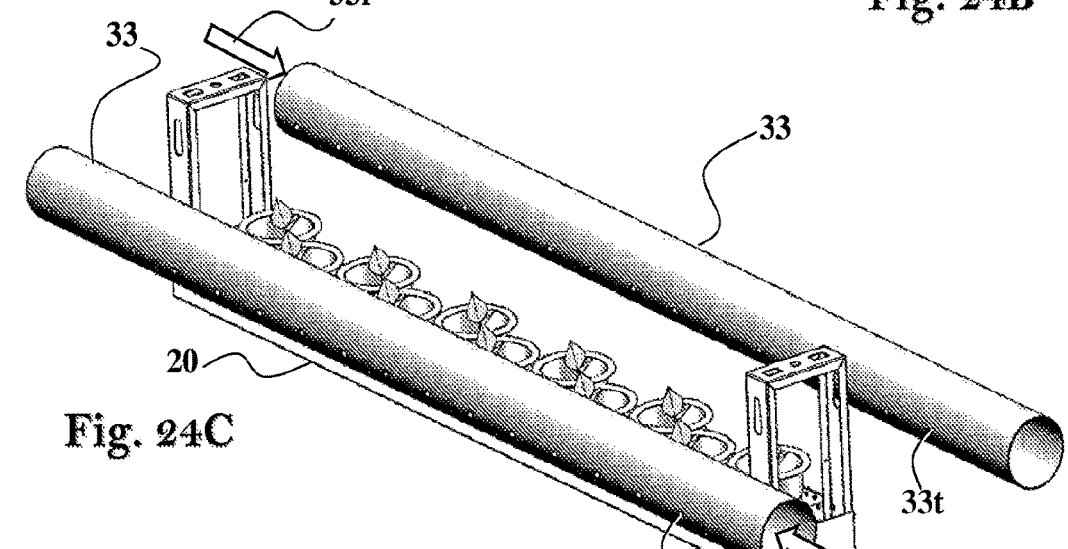
Figure 24D:
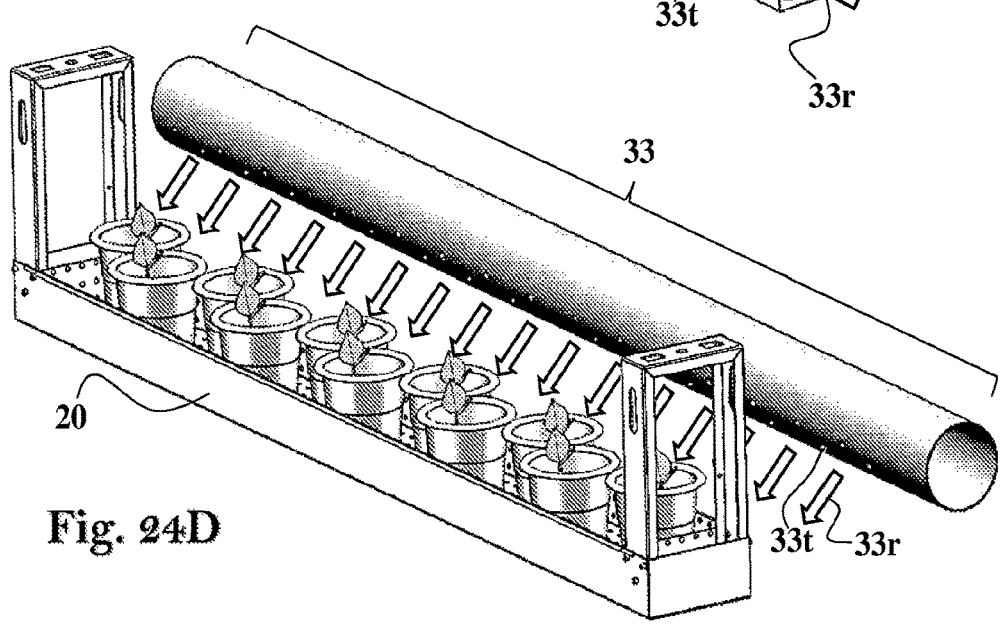

In FIG. 18E the growing tray 20 is moved downwardly e.g., by lifter-cables 48y coupled to the tray slider mechanism 48q, so as to engage the growing tray 20 for sliding motion with guiding channels (not shown) of the support frame 180 of the growing tower 30 e.g., utilizing the sliding pins 20k shown in FIG. 22B. This way, the growing tray 20 is slid downwardly along the support frame 180 of the growing tower 30 until it abuts another growing tray 20, typically locating the slid growing tray at the topmost tray-location of the growing tower 30. After the growing tray 20 is positioned in the growing tower 30 the gripping arms 48x are changed from a tray gripping state into their tray released state e.g., they are moved one with respect to/towards the other, such that gripping tips/fingers thereof can be released from the gripping holes 70c of the growing tray 20. After changing the gripping arms 48x into their tray released state, the tray slider mechanism 48q is retracted upwardly e.g., by the lifter-cables 48y, back to its undeployed state adjacent to the carrier bars 48b, as shown in FIG. 18E.

Figure 19A:
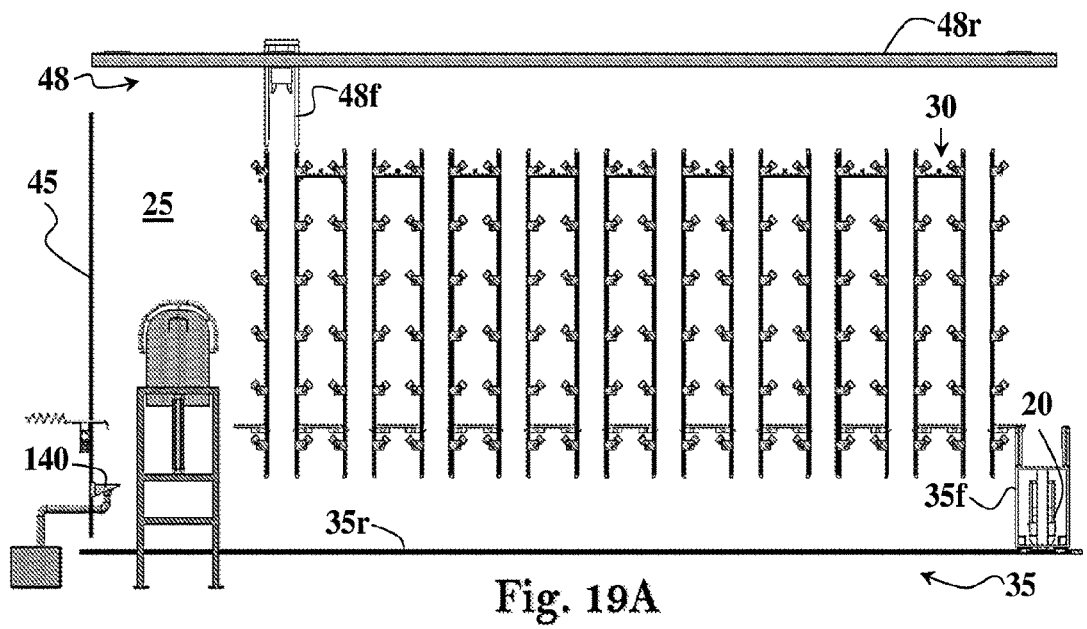
FIGS. 19A to 19K demonstrate growing tray loading utilizing the top tray conveying system.
Figure 19B:
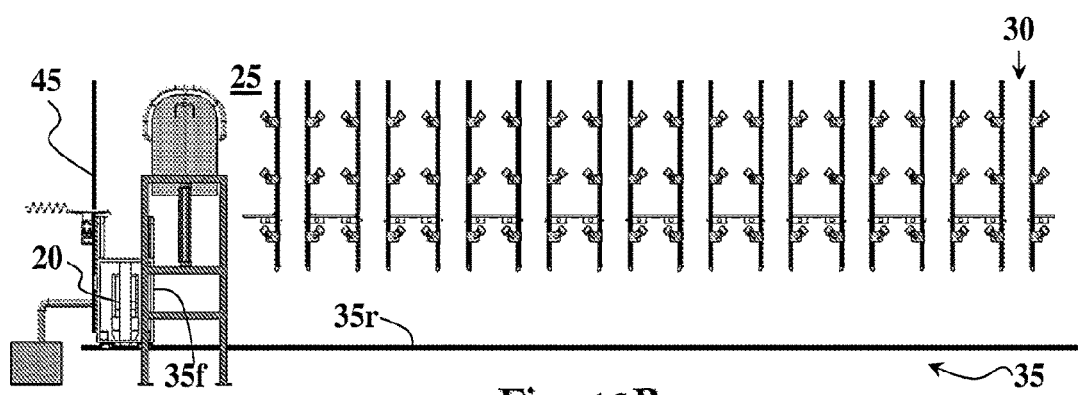
Figures 19C, 19D, 19E:
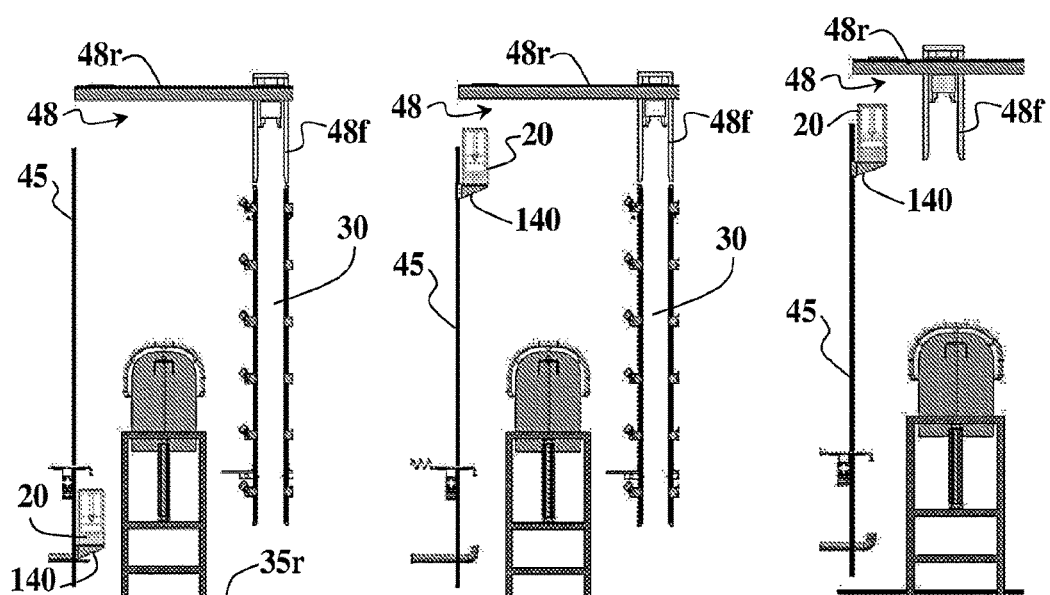
Figure 19F:
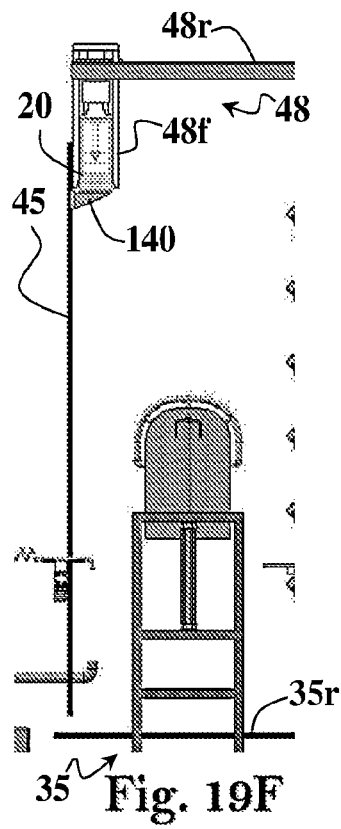

FIGS. 19A to 19K demonstrate growing tray loading sequence utilizing according to some embodiments the top tray conveying system 48. FIG. 19A depicts a horticulture crop growing module 25 of some possible embodiments, before introducing any growing trays 20 into its growing towers 30. The sliding frame 35f of the bottom tray conveying system 35 is seen loaded with a growing tray 20 e.g., received via the tray inlet/outlet port 27. In FIG. 19B the sliding frame 35f is moved over the rails 35r of the bottom tray conveying system 35 towards the growing tray lift 45, and in FIG. 19C the growing tray 20 is transferred from the sliding frame 35f of the bottom tray conveying system 35 to the growing tray support arm 140 of the growing tray lift 45. In FIG. 19D the growing tray lift 45 moves the growing tray 20 upwardly towards the top tray conveying system 48, in FIG. 19E the tray carrier assembly 48f of the top tray conveying system 48 is moved over the rails top 48r towards the growing tray lift 45, and in FIG. 19F the growing tray 20 is engaged by the tray carrier assembly 48f.

Figure 19G:
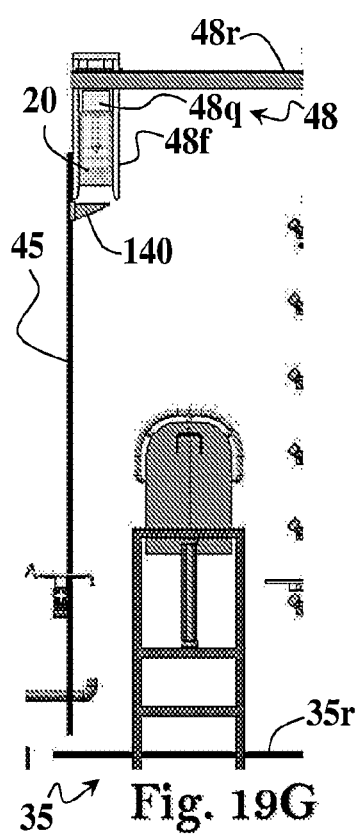
Figure 19H:
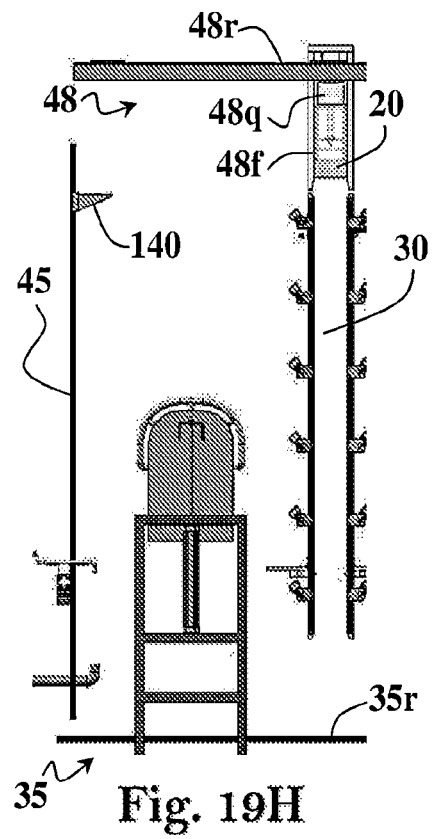
Figure 19I:
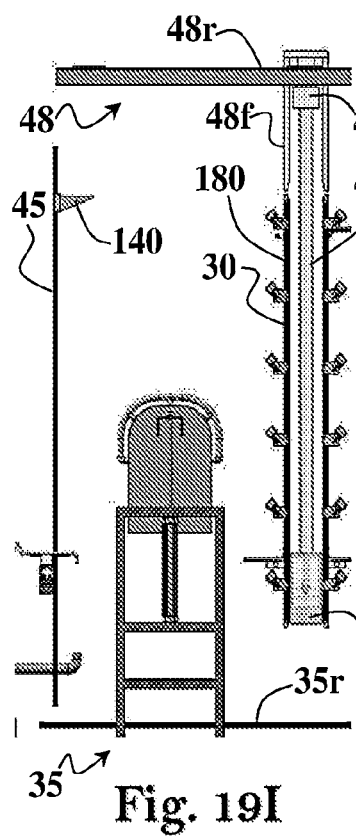
Figure 19J:
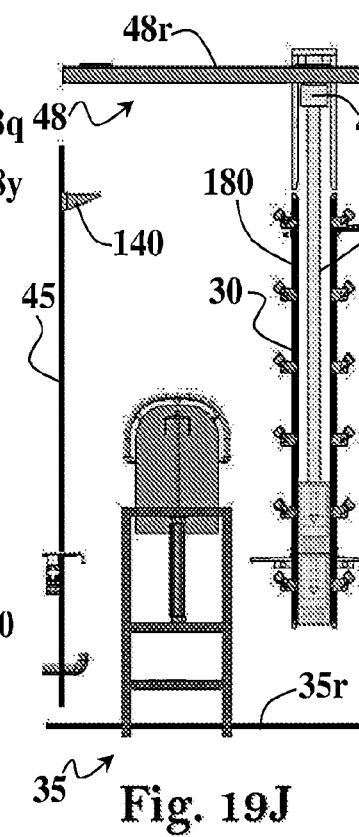

In FIG. 19G the tray slider mechanism 48q is moved down to engage the gripping holes 70c with the gripping tips/fingers of its gripping arms 48x, which are then changed into their gripping state e.g., by moving them one away from the other, to thereby provide a grip over the growing tray 20. In FIG. 16H the tray carrier assembly 48f is moved over the top rails 48r with the gripped growing tray 20 to a selected one of the growing towers 30. In FIG. 19I the gripped growing tray 20 is moved downwardly/lowered by the tray slider mechanism 48q e.g., by the lifter-cables 48y, along the guiding channels (not shown) of the support frame 180 of the tower, to an allocated location in the growing tower 30, which in this example is the bottommost tray-location of the tower 30. The growing tray 20 can be then secured to the support frame 180 by the locking pins 29p of the locking mechanism 29, and the gripping arms 48x of the tray slider mechanism 48q can be changed from their tray gripping state into their tray released state for lifting the tray slider mechanism 48q upwardly back to its undeployed state.

Figure 19K:
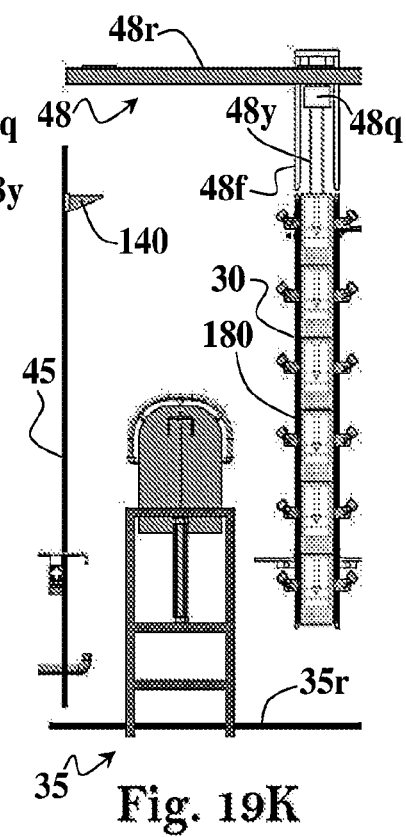

FIG. 19K depicts placement of a new growing tray 20 in the horticulture crop growing module 25 after carrying out the steps illustrated in FIGS. 19A to 19H. As seen, the new growing tray 20 is gripped by the tray slider mechanism 48q and lowered/moved downwardly e.g., by the lifter-cables 48y, along the guiding channels (not shown) of the support frame 180 of the tower, to an allocated location in the growing tower 30, which in this example is the tray-location above the bottommost tray-location of the tower 30. The growing tray 20 can be then secured to the support frame 180 by the locking pins 29p of the locking mechanism 29, and the gripping arms 48x of the tray slider mechanism 48q can be changed from their tray gripping state into their tray released state for lifting the tray slider mechanism 48q upwardly back to its undeployed state. As shown in FIG. 19K, the steps illustrated in FIGS. 19A to 19I can be repeated any number of time for at least partially filling at least one, or all, of the growing towers 30.

Figure 20:
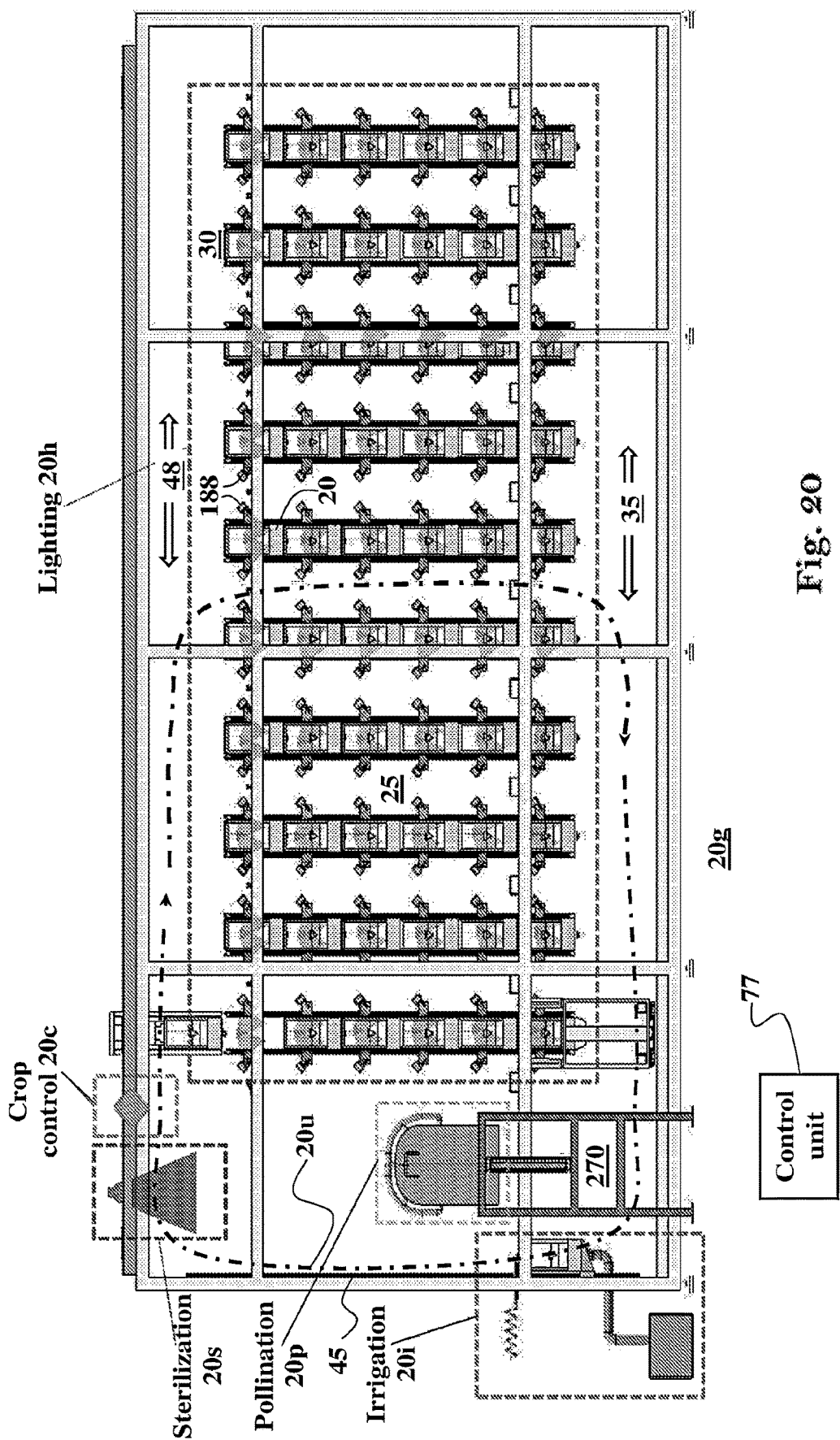
FIG. 20 illustrates a plants growing arrangement and cultivation cycle of possible embodiments.

FIG. 20 illustrates plants growing arrangement 20g according to some possible embodiments. In some embodiments each horticulture crop growing module 25 is configured to form a tray cultivation cycle 20u implemented utilizing the bottom tray conveying system 35, the growing tray lift 45, the top tray conveying system 48, and the vertical growing tray translation mechanism implemented in each of the growing towers 30. For example, the tray cultivation cycle 20u comprises in some embodiments a pollination station 20p (e.g., such described herein with reference to FIGS. 25A to 25H), and/or irrigation station 20i (e.g., such described herein with reference to FIGS. 22A to 22D), and/or a sterilization station 20s (e.g., a radiation station as described hereinabove), and/or a crop control/monitoring station 20c (e.g., such described herein with reference to FIGS. 27A and 27B), and/or a lighting arraignment 20h e.g., wherein one or light emitters 188 are arranged at each tray-location of the growing towers 30, such as described hereabove, which may be arranged in any suitable order.

As also seen in FIG. 20, in some embodiments each tray-location in each growing tower 30 comprises one or more treating members 188. In this specific example each tray-location includes two such treating members 188, used to irradiate the plants with emitted light (e.g., using light emitting diodes—LEDs) and/or ventilate the plants in each growing tray 20, as will described hereinbelow with reference to FIGS. 24A to 24D.

In possible embodiments the irrigation arrangement illustrated in FIGS. 22A to 22D is utilized to individually irrigate the growing trays 20, one at a time, in the irrigation station 20i. For this purpose, in some embodiments the growing tray 20 comprises one or more perforated liquid troughs element 20v (e.g., a single trough 20v is shown in this example) extending along a length of the growing tray 20 e.g., attached by support element 20w to the frames 70 of the growing tray 20, and one or more liquid tubes 20j (e.g., a single tube 20j is shown in this example) extending downwardly from a liquid inlet port 20n formed in the upper side of the frame 70 towards the perforated liquid trough element 20v. The liquid tube 20j is configured to receive irrigation liquids via liquid inlet port 20n and stream the same by gravitation to the perforated liquid trough element 20v, wherefrom the streamed irrigation liquids are sprinkled onto the plants via the perforations 20z.

As seen in FIGS. 22C to 22H, the irrigation station 20i is configured in some embodiments to receive a growing tray 20 from selected one or more growing towers 30, via the bottom tray conveying system 35. The sliding frame 35f retrieves a growing tray 20 from the growing tower 30, and transfers it to a tray support arm 140 of the tray lift 45, wherein a liquid supply pipe 24p is fluidly coupled to the liquid inlet port 20n of the growing tray 20, and a liquid drain pipe 24b is fluidly coupled to the normally closed valve 64 of the growing tray 20 via an interfacing funnel element 24f, thereby changing the normally closed valve 64 into its opened state. This way, while irrigation liquids are supplied by the liquid supply pipe 24p to the perforated trough 20v and sprinkled on the plants via the perforations 20z, residual irrigation liquids accumulated inside the tray-like portion 60 of the growing tray 20 are drained via the liquid drain pipe 24b into the drainage container 240.

After supplying a certain amount of the irrigation liquids to the growing tray 20, the liquid supply pipe 24p and the liquid drain pipe 24b are removed/retracted and the growing tray 20 is moved back to an allocated location in one of the growing towers 30 e.g., by lifting it by the tray lift 45 to the top tray conveying system 48 for lowering the growing tray 20 into a selected one of the growing towers 30, or by transferring it back to the sliding frame 35f and lifting it into a selected one of the growing towers 30.

FIGS. 23A to 23C show a draining arrangement 28 usable in some embodiments for removal of residual irrigation liquids accumulated inside the tray-like portion 60 of the growing tray 20. The draining arrangement 28 comprises a tilting element 28a configured to apply a predefined tilt angle to the growing tray 20, after the irrigation liquid supply is stopped, in order to drain the residual liquids accumulated inside the tray-like portion 60 towards the normally closed valve 64. Optionally, but is some embodiments preferably, a normally open valve is provided at the irrigation outlet port of the growing trays, or alternatively, the irrigation outlet port is provided without any valve, such that the residual irrigation liquids accumulated in the growing tray are drained therefrom in a continuous and uninterrupted manner.

FIGS. 24A to 24D show a system ventilation arrangement 33a used in possible embodiments to stream gas/air onto growing trays 20 of the horticulture crop growing module 25. In this embodiment, the tray-locations of each growing tower 30 comprise one or more gas/air distribution pipes 33 having a plurality of gas/air outlets 33t for streaming gas/air onto the plants in the growing trays 20. The ventilation arrangement 33a comprises in some embodiments one or more main gas/air ducts 33d from which a plurality of the gas/air distribution pipes 33 extend towards the growing trays 30. In this specific example there are main gas/air ducts 33d mounted at lateral sides of the horticulture crop growing module 25, and the gas/air distribution pipes 33 are alternatingly distributed from the main gas/air ducts 33d at each side of the growing towers 30. The main gas/air ducts 33d are configured to received gas/air streamed thereto via a gas/air inlet(s) 33i, and use gas/air ducting transition elements 33t for streaming of the gas/air.

Figure 26:
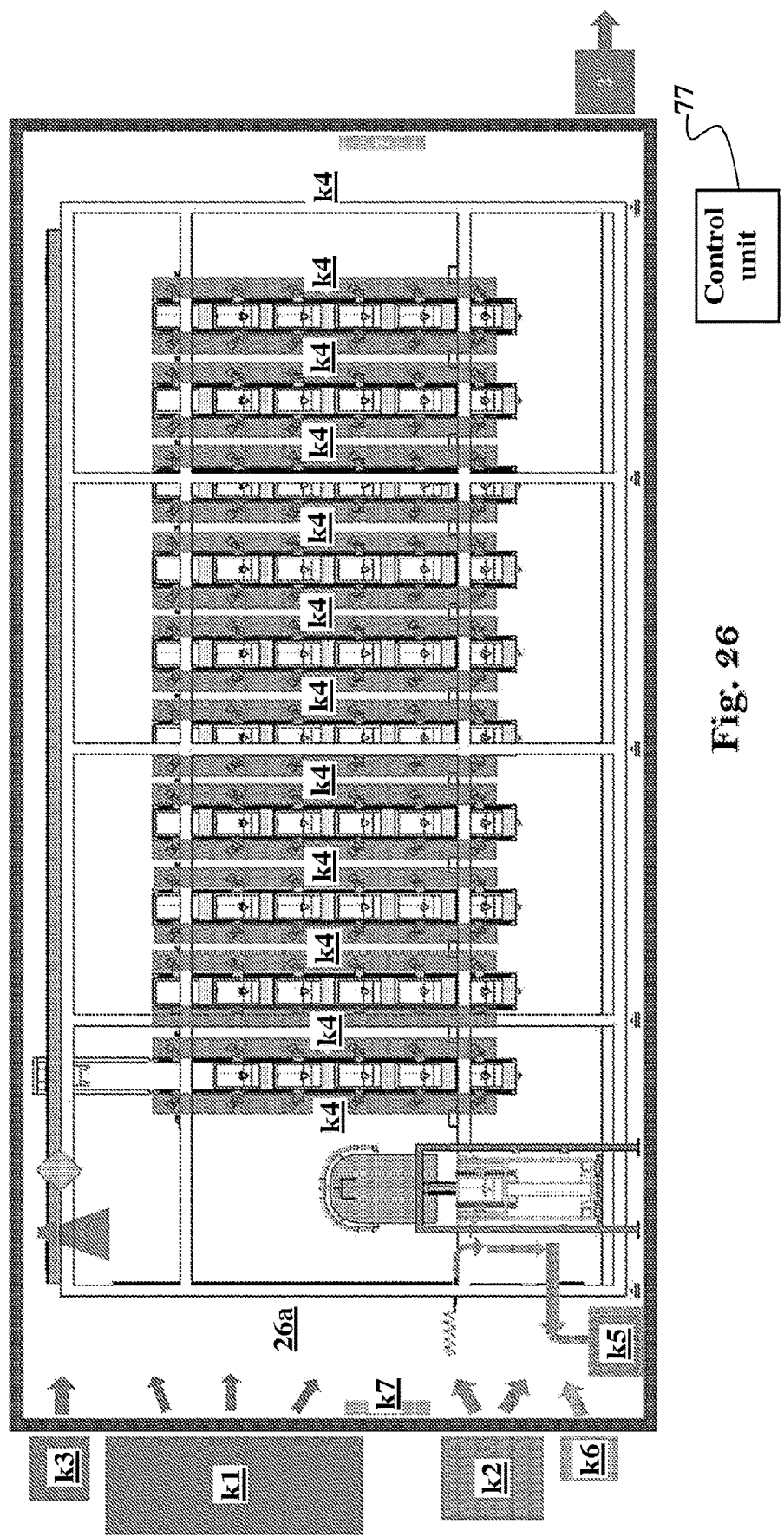
FIG. 26 shows an environment control arrangement of possible embodiments.

FIG. 26 shows an environment control arrangement 26a of possible embodiments, comprising one or more heating, ventilation, and air conditioning (HVAC) units k1 configured to control the temperature in the system, and/or one or more dehumidifier units k2 configured to control the humidity unit eh system, and/or one or more blower circulation fans k3 for circulating fresh air through the system, and/or one or more light emitting (e.g., LED) units k4 for providing artificial pant growth illumination, and/or one or irrigation unit k5 configured to mix irrigation solutions and optionally also integrates measurement data obtained from sensor devices indicative of acidity, and/or electrical conductivity, and/or temperature of the irrigation solutions. The control unit 77 is configured in some embodiments to process analyze the measurement data from the various sensors and based thereon control/regulate operation each of the k1 to k5 units.

FIGS. 27A and 27B demonstrate crop monitoring/control arrangement 27a of possible embodiments, utilizing a plurality of tray tracing zones within the horticulture crop growing module 25. In some embodiments each one of the growing trays 20 includes a unique readable identifier (e.g., a Datamatrix identification code) 20y. The tray identifier 20y is used by the system to record information/measurement data from the sensors, in association with each plant in the horticulture crop growing module 25.

In some embodiment the horticulture crop growing module 25 comprises a tray identification zone c1 at the sterilization 20s and/or the crop control 20c stations to record information (e.g., ID, date, time, sterilization and crop control) for growing strays 20 undergoing sterilization/crop control, and/or at a top tray passage zones c2 above/adjacent each growing tower 30 to record information (e.g., ID, date, time, tower ID) for each growing tray 20 transported to/from the growing towers 30, and/or at the tray entry zone c3 near/at the inlet/outlet port 27 for identification of growing trays loaded into the system and unloaded therefrom, and/or c4 at/near entrant to the pollination station 20p and/or the irrigation station for recording of information (e.g., ID, date, time, pollination/irrigation) for the growing trays 20 undergoing pollination/irrigation processes.

The control unit 77 can be configured to collect and record the tray identification information for the various tray identification zones c1, . . . , c4 for each growing tray 20 transported in the system in association with certain conditions/properties, such as: light exposure time duration; nutrients; sterilization; pollination, optionally together with an input about the type of produce, seed type or mother plant. The collected data can be processed and analyzed to generate standard growing profiles that can be utilized to determine optimal growing conditions for the system.

This tray identification/traceability arrangement 27a of each growing tray 20 transported in the system can be used by the control unit 77 to determine individual growing condition/profile for each growing tray 20 e.g., growing tower location, faster/slower movement speeds within the system, etc.

As described hereinabove and shown in the associated figures, the present disclosure provides a greenhouse and horticulture system for automated plants growth facilities and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A horticulture crop growing module comprising:
   a closed structure with a controlled environment treating system, and
   one or more growing tray inlet/outlet ports;
   the horticulture crop growing module further comprising:
      a plurality of parallelly disposed single-rowed growing towers, each of said plurality of single-rowed growing towers configured to receive an array of vertically supported growing trays and to vertically move said growing trays along said single-rowed growing tower; and
      a growing tray manipulation system comprising one or both of a top tray conveying system extending above the growing towers and a bottom tray conveying system extending below the growing towers, said growing tray manipulation system configured for receiving planted growing trays via the growing tray inlet/outlet port and loading them to allocated growing towers of said horticulture crop growing module, displacing the growing trays through treating stations within the horticulture crop growing module, and for displacing the growing trays out of said horticulture crop growing facility through the growing tray inlet/outlet port.

2. The horticulture crop growing module of claim 1, having one or more of the following configurations:
   irrigation being applied to the growing trays at a cascade configuration, wherein irrigation is applied to top growing trays within the growing tower, and irrigation liquid flows to growing trays below one another by gravitation;
   the growing trays being configured with an irrigation inlet port disposed at a top portion thereof, and an irrigation outlet port disposed at a bottom portion thereof so as to define an irrigation flow path extending between said ports;
   an irrigation outlet port of the growing trays comprising a normally closed valve configured for opening by a valve opening member configured at an inlet port of a neighboring bottom growing tray, only upon stacking the growing trays on top of one another;
   one or both of a irrigation inlet port and a irrigation outlet port being configured with a filtering arrangement;
   a bottommost growing tray within a growing tower being selectively engaged by a valve opening mechanism configured for opening the normally closed valve of the irrigation outlet port of said bottommost growing tray when disposed over said valve opening mechanism; and
   the growing trays comprising a perforated trough element configured to sprinkle irrigation liquids received from an irrigation inlet port.

3. The horticulture crop growing module of claim 2 comprising an irrigation station configured for one or more of the following:
   to supply irrigation liquids to growing trays introduced thereinto via their irrigation inlet port;
   to drain residual irrigation liquids accumulated in the growing trays via their irrigation outlet port; and
   to provide a tilting mechanism configured to drain the residual liquids.

4. The horticulture crop growing module of claim 1, wherein the bottom tray conveying system comprises at least one of the following:
   a pair of conveyor chains disposed parallelly and configured for bearing opposite sides of a bottom surface of the growing trays;
   one or more rails extending below the growing towers, and a frame structure configured to move along said one or more rails and transfer or receive a growing tray from a selected one of the growing towers;
   a frame structure of the bottom tray conveying system including a manipulator unit configured to engage a tray arresting mechanism of the growing tower and controllably change it between a tray arresting position and a disengaged position; and
   a frame structure of the bottom tray conveying system including a lift assembly configured to transfer a growing tray thereby carried to the growing tower, or receive a growing tray from the growing tower.

5. The horticulture crop growing module of claim 4 configured for one or more of the following:
   to change the tray arresting mechanism to its disengaged position when transferring the growing tray to the growing tower, and thereafter to change the tray arresting mechanism back to its tray arresting position for securing the transferred growing tray in a bottommost tray-location of said growing tower; and
   to change the tray arresting mechanism to its disengaged position when receiving the growing tray from the growing tower, and thereafter to change the tray arresting mechanism back to its tray arresting position for securing a downwardly translated growing tray in a bottommost tray-location of said tower.

6. The horticulture crop growing module of claim 1, wherein the treating stations are configured for at least one of the following:
   to apply one or more treatments along the treating path for promoting and enhancing growth of the crops; and
   to provide any one or more of irrigation, illumination, humidity, air temperature, fertilizing/nutrition, hydrogenation, growing tray heating, radiation at different wavelength, playing sound, pollination, and sterilization.

7. The horticulture crop growing module of claim 1, wherein the horticulture crop growing module is configured with an Artificial Intelligence (AI) system comprising:

a plurality of sensors distributed within the horticulture crop growing module along the treating path and configured for obtaining parameter signals associated with a growing cycle of the crops and with a position and state of the growing trays and treating stations; and a controller configured for receiving and processing the parameter signals and generating operation signals responsive thereto, for controlling operation of the treating stations and automatic displacement of the growing trays along the growing path.

8. The horticulture crop growing module of claim 1, wherein the growing tray manipulation system is configured for at least one of the following:

to provide a growing tray lift configured for receiving the growing trays from the bottom tray conveying system and transporting them to the top tray conveying system;

each one or more of the bottom tray conveying system, and a growing tray lift, and the top tray conveying system, being configured for conveying the growing trays to one or more of the treating stations;

each of the bottom tray conveying system, and a growing tray lift, and the top tray conveying system being used for conveying growing trays at either direction; and the top tray conveying system being fitted also for conveying growing trays to an and from a respective at least one of the inlet/outlet port thereof.

9. The horticulture crop growing module of claim 1, having one or more of the following configurations:

each of the growing towers being configured with a growing tray support system, for retaining the growing trays vertically aligned wherein:

a duty, bottom most growing tray, is arrested by a tray arresting mechanism at a bottom portion of the support system, and each consecutive growing tray is supported over another growing tray, readily displaceable to move along the growing tower; and each growing tower comprises tray support rails defining a sliding path, wherein trays within a growing tower are slidingly displaceable there along, owing to gravitational force.

10. The horticulture crop growing module of claim 1, comprising an illumination system configured for at least one of the following:

illuminating the growing trays;

a light illuminating source being associated with each growing tray within the growing tower; and a light illuminating source being disposed on tray support rails of the growing tower, and/or at a bottom face of the growing trays.

11. The horticulture crop growing module of claim 1, having one of the following configurations:

a valve being associated with a filtering arrangement, whereby liquid arriving at the valve is filtered;

a bottommost growing tray within a growing tower being disposed over a drainage container;

a valve opening mechanism being configured for opening a valve of the irrigation outlet port of said bottommost growing tray when disposed over a drainage container;

a configuration or treating irrigation liquid and for recycling the irrigation liquid;

drainage containers being in flow communication with one another, or a common drainage container being configured for two or more growing towers of the horticulture crop growing module; and drained irrigation liquid from one or more of the growing towers within the horticulture crop growing module being directly collected to an external irrigation liquid treating station.

12. The horticulture crop growing module of claim 1, wherein:

the growing towers are configured for accommodating a vertical stack of growing trays, supported between side bars, wherein a bottom most growing tray is arrestable by a tray arresting mechanism having one or more of one or more of the following configurations:

consecutive growing trays being disposed on top of one another, whereby disengaging the bottom most tray from the tray arresting mechanism facilitates loading of the bottom most tray onto the bottom tray conveying system, and further entailing downward shifting of the growing trays within the growing tower, under force of gravity; and the tray arresting mechanism being configured at a bottom portion of the growing tower, said tray arresting mechanism being manipulable between a normally tray arresting position, wherein one or more obstructing elements project to secure a bottommost growing tray to said growing tower, and a disengaged position wherein the one or more obstructing elements are contracted to release a bottommost growing tray from said growing tower;

the growing towers are is configured for simultaneous operating, whereby all tray arresting mechanisms within the horticulture crop growing module simultaneously shift between their respective tray arresting position and disengaged position, or configured to shift upon a command signal received from a controller, wherein any one or more tray arresting mechanism can be individually operated; and the tray arresting mechanism comprising:

an activating rod rotatably secured at a bottom portion of the horticulture crop growing module and configured with threaded portions disposed adjacent each growing tower;

a plurality of threaded riders, at least one associated with each growing tower, each rider engaged over each threaded portion and restrained for axial displacement along the activating rod, and wherein each rider comprises a tray engaging member, whereby rotating the threaded rod in one direction entails simultaneous axial displacement of the riders for shifting the tray arresting mechanisms into their tray arresting position, and rotating the threaded rod in an opposite direction entails simultaneous axial displacement of the riders for shifting the tray arresting mechanisms into their disengaged position; and a pair of facing pins, whereby at the tray arresting position said pins displace towards one another, and at the disengaged position said pins displace away from one another.

13. The horticulture crop growing module of claim 1 wherein:

the growing trays are solid trays made of metal or plastic material, having a flat growing portion and two parallel upright side frames disposed at opposite side ends of the tray;

growing trays within a growing tower are configured for at least one of the following: such that a bottom surface of a top growing tray bears over the side frames of a neighboring bottom growing tray;

a valve opening member is configured at the upright side frame of the neighboring bottom growing tray, for opening normally closed valve at a top growing tray;

the growing trays are engaged by a growing tray lift at a bottom of the trays or at the upright side frame thereof;

the upright side frames of the growing trays are configured with an engaging recess, and the top tray conveying system is configured with two side rails accommodating one or more pickup hooks, displaceable along the side rails, and configured for selective arresting with said engaging recesses;

two side rails of the top tray conveying system are fixed over the growing towers within the horticulture crop growing module; and engaging with one or more trays takes place upon displacing growing trays upwards towards said side rails.

14. The horticulture crop growing module of claim 1, further comprising a growing tray propelling unit configured for ascending and descending a bottom duty growing trays from a bottom tray conveying system into and from a respective growing tower.

15. The horticulture crop growing module of claim 1, wherein each growing tray is configured with a readable identifier, whereby tray data associated with each growing tray can be registered at a controller of the horticulture crop growing module.

16. A horticulture crop growing method, used in conjunction with a horticulture crop growing module according to claim 1, comprising the following steps:
   i. receiving a plurality of planted growing trays into the horticulture crop growing module through the inlet/outlet port and transporting them by the bottom tray conveying system;
   ii. loading the growing trays from the bottom tray conveying system into the growing towers;
   iii. commencing a growing cycle wherein the growing trays are circulated between a plurality of treating stations disposed within the horticulture crop growing module;
   iv. monitoring and obtaining data associated with each growing tray and relating to ripeness of the crops growing on the growing trays;
   V. repeating steps iii and iv until crops are at harvesting state; and
   vi. conveying the growing trays from the growing towers to the inlet/outlet port for collecting the growing trays.

17. A horticulture crop growing method according to claim 16, wherein prior to a growth cycle, the growing trays and the horticulture crop growing facility are pre-treated at growing tray preparation station, to disinfect the vicinity and gear.

18. An automated horticulture crop growing system, comprising:
   a growing tray preparation station wherein a plurality of growing trays are pre-treated, filled with a growing bed and planted; and
   a growing tray displacing system for transferring planted growing trays from the growing tray preparation station to a horticulture crop growing facility;
   wherein:
      the horticulture crop growing facility comprises a closed structure with a controlled environment treating system, one or more growing tray inlet/outlet ports, and one or more horticulture crop growing modules;
   said horticulture crop growing module comprises:
      a plurality of parallelly disposed single-rowed growing towers, each of said plurality of parallelly disposed single-rowed growing towers configured to receive vertically supported growing trays and to vertically move said growing trays along and within said single-rowed growing tower for transferring them between tray locations therewithin; and
      a growing tray manipulation system comprising one or both of a top tray conveying system for loading or unloading growing trays from a top end of each growing tower, and a bottom tray conveying system for loading or unloading growing trays from a bottom end of each growing tower; and
   said growing tray manipulation system is configured for:
      receiving from said growing tray displacing system planted growing trays via the growing tray inlet/outlet port and loading them to allocated growing towers of said horticulture crop growing module;
      displacing the growing trays between the allocated growing towers to treating stations within the horticulture crop growing module; and
      unloading the growing trays by displacing them out of said horticulture crop growing facility through the growing tray inlet/outlet port.

19. The automated horticulture crop growing system of claim 18, further comprising a finished produce station configured for receiving growing trays from the horticulture crop growing modules, whereat growth is harvested, packed and stored at appropriate conditions, ready for delivery/shipment, at an automated, hands-free handling station.

20. A horticulture crop growing facility comprising:
   a closed structure with a controlled environment treating system and having one or more growing tray inlet/outlet ports, and one or more horticulture crop growing modules; and
   each horticulture crop growing module comprising:
      a plurality of parallelly disposed single-rowed growing towers, each of said plurality of single-rowed growing towers configured to receive an array of vertically supported growing trays and to vertically move said growing trays along said single-rowed growing tower; and
      a growing tray manipulation system comprising one or both of a top tray conveying system and a bottom tray conveying system, said growing tray manipulation system configured for receiving planted growing trays via the growing tray inlet/outlet port and loading them to allocated growing towers of said horticulture crop growing module, displacing the growing trays through treating stations within the horticulture crop growing module, and for displacing the growing trays out of said horticulture crop growing facility through the growing tray inlet/outlet port.

* * * * *